US010699421B1

(12) United States Patent
Cherevatsky et al.

(10) Patent No.: US 10,699,421 B1
(45) Date of Patent: Jun. 30, 2020

(54) TRACKING OBJECTS IN THREE-DIMENSIONAL SPACE USING CALIBRATED VISUAL CAMERAS AND DEPTH CAMERAS

(71) Applicant: Amazon Technologies, Inc., Seattle, WA (US)

(72) Inventors: Boris Cherevatsky, Modiin (IL); Roman Goldenberg, Haifa (IL); Gerard Guy Medioni, Seattle, WA (US); Ofer Meidan, Hadera (IL); Ehud Benyamin Rivlin, Haifa (IL); Dilip Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/473,430

(22) Filed: Mar. 29, 2017

(51) Int. Cl.
*G06T 7/292* (2017.01)
*H04N 7/18* (2006.01)
*G06T 7/55* (2017.01)
*G06T 11/60* (2006.01)
(Continued)

(52) U.S. Cl.
CPC .............. *G06T 7/292* (2017.01); *G06K 9/623* (2013.01); *G06K 9/6277* (2013.01); *G06T 7/55* (2017.01); *G06T 11/60* (2013.01); *H04N 5/247* (2013.01); *H04N 7/181* (2013.01); *H04N 7/188* (2013.01); *G06T 2207/10024* (2013.01); *G06T 2207/10028* (2013.01); *G06T 2207/20081* (2013.01); *G06T 2210/12* (2013.01)

(58) Field of Classification Search
CPC ........... G06T 7/292; G06T 7/55; G06T 11/60; G06K 9/623; G06K 9/6277; H04N 5/247; H04N 7/181; H04N 7/188
See application file for complete search history.

(56) References Cited

U.S. PATENT DOCUMENTS

| 7,225,980 B2 | 6/2007 | Ku et al. |
| 7,949,568 B2 | 5/2011 | Fano et al. |
| 8,009,864 B2 | 8/2011 | Linaker et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Jamie J Atala
*Assistant Examiner* — Hesham K Abouzahra
(74) *Attorney, Agent, or Firm* — Athorus, PLLC

(57) ABSTRACT

The motion of objects within a scene may be detected and tracked using digital (e.g., visual and depth) cameras aligned with fields of view that overlap at least in part. Objects may be identified within visual images captured from the scene using a tracking algorithm and correlated to point clouds or other depth models generated based on depth images captured from the scene. Once visual aspects (e.g., colors or other features) of objects are correlated to the point clouds, shapes and/or positions of the objects may be determined and used to further train the tracking algorithms to recognize the objects in subsequently captured frames. Moreover, a Kalman filter or other motion modeling technique may be used to enhance the prediction of a location of an object within subsequently captured frames.

22 Claims, 38 Drawing Sheets

(51) Int. Cl.
*H04N 5/247* (2006.01)
*G06K 9/62* (2006.01)

(56) References Cited

U.S. PATENT DOCUMENTS

| | | | |
|---|---|---|---|
| 8,175,925 B1 | 5/2012 | Rouaix | |
| 8,189,855 B2 | 5/2012 | Opalach et al. | |
| 8,285,060 B2 | 10/2012 | Cobb et al. | |
| 8,369,622 B1 | 2/2013 | Hsu et al. | |
| 8,423,431 B1 | 4/2013 | Rouaix et al. | |
| RE44,225 E | 5/2013 | Aviv | |
| 8,630,924 B2 | 1/2014 | Groenevelt et al. | |
| 8,688,598 B1 | 4/2014 | Shakes et al. | |
| 9,158,974 B1 | 10/2015 | Laska et al. | |
| 9,208,675 B2 | 12/2015 | Xu et al. | |
| 9,473,747 B2 | 10/2016 | Kobres et al. | |
| 9,727,838 B2 | 8/2017 | Campbell | |
| 9,846,840 B1 | 12/2017 | Lin et al. | |
| 9,898,677 B1 | 2/2018 | Andjelković | |
| 10,192,415 B2 | 1/2019 | Heitz et al. | |
| 2003/0002712 A1 | 1/2003 | Steenburgh et al. | |
| 2003/0002717 A1 | 1/2003 | Hamid | |
| 2003/0128337 A1 | 7/2003 | Jaynes et al. | |
| 2004/0181467 A1 | 9/2004 | Raiyani et al. | |
| 2006/0222206 A1 | 10/2006 | Garoutte | |
| 2007/0182818 A1 | 8/2007 | Buehler | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0137989 A1 | 6/2008 | Ng et al. | |
| 2008/0193010 A1 | 8/2008 | Eaton et al. | |
| 2009/0060352 A1 | 3/2009 | Distante et al. | |
| 2009/0121017 A1 | 5/2009 | Cato et al. | |
| 2009/0210367 A1 | 8/2009 | Armstrong et al. | |
| 2009/0245573 A1 | 10/2009 | Saptharishi et al. | |
| 2009/0276705 A1 | 11/2009 | Ozdemir et al. | |
| 2010/0002082 A1 | 1/2010 | Buehler et al. | |
| 2010/0033574 A1 | 2/2010 | Ran et al. | |
| 2011/0011936 A1 | 1/2011 | Morandi et al. | |
| 2011/0205022 A1 | 8/2011 | Cavallaro et al. | |
| 2012/0257789 A1 | 10/2012 | Lee et al. | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0139633 A1* | 5/2014 | Wang | G06K 9/00201 348/46 |
| 2014/0279294 A1 | 9/2014 | Field-Darragh et al. | |
| 2014/0362195 A1 | 12/2014 | Ng-Thow-Hing et al. | |
| 2014/0362223 A1 | 12/2014 | LaCroix et al. | |
| 2014/0379296 A1 | 12/2014 | Nathan et al. | |
| 2015/0019391 A1 | 1/2015 | Kumar et al. | |
| 2015/0073907 A1 | 3/2015 | Purves et al. | |
| 2015/0269143 A1 | 9/2015 | Park et al. | |
| 2015/0294483 A1 | 10/2015 | Wells et al. | |
| 2016/0003636 A1 | 1/2016 | Ng-Thow-Hing et al. | |
| 2016/0127641 A1 | 5/2016 | Gove | |
| 2016/0292881 A1 | 10/2016 | Bose et al. | |
| 2016/0307335 A1 | 10/2016 | Perry et al. | |
| 2017/0345165 A1* | 11/2017 | Stanhill | G06T 7/55 |
| 2018/0084242 A1 | 3/2018 | Rublee et al. | |
| 2018/0164103 A1* | 6/2018 | Hill | G06Q 10/04 |
| 2018/0218515 A1 | 8/2018 | Terekhov et al. | |
| 2018/0315329 A1 | 11/2018 | D'Amato et al. | |
| 2018/0343442 A1* | 11/2018 | Yoshikawa | G08B 13/19608 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Fuentes et al., "People tracking in surveillance applications," Proceedings 2nd IEEE Int. Workshop on PETS, Kauai, Hawaii, USA, Dec. 9, 2001, 6 pages.

Manocha et al., "Object Tracking Techniques for Video Tracking: A Survey," The International Journal of Engineering and Science (IJES), vol. 3, Issue 6, pp. 25-29, 2014.

* cited by examiner

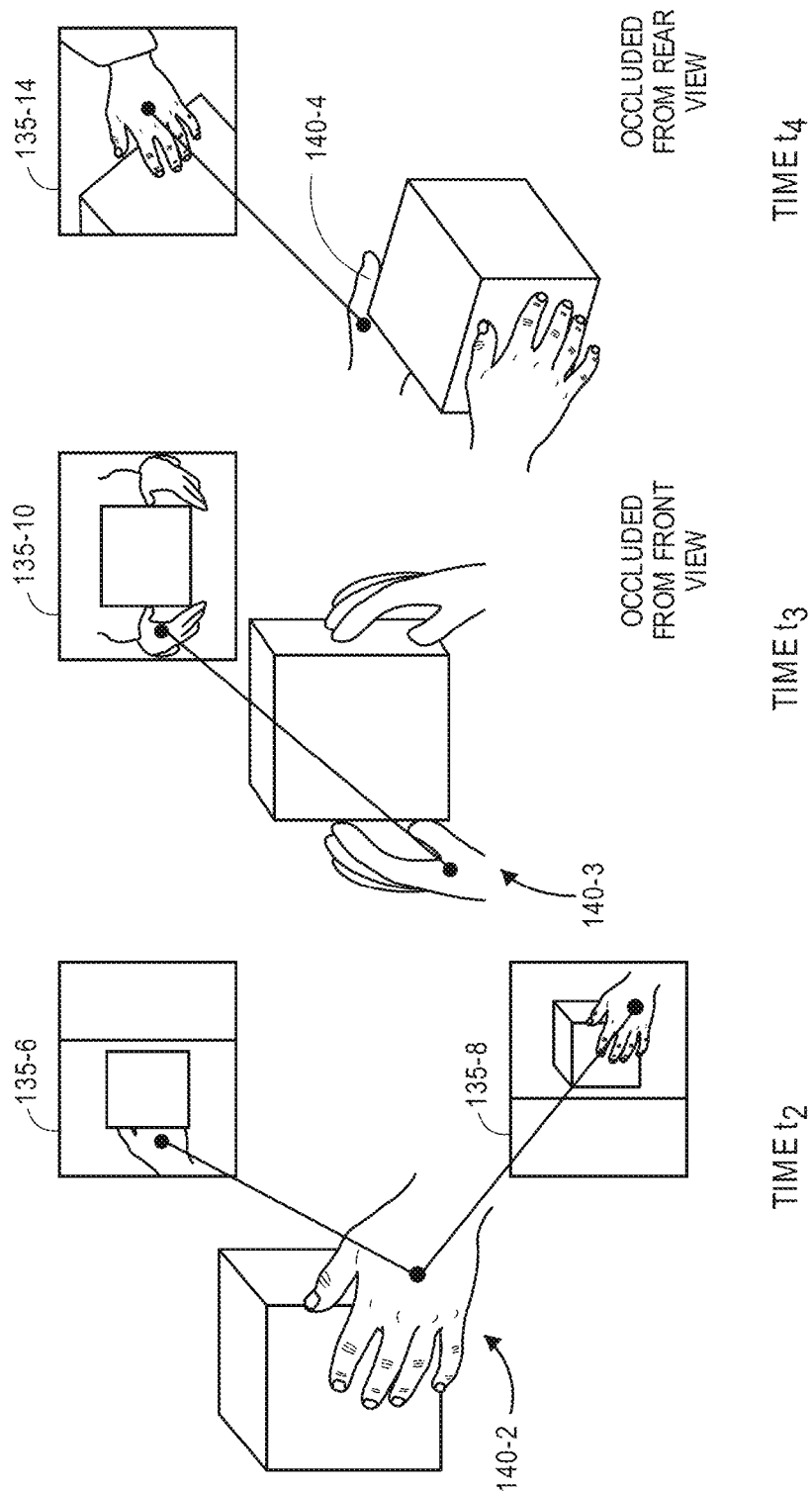

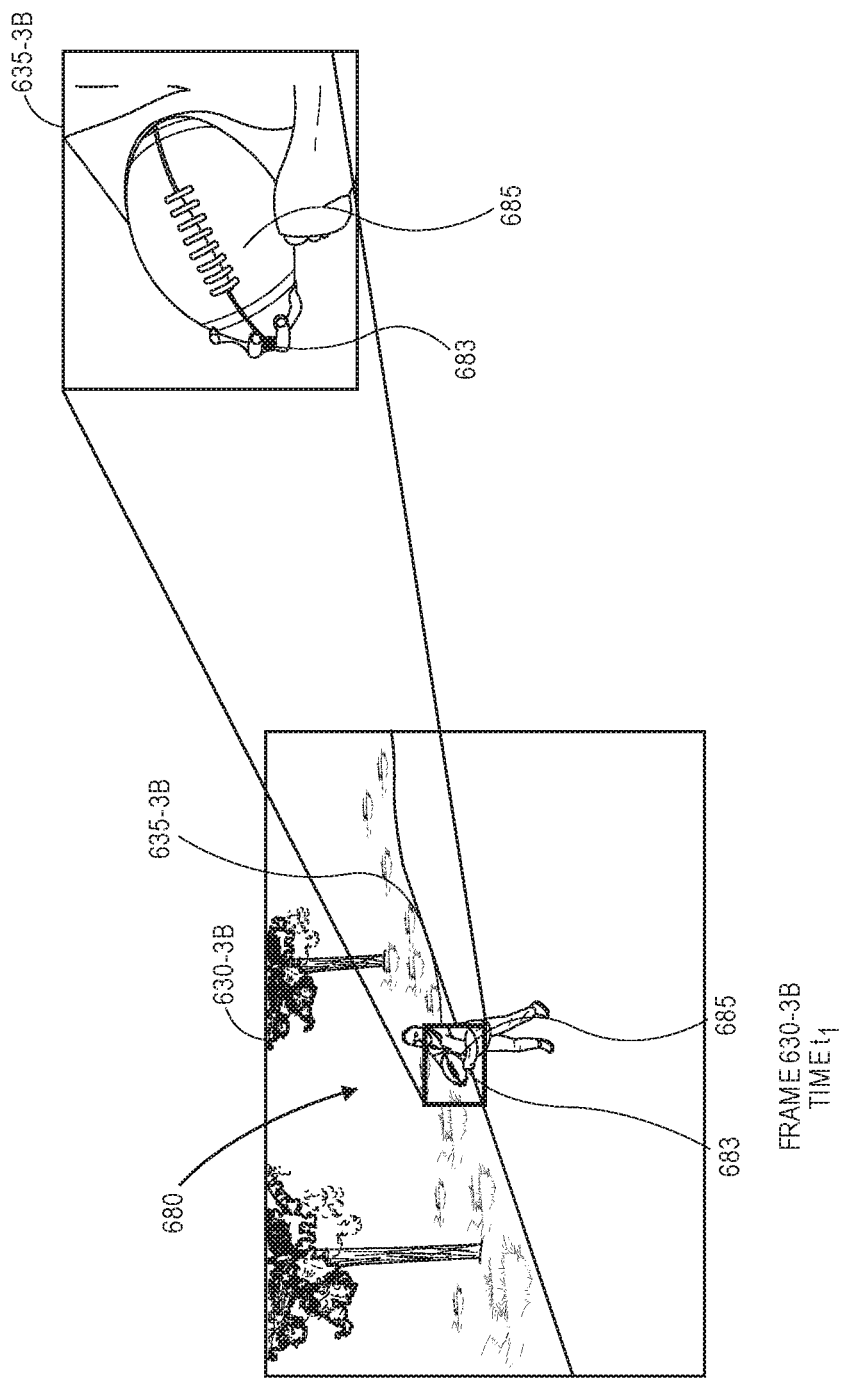

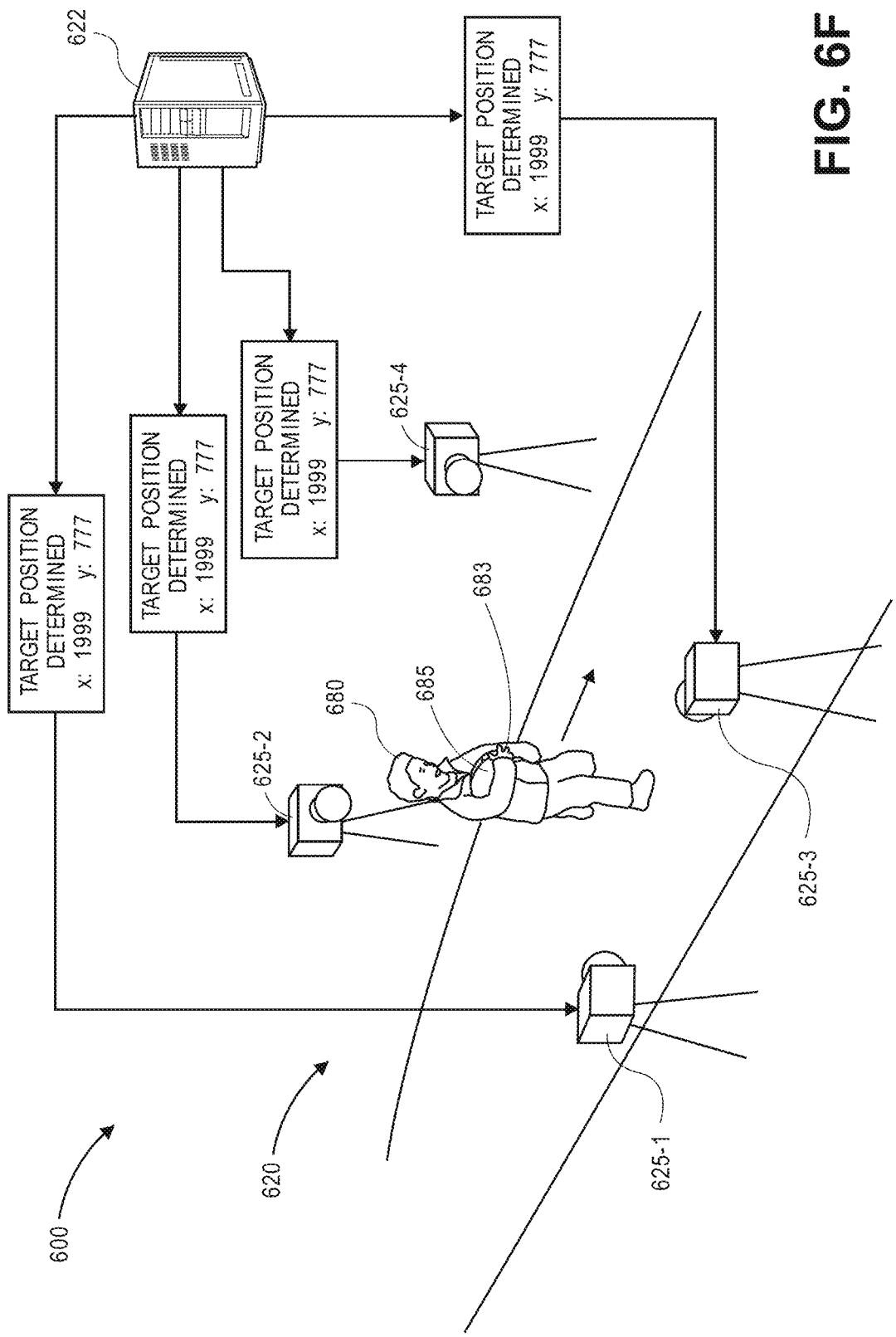

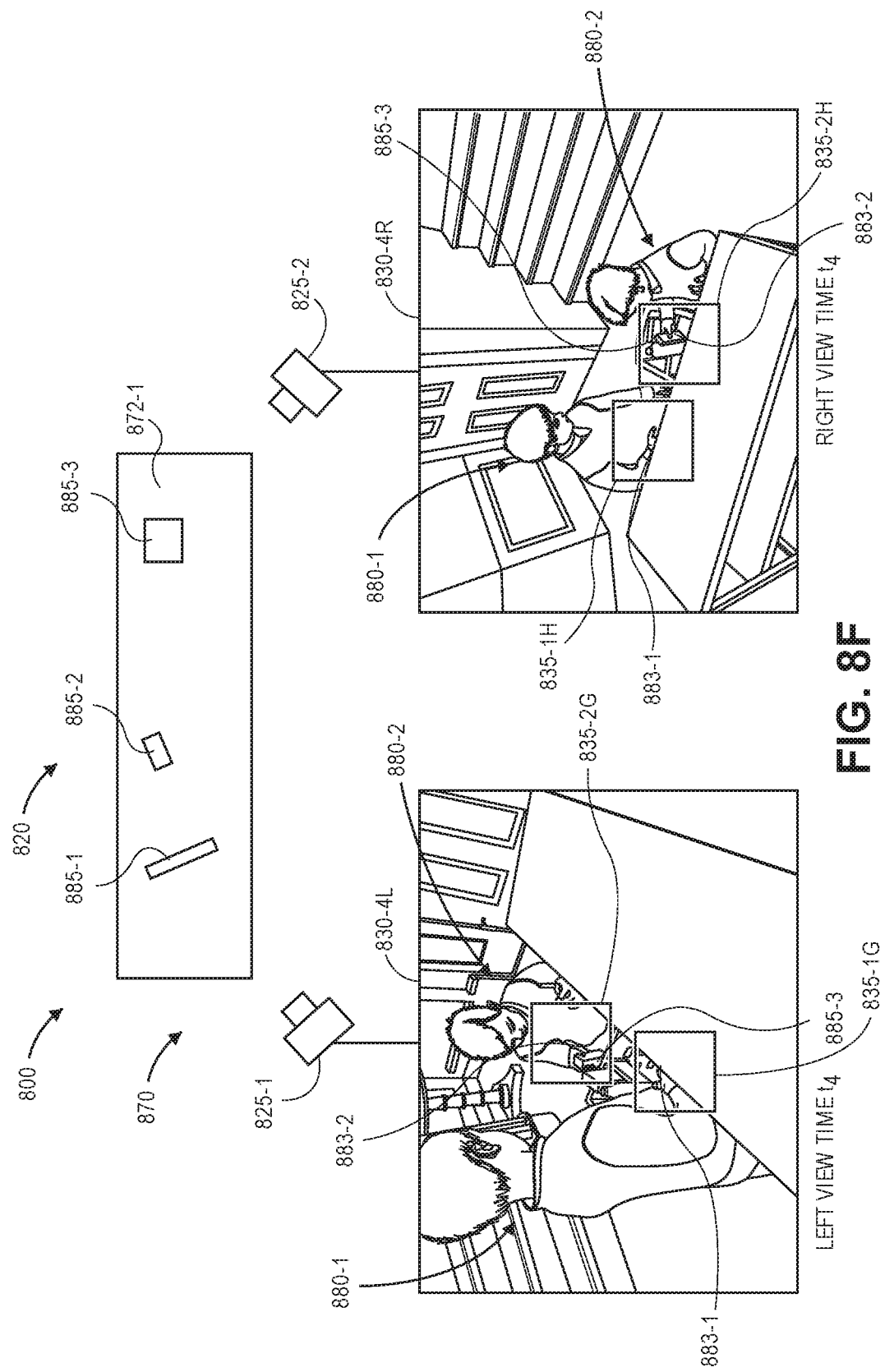

TRACKING OBJECTS IN THREE-DIMENSIONAL SPACE USING CALIBRATED VISUAL CAMERAS AND DEPTH CAMERAS

BACKGROUND

Today, the use of imaging devices such as digital cameras for conducting surveillance or monitoring operations is widespread. For example, digital cameras are often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are also frequently installed in financial settings such as banks or casinos, where money changes hands in large amounts, at high rates of speed, or between large numbers of people.

In dynamic environments such as materials handling facilities, transportation centers, financial institutions or like structures in which diverse collections of people, objects or machines enter and exit from such environments at regular or irregular times or on predictable or unpredictable schedules, it is frequently difficult to detect and track small and/or fast-moving objects using digital cameras. Most systems for detecting and tracking objects in three-dimensional (or "3D") space are limited to the use of a single digital camera and involve both the generation of a 3D mesh (e.g., a polygonal mesh) from depth imaging data captured from such objects and the patching of portions of visual imaging data onto faces of the 3D mesh.

Generating and tracking a 3D model of an object from imaging data captured from the object (e.g., visual images of an object, or depth images or other samples of depths or ranges to the object) is a computationally expensive process that tends to consume or occupy substantial amounts of available data storage, processing and transmission capacities, and may require comparatively lengthy processing times. Therefore, in environments where objects that are to be tracked are large in number or small in size, or are located in tight or crowded quarters or moving at high speeds, the generation and tracking of 3D models of such objects is currently infeasible.

BRIEF DESCRIPTION OF THE DRAWINGS

FIGS. 1A through 1I are views of aspects of one system for tracking objects in 3D space using calibrated cameras in accordance with implementations of the present disclosure.

FIGS. 6A through 6G are views of aspects of one system for tracking objects in 3D space using calibrated cameras in accordance with implementations of the present disclosure.

FIGS. 8A through 8M are views of aspects of one system for tracking objects in 3D space using calibrated cameras in accordance with implementations of the present disclosure.

DETAILED DESCRIPTION

As is set forth in greater detail below, the present disclosure is directed to systems and methods for tracking objects in three-dimensional (or "3D") space using one or more calibrated imaging devices. More specifically, one or more implementations of the present disclosure are directed to tracking target objects within physical scenes, where the target objects are simultaneously observed by a number of calibrated visual cameras and depth cameras having overlapping fields of view. One or more of the implementations disclosed herein are particularly useful in tracking the presence and motion of objects within materials handling facilities, or in other environments where large numbers of objects of varying sizes may appear and remain present for brief or intermittent periods of time and/or are in motion at high rates of speed, even where such objects may be blocked or hidden from the fields of view of one or more of the imaging devices for one or more of such periods of time.

Figure 1A:
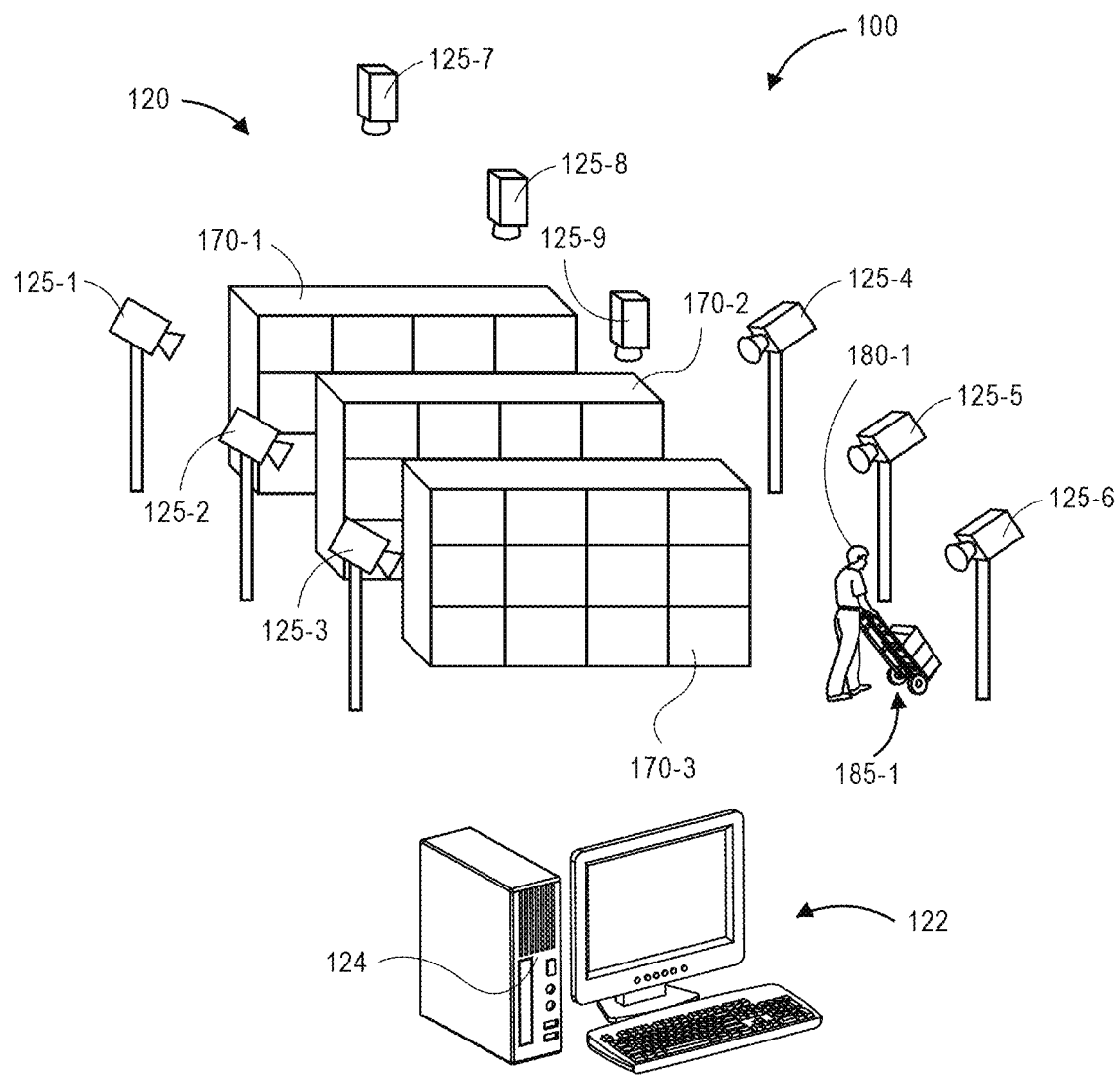
Figure 1B:
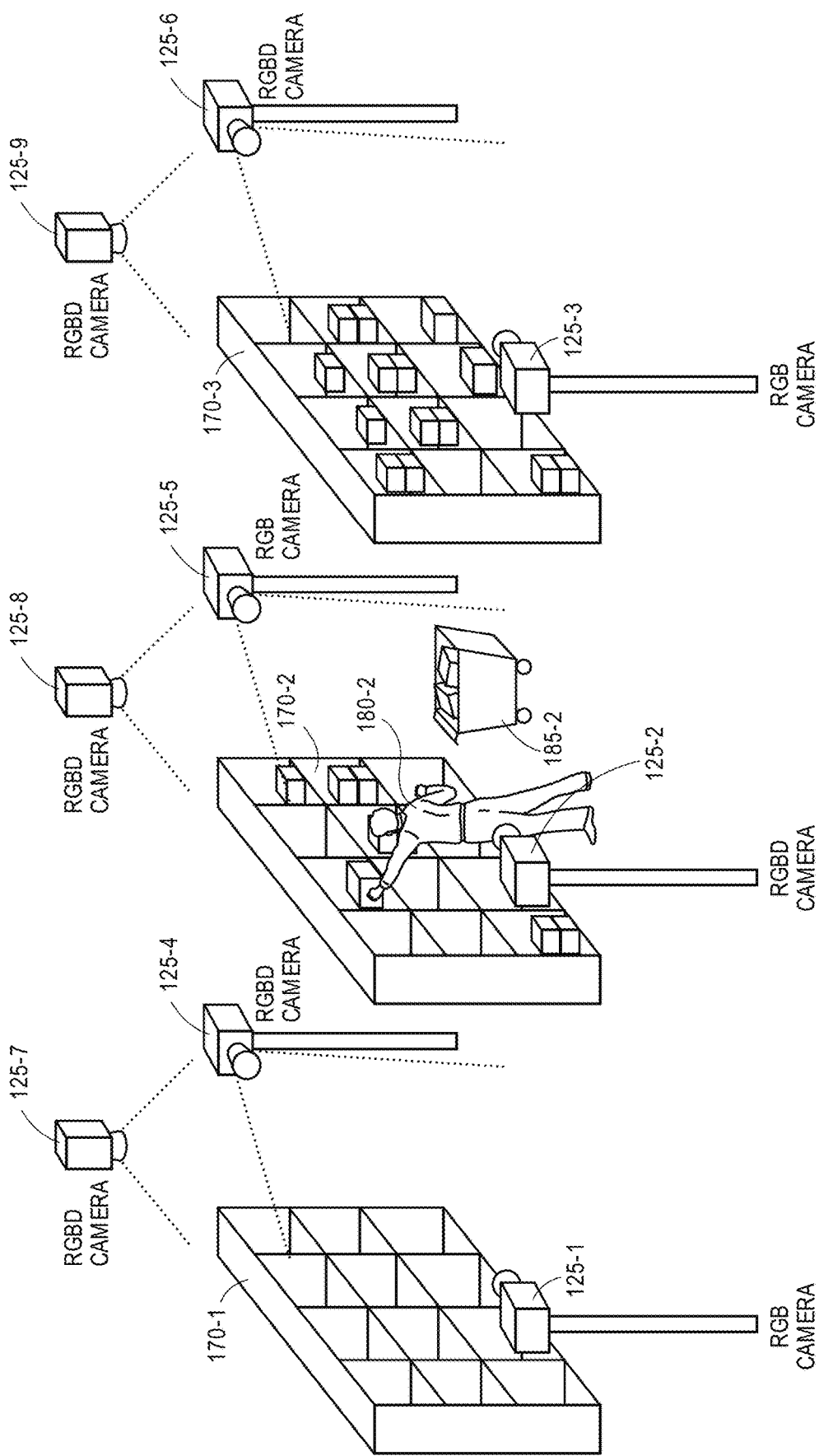

Referring to FIGS. 1A through 1I, views of aspects of one system 100 for tracking objects in 3D using calibrated cameras in accordance with implementations of the present disclosure are shown. As is shown in FIGS. 1A and 1B, the system 100 includes a materials handling facility 120 having a plurality of cameras 125-1, 125-2, 125-3, 125-4, 125-5, 125-6, 125-7, 125-8, 125-9 and a plurality of shelving units 170-1, 170-2, 170-3 aligned in parallel with respect to one another. One or more operators 180-1, 180-2, e.g., customers, workers or other personnel, may travel throughout the materials handling facility 120 alone or with one or more carts 185-1, 185-2 or dollies, hand trucks, bins or the like, such as between or among the various shelving units 170-1, 170-2, 170-3, during the performance of one or more tasks. For example, one or more of the operators 180-1, 180-2 may pick one or more items from the various shelves of shelving units 170-1, 170-2, 170-3, or stow one or more items onto such shelves. Alternatively, one or more autonomous mobile robots (not shown) may also perform one or more tasks within the materials handling facility 120, e.g., picking and/or storing items.

Each of the cameras 125-1, 125-2, 125-3, 125-4, 125-5, 125-6, 125-7, 125-8, 125-9 is calibrated, such that relationships between coordinates of imaging data captured by such cameras and directions relative to their respective image sensors are known. Moreover, each of the cameras 125-1, 125-2, 125-3, 125-4, 125-5, 125-6, 125-7, 125-8, 125-9 is also aligned and configured to capture imaging data in the form of visual images (e.g., color images, such as red-green-blue images, or "RGB" images) and/or depth images (e.g., depth data or ranging data) from objects within their respective fields of view. For example, the camera 125-1 is an RGB camera (e.g., a camera configured to capture visual images) aligned to include a front face of the shelving unit 170-1 within its field of view, while the camera 125-2 is an RGBD camera (e.g., a camera configured to capture both visual images and depth images) aligned to include a front face of the shelving unit 170-2 and spaces adjacent thereto within its field of view, and the camera 125-3 is an RGB camera aligned to include a front face of the shelving unit 170-3 within its field of view. Similarly, the cameras 125-4, 125-5, 125-6 are an RGBD camera, an RGB camera and an RGBD camera, respectively, that are aligned to include the front faces of the shelving units 170-1, 170-2, 170-3 and spaces adjacent to such shelving units 170-1, 170-2, 170-3 within their respective fields of view. The cameras 125-7, 125-8, 125-9 are RGBD cameras that are mounted aloft within the materials handling facility 120 and aligned to include spaces adjacent to the shelving units 170-1, 170-2, 170-3 within their fields of view.

Thus, each of the cameras 125-1, 125-2, 125-3, 125-4, 125-5, 125-6, 125-7, 125-8, 125-9 of the materials handling facility 120 shown in FIGS. 1A and 1B is configured to capture imaging data in the form of visual images and/or depth images regarding activity and/or interactions with one or more of the shelving units 170-1, 170-2, 170-3, including imaging data regarding specific aspects of the operators 180-1, 180-2, the carts 185-1, 185-2, or any objects being transported throughout the materials handling facility 120, such as one or more items being picked from or stowed onto the shelving units 170-1, 170-2, 170-3.

In accordance with one or more implementations of the present disclosure, objects within an environment such as the materials handling facility 120 shown in FIGS. 1A and 1B may be tracked based on visual imaging data and depth imaging data captured using the cameras 125-1, 125-2, 125-3, 125-4, 125-5, 125-6, 125-7, 125-8, 125-9. Two or more cameras may be synchronized, and an initial position of a target object may be selected on any basis. The initial position of the target object may be identified and/or represented in any manner, such as by coordinates of a center or centroid of the target object, coordinates of each of a set or a collection of points corresponding to the object (e.g., in 3D space), or coordinates of a representative point of the target object, which may or may not be a center or centroid of the target object.

A set of the active cameras, or cameras that include at least a portion of a target object within their respective fields of view, may be identified and an extent to which the target object is visible or occluded from such fields of view may be determined. For example, for a given target object within a 3D bounding region, a portion of a 2D representation of the bounding region that appears within such fields of view of a digital camera or another imaging device may be determined. Likewise, degrees of occlusion of a target object within each of such fields of view may be determined in any manner. In some embodiments, a degree of occlusion may be determined by comparing a z-buffer corresponding to a target object to a z-buffer of other points within a field of view (e.g., a camera frustrum) spanned by a 2D representation of a 3D bounding region that is projected into the field of view, or in any other manner.

A point cloud representative of all available depth information regarding a physical scene may be defined, and two-dimensional predictions or hypotheses as to positions of the target object expressed in visual images captured at synchronized times may be determined and correlated with points in space expressed in the point cloud to determine positions of the target object in 3D space at the synchronized times. A "tracklet," or a record of the positions of the target object at various times beginning at the initial position and the subsequently determined positions, may be defined. So long as each of a set of "stopping conditions" (or reasons to terminate tracking of an item) remains unmet, positions that are determined from the visual images correlated with the point cloud may be added to the tracklet, which ultimately defines the motion of the target object.

Figure 1C:
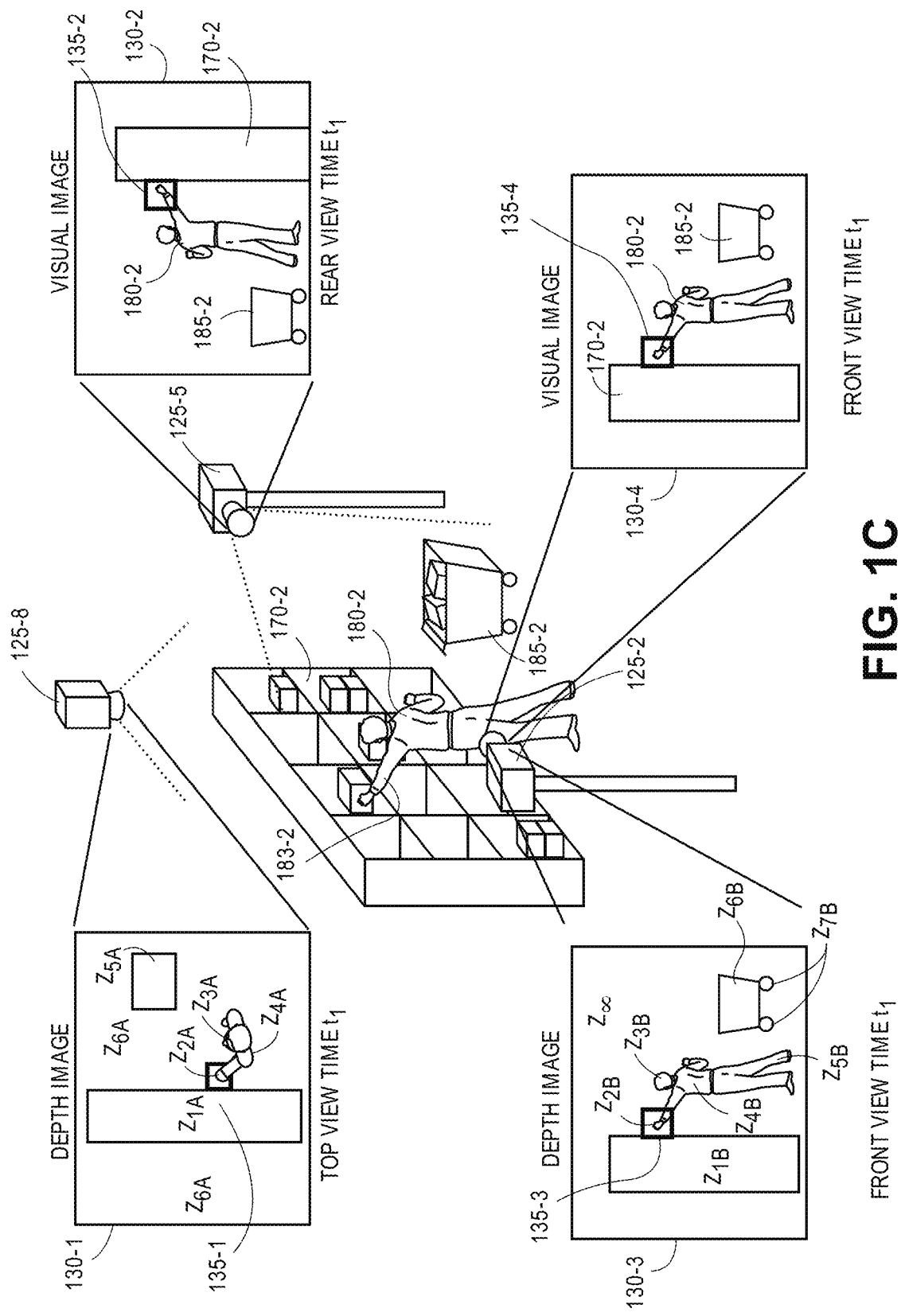

As is shown in FIG. 1C, the operator 180-2 is shown as extending a left hand 183-2 upwardly and toward the front face of the shelving unit 170-2, e.g., to retrieve one or more items from a shelf of the shelving unit 170-2, or to stow one or more items thereon. The cameras 125-1, 125-2, 125-3, 125-4, 125-5, 125-6, 125-7, 125-8, 125-9 are synchronized, and a plurality of images 130-1, 130-2, 130-3, 130-4 are captured from a set of the cameras that include the operator 180-2 and the cart 185-2 in their respective fields of view. This set includes the camera 125-2, which captures the depth image 130-3 and a visual image 130-4 from one side of the shelving unit 170-2 and spaces adjacent to a front face of the shelving unit 170-2, as well as the camera 125-5, which captures the visual image 130-2 from another side of the shelving unit 170-2 and of the spaces adjacent to the front face of the shelving unit 170-2, and the camera 125-8, which captures the depth image 130-1 from above the shelving unit 170-2 and the spaces adjacent to the front face of the shelving unit 170-2.

The depth image 130-1 includes depth or ranging data regarding distances from the camera 125-8 to objects within its field of view at time $t_1$, e.g., a top view of the shelving unit 170-2, including a distance $z_{1A}$ to an upper surface of the shelving unit 170-2, a distance $z_{2A}$ to the left hand 183-2 of the operator 180-2, a distance $z_{3A}$ to a head of the operator 180-2, a distance $z_{4A}$ to a torso of the operator 180-2, a distance $z_{5A}$ to upper surfaces of the cart 185-2, and a distance $z_{6A}$ to a floor of the materials handling facility 120 in a vicinity of the shelving unit 170-2. The depth image 130-3 similarly includes depth or ranging data regarding distances from the camera 125-2 to objects within its field of view at time $t_1$, e.g., a front view of the shelving unit 170-2, including a distance $z_{1B}$ to a left face of the shelving unit 170-2, a distance $z_{2B}$ to the left hand 183-2 of the operator 180-2, a distance $z_{3B}$ to the head of the operator 180-2, a distance $z_{4B}$ to the torso of the operator 180-2, a distance $z_{5B}$ to a right leg of the operator 180-2, a distance $z_{6B}$ to a basket or a bin of the cart 185-2, and a distance $z_{7B}$ to wheels of the cart 185-2.

The visual image 130-2 depicts colors, textures, outlines or other aspects of objects within a field of view of the camera 125-5 at time $t_1$, e.g., the front view of the shelving unit 170-2, including but not limited to colors, textures, outlines or other aspects of the shelving unit 170-2, the operator 180-2 and the cart 185-2. Similarly, the visual image 130-4 depicts colors, textures, outlines or other aspects of objects within a field of view of the camera 125-2 at time e.g., a rear view of the shelving unit 170-2, including but not limited to colors, textures, outlines or other aspects of the shelving unit 170-2, the operator 180-2, the left hand 183-2 and the cart 185-2. The visual image 130-2 and the visual image 130-4 include colors, textures, outlines or other aspects of such objects from different perspectives, e.g., the perspectives of the camera 125-5 and the camera 125-2.

As is discussed above, the systems and methods of the present disclosure may be utilized to track positions of objects in 3D space based on imaging data captured by multiple visual cameras and/or depth cameras (e.g., digital cameras). In some implementations, the positions of the objects may be identified or represented in any manner, such as by coordinates of a center or centroid of the target object, or coordinates of one or more of a set or a collection of points corresponding to the target object (e.g., one or more representative points), which may but need not include a center or a centroid of the target object. Moreover, the positions may be identified or represented according to any coordinate system, including but not limited to a rectangular (or Cartesian) coordinate system, e.g., with x, y and z coordinates with respect to an origin, or a polar coordinate system, e.g., with angular and radial coordinates with respect to a pole, or any other type or form of coordinate system.

In accordance with some implementations of the present disclosure, the tracking of objects in 3D space may begin with the identification of a "seed box" centered on a predicted initial position of a target object, viz., the left hand 183-2 of the operator 180-2, with buffers of nominal lengths (e.g., ten centimeters) around a predicted initial position. The seed box may be established based on any type or form of triggering event, as represented by or in any type or form of information or data, and may be defined or oriented with respect to one or more points in space. For example, the seed box may be established based on depth imaging data captured by one or more depth cameras, based on colors, textures, outlines or other aspects expressed in visual imaging data captured by one or more visual cameras, or on a combination of depth imaging data and visual imaging data. Alternatively, the seed box may be established based on information or data captured, sensed or received from any type or form of sensor, including but not limited to a change in weight detected by a weight sensor provided in one or more shelves of a storage unit, a manual interaction with a touchscreen on which visual imaging data is presented, or any other information or data. The seed box may also be based on intrinsic or extrinsic data regarding objects, e.g., candidate target objects, including but not limited to locations of such objects, or one or more dimensions (such as lengths, widths, heights, diameters or weights), shapes or other aspects of such objects. As is shown in FIG. 1C, the seed box is represented in the depth image 130-1 by a two-dimensional box 135-1, and in the depth image 130-2, the visual image 130-3 and the visual image 130-4 by two-dimensional boxes 135-2, 135-3, 135-4.

Figure 1D:
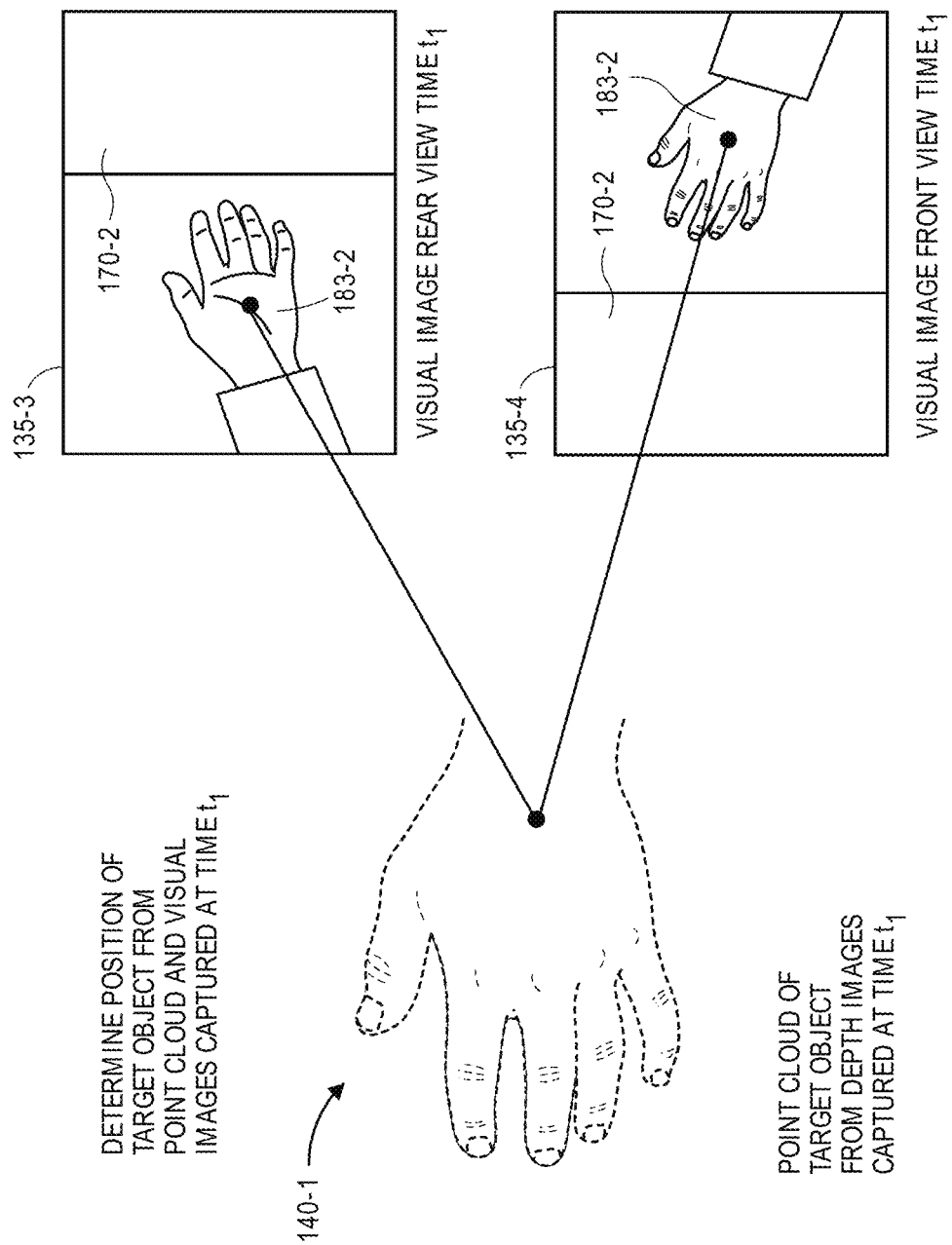

An initial position of the left hand 183-2 may be determined based on the depth images 130-1, 130-3 and the visual images 130-2, 130-4. As is shown in FIG. 1D, a point cloud (or depth model) 140-1 of the left hand 183-2 may be defined from the depth images 130-1, 130-3, e.g., depth information within the boxes 135-1, 135-2, and correlated with the visual images 130-2, 130-4, viz., representations of the target object within the boxes 135-2, 135-4, that are captured at a synchronized time $t_1$. Additionally, predictions of locations of the target object at time $t_1$ may be determined based on any colors, textures, outlines or other aspects of the object that are present within a two-dimensional representation of the seed box within the visual images 130-2, 130-4. The pixels or groups of pixels corresponding to the target object within the visual images 135-2, 135-4 may be correlated with one another, with respect to the point cloud 140-1, e.g., by triangulation. An initial position of the target object at time $t_1$, viz., the left hand 183-2 of the operator 180-2, may then be added to a tracklet or other record of positions of the target object. The initial position may be represented by coordinates of one or more points in space associated with the target object, including but not limited to a center or centroid of the target object, one or more representative points, or a set of points corresponding to the target object in 3D space.

After the initial position of the left hand 183-2 at time $t_1$ has been determined, the left hand 183-2 may be further tracked within the materials handling facility 120 as long as the left hand 183-2 remains within a field of view of at least one of the cameras 125-1, 125-2, 125-3, 125-4, 125-5, 125-6, 125-7, 125-8, 125-9. The left hand 183-2 may be tracked within the visual images, e.g., from frame-to-frame, using any number of tracking algorithms or systems, such as a kernelized correlation filter (or "KCF") tracker, that may predict an appearance of the left hand 183-2 in a current visual image frame based on the appearances of the left hand 183-2 determined from previous visual image frames. Such algorithms or systems may operate on a centralized server or other computer device, or by one or more external or distributed computer devices, including but not limited to one or more computer processors operating on one or more of the cameras 125-1, 125-2, 125-3, 125-4, 125-5, 125-6, 125-7, 125-8, 125-9. Additionally, such tracking algorithms or systems may be further trained to predict positions of the left hand 183-2 in a visual image captured by a camera based on positions of the left hand 183-2 determined using one or more other cameras, and also to refine its learning of both the position and the appearance of the left hand 183-2.

The left hand 183-2 may also be tracked within depth images, e.g., in point clouds generated from the depth images. Points or scores may be assigned to pixels that appear in synchronized visual images and/or depth images captured from one or more calibrated cameras at (or about) a given time. For example, each of the pixels of the visual images may be scored based on probabilities that such pixels correspond to the target object, viz., the left hand 183-2, and each of such pixels from all of the visual images captured at a given time may be projected onto points of a point cloud, e.g., the point cloud 140-1, generated from depth images captured at the given time. In some implementations, a plurality of volumetric regions corresponding to intersections of line segments extending from cameras to portions of visual images and point clouds may be discretized and combined according to one or more algorithms, e.g., a three-dimensional Bresneham line algorithm.

In some implementations, scores determined for pixels of all available visual images that include a target object within their respective views may be aggregated for each point of the point cloud. Points of the point cloud having maximum scores, in the aggregate, may be assigned to a maximum score set, and determined to correspond to the target object at the given time. A total hypothesis of the target object, at the given time, will be defined as a three-dimensional region centered at a median of the maximum score set, e.g., according to a "voting" algorithm that exploits the geometry of the calibrated cameras 125-1, 125-2, 125-3, 125-4, 125-5, 125-6, 125-7, 125-8, 125-9 to estimate a position of one or more points in 3D space that correspond to the target object. For example, a position of the left hand 183-2 at the time $t_1$ may be determined by any mathematical or statistical procedure, such as by ranking or scoring one or more of the pixels or groups of pixels appearing within one or both of the visual images 130-2, 130-4, and projecting such pixels onto the point cloud 140-1 defined based on the depth images 130-1, 130-3 according to a voting algorithm that selects one or more of the points of the point cloud 140-1 having the highest total number of scores. Alternatively, probabilities (e.g., probability maps) may be assigned to each of the pixels, or regions of pixels, appearing in visual images, and used to estimate the motion of the target object, thereby enhancing predictions of the presence of the left hand 183-2 in subsequently captured visual images.

Figure 1E:
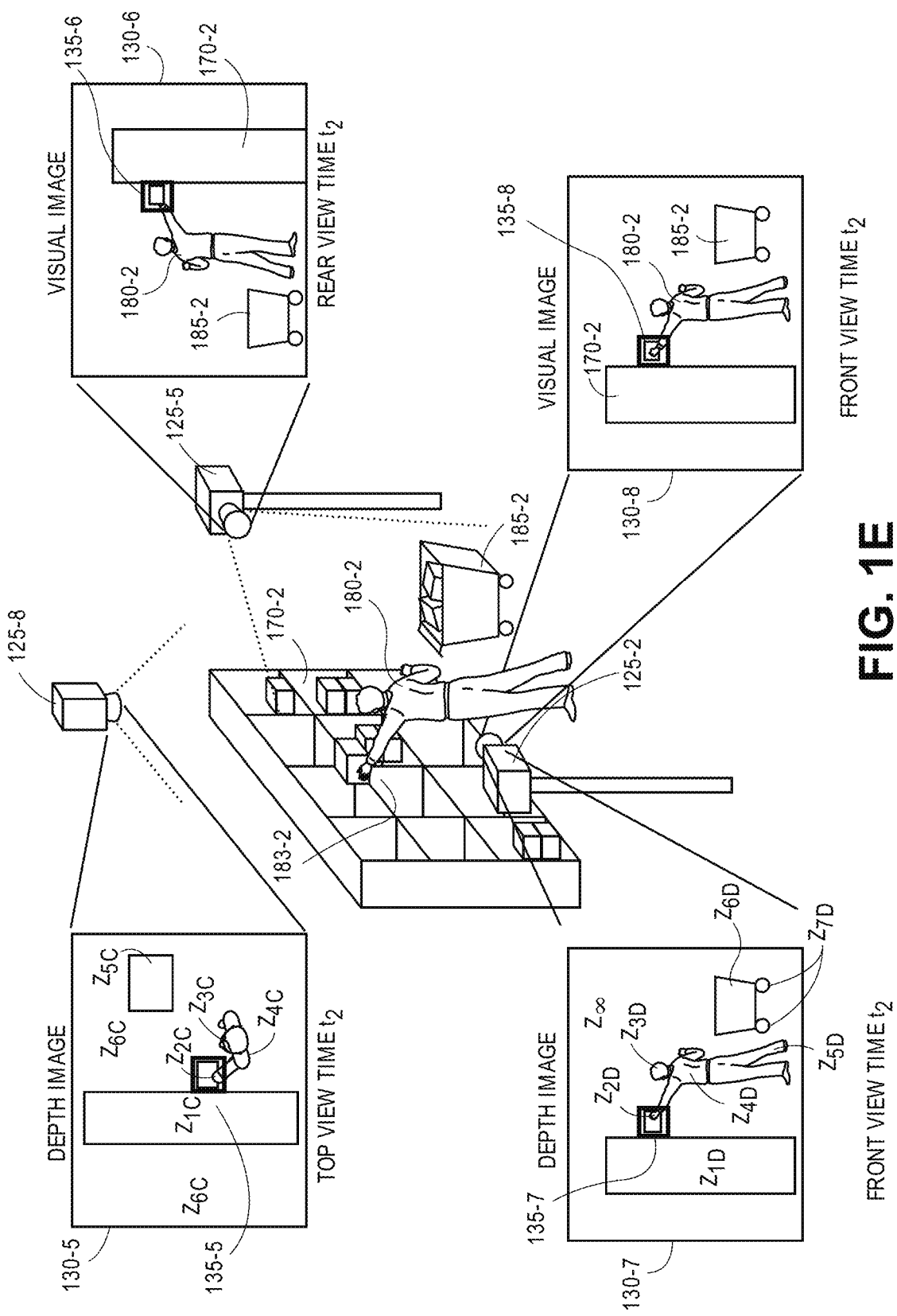

The position of the left hand 183-2 at the time $t_1$ may be used to train one or more of the tracking algorithms to recognize the left hand 183-2 in visual image frames captured at later times. For example, positions of points in 3D space that correspond to the left hand 183-2 may be determined based on hypotheses of such positions of the left hand 183-2 determined by each of the cameras, such as by selecting a set of pixels in the visual images captured at a synchronized time having a maximum score, or scores in excess of a threshold, or by determining probabilities of such positions of the left hand 183-2 that are associated with such pixels or regions, and associating scores of such pixels with points of a point cloud generated based on depth images captured at the synchronized time, e.g., according to a voting algorithm. For example, as is shown in FIG. 1E, a depth image 130-5, a visual image 130-6, a depth image 130-7 and a visual image 130-8 are captured by the camera 125-8, the camera 125-5, and the camera 125-2 at time $t_2$. The depth images 130-5, 130-7 and the visual images 130-6, 130-8 each depict a retrieval of an item from the shelving unit 170-2 by the left hand 183-2. For example, the depth image 130-5 includes depth or ranging data regarding distances from the camera 125-8 to objects within its field of view at time $t_2$, including a distance $z_{1C}$ to an upper surface of the shelving unit 170-2, a distance $z_{2C}$ to the left hand 183-2 clutching the item, a distance $z_{3C}$ to a head of the operator 180-2, a distance $z_{4C}$ to a torso of the operator 180-2, a distance $z_{5C}$ to upper surfaces of the cart 185-2, and a distance $z_{6C}$ to a floor of the materials handling facility 120 in a vicinity of the shelving unit 170-2. The depth image 130-7 similarly includes depth or ranging data regarding distances from the camera 125-2 to objects within its field of view at time $t_2$, including a distance $z_{1D}$ to a left face of the shelving unit 170-2, a distance $z_{2D}$ to the left hand 183-2 clutching the item, a distance $z_{3D}$ to the head of the operator 180-2, a distance $z_{4D}$ to the torso of the operator 180-2, a distance $z_{5D}$ to a right leg of the operator 180-2, a distance $z_{6D}$ to a basket or a bin of the cart 185-2, and a distance $z_{7D}$ to wheels of the cart 185-2. The visual images 130-6, 130-8 depict colors, textures, outlines or other aspects of objects within the fields of view of the cameras 125-5, 125-2 at time $t_2$, including but not limited to colors, textures, outlines or other aspects of the shelving unit 170-2, the operator 180-2 and the cart 185-2, as well as the left hand 183-2 clutching the item, from the perspectives of the camera 125-5 and the camera 125-2.

Figure 1F:
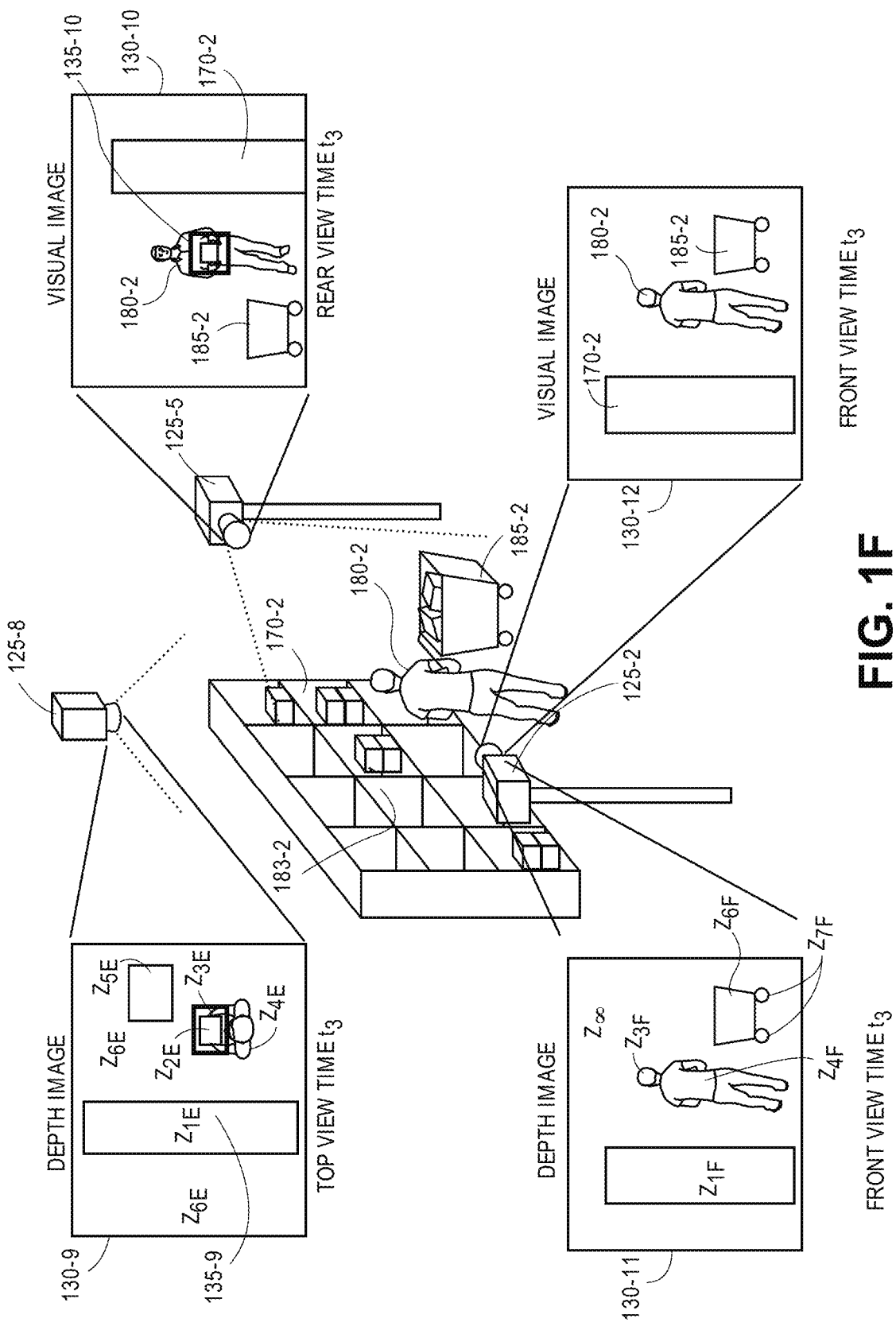
Figure 1G:
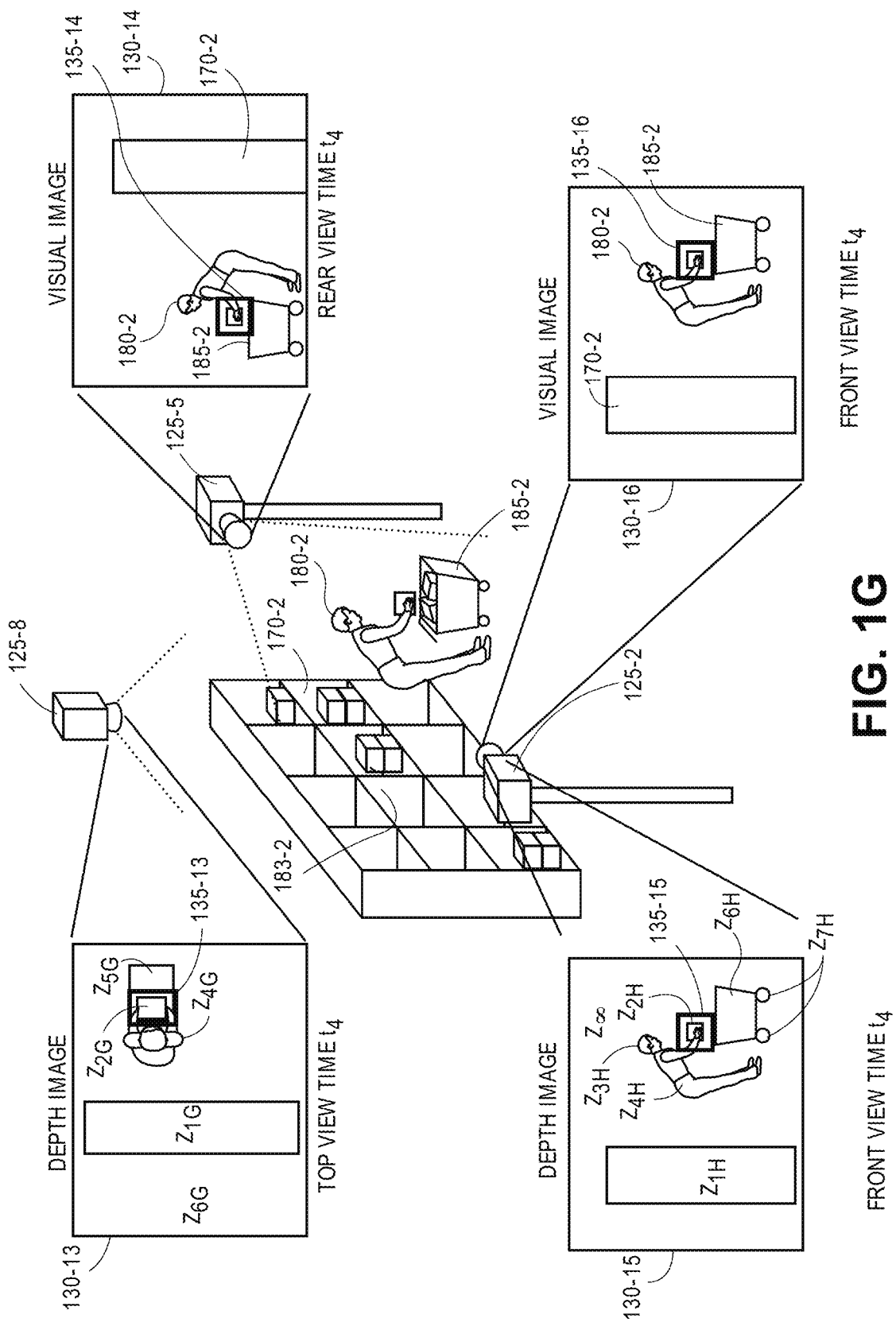

As is shown in FIG. 1F, depth images 130-9, 130-11 and visual images 130-10, 130-12 are captured by the camera 125-8, the camera 125-5, and the camera 125-2 at time $t_3$, as the operator 180-2 turns toward the cart 185-2 while clutching the item. The depth images 130-9, 130-11 include depth or ranging data regarding distances from the cameras 125-8, 125-5, 125-2 to objects within their respective fields of view at time $t_3$, while the visual images 130-10, 130-12 depict colors, textures, outlines or other aspects of such objects at time $t_3$. The left hand 183-2 of the operator 180-2 is occluded in the depth image 130-11 and the visual image 130-12. Similarly, as is shown in FIG. 1G, depth images 130-13, 130-15 and visual images 130-14, 130-16 are captured by the camera 125-8, the camera 125-5, and the camera 125-2 at time $t_4$, as the operator 180-2 deposits the item into the cart 185-2. The depth images 130-13, 130-15 include depth or ranging data regarding distances from the cameras 125-8, 125-5, 125-2 to objects within their respective fields of view at time $t_4$, while the visual images 130-14, 130-16 depict colors, textures, outlines or other aspects of such objects at time $t_4$. The left hand 183-2 of the operator 180-2 is occluded in the depth image 130-15 and the visual image 130-16.

Based on the visual images and the depth images captured while the left hand 183-2 is actively present within the fields of view of at least one of the cameras 125-1, 125-2, 125-3, 125-4, 125-5, 125-6, 125-7, 125-8, 125-9, actual positions of the left hand 183-2 within 3D space may be determined for each and every point in time, based on correlations between hypothetical positions of the left hand 183-2 determined from point clouds generated from the depth images and hypothetical positions of the left hand 183-2 determined from the visual images. As is shown in FIG. 1H, correlated portions of the visual images 130-6, 130-8 captured at time $t_2$ that correspond to the left hand 183-2, e.g., as identified by a trained tracking algorithm, and are included in the boxes 135-6, 135-8 may be projected onto a point cloud 140-2 generated from the depth images 130-5, 130-7 captured at time $t_2$. A voting algorithm that selects the best or most appropriate positions of the left hand 183-2 expressed in the point cloud 140-2 (or in the depth images 130-5, 130-7) based on the projected portions of the visual images 130-6, 130-8 may then be executed to determine an actual position of the left hand 183-2 (e.g., a position of a center or centroid of the left hand 183-2, positions of each of a set of points in 3D space that correspond to the left hand 183-2, or a position of a representative point of the set of points) at time $t_2$. Because the cameras are calibrated, voting line segments extending from lenses or other optical elements of the respective cameras through the corresponding pixels or regions of pixels corresponding to the left hand 183-2 within each of the visual images 130-6, 130-8 of the left hand 183-2 captured by such cameras at (or about) time $t_2$, and volumetric regions corresponding to intersections of two or more sets of such line segments may be mapped to points of the point cloud 140-2 and determined to represent a position of the left hand 183-2 at time $t_2$. In some implementations, information regarding a position of the left hand 183-2 at time $t_2$ may be used to further train the tracking algorithm, as necessary, to recognize the position and/or the appearance of the left hand 183-2 within visual images that are subsequently captured.

Similarly, a position of the left hand 183-2 at time $t_3$ may be determined by correlating portions of the visual image 130-10 captured at (or about) time $t_3$ that correspond to the left hand 183-2, e.g., as identified by the trained tracking algorithm, and are included in the box 135-10, and projecting such portions onto a point cloud 140-3 generated from the depth image 130-9 captured at (or about) time $t_3$. A voting algorithm that selects the most appropriate position of the left hand 183-2 expressed in the point cloud 140-3 (or in the depth image 130-9) based on the projected portions of the visual image 130-10 may then be executed to determine the position of the left hand 183-2 at (or about) time $t_3$. Because the left hand 183-2 is occluded in the depth image 130-11 and the visual image 130-12 captured at time $t_3$, the depth image 130-11 and the visual image 130-12 may not be used to determine the position of the left hand 183-2 at time $t_3$.

Likewise, a position of the left hand 183-2 at time $t_4$ may be determined by correlating portions of the visual image 130-15 captured at time $t_4$ that correspond to the left hand 183-2, e.g., as identified by the trained tracking algorithm, and are included in the box 135-15, and projecting such portions onto a point cloud 140-4 generated from the depth image 130-13 captured at time $t_4$. A voting algorithm that selects the best or most appropriate position of the left hand 183-2 expressed in the point cloud 140-4 (or in the depth image 130-13) based on the projected portions of the visual image 130-14 may then be executed to determine the position of the left hand 183-2 at time $t_4$. Because the left hand 183-2 is occluded in the depth image 130-15 and the visual image 130-16 captured at time $t_4$, the depth image 130-15 and the visual image 130-16 may not be used to determine the position of the left hand 183-2 at time $t_4$.

Figure 1I:
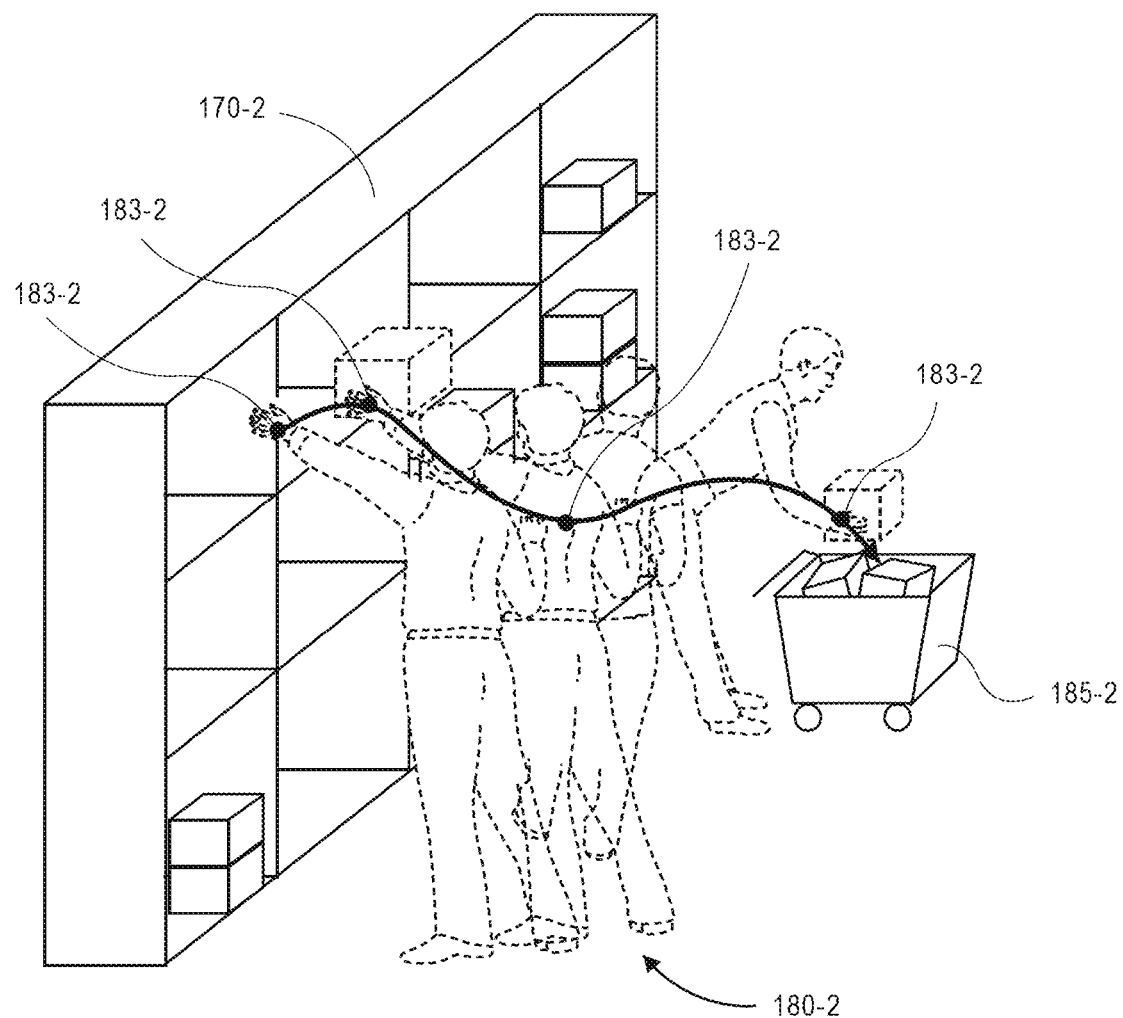

Positions of the left hand 183-2 determined based on depth images 130-1, 130-3, 130-5, 130-7, 130-9, 130-11, 130-13, 130-15 or point clouds 140-1, 140-2, 140-3, 140-4 generated therefrom and visual images 130-2, 130-4, 130-6, 130-8, 130-10, 130-12, 130-14, 130-16 are added to a tracklet representative of the motion of the left hand 183-2 while the left hand 183-2 is visible to at least one of the cameras 125-1, 125-2, 125-3, 125-4, 125-5, 125-6, 125-7, 125-8, 125-9 within the materials handling facility 120. As is shown in FIG. 1I, a tracklet representative of the motion of the left hand 183-2 over each of the points in time during the period in which the left hand 183-2 was visible to at least one of cameras 125-1, 125-2, 125-3, 125-4, 125-5, 125-6, 125-7, 125-8, 125-9 within the materials handling facility 120 is shown.

Accordingly, implementations of the systems and methods of the present disclosure may be used to track objects that are in motion in 3D space within materials handling facilities or like environments using imaging data (e.g., visual images and/or depth images) captured using RGB cameras, RGBD cameras, or other imaging devices. Such implementations may establish a "seed box," or a 3D bounding region around an initial position of a target object to be tracked within a scene (e.g., a position of a center or a centroid of the target object, or of a set of points corresponding to the target object, or of a representative point of the set of points), based on a depth image of the scene, a visual image of the scene, or any other relevant information or data regarding the scene. The seed box may be defined based on any triggering event, including one or more events that may be recognized in imaging data captured by any type or form of imaging device, as well as events that may be captured, sensed or detected in any other type or form of information or data. For example, the information or data on which a seed box may be defined may include intrinsic or extrinsic information or data regarding locations, dimensions, shapes or other aspects of objects that may aide in the identification and/or selection of such boxes according to the present disclosure. Additionally, the seed box may be defined or oriented with respect to one or more points in space, including but not limited to a center or centroid of the target object at a predicted initial position, or with respect to one or more of a collection of points corresponding to the object (e.g., one or more representative points), which may but need not include a center or a centroid of the target object.

One or more imaging devices, including both visual cameras and depth cameras, may be synchronized and configured to begin capturing imaging data from the scene. An active set of the imaging devices that include the target object within their fields of view, and in a sufficiently unoccluded manner, may be identified, and visual images and depth images of the target object may be captured at a synchronized time. A visual image may be an image channel or file captured from a scene by an imaging device, with the visual image including a plurality of pixels, and each of the pixels representing one or more color values for visible light captured by an image sensor from a portion of the scene that corresponds to one of the pixels (e.g., black-and-white, grayscale, or color according to any standard or color model, such as RGB, CMYK or the like). A depth image is an image channel or file captured from a scene by an imaging device, with the depth image including a plurality of pixels, and each of the pixels representing a range or distance from an image sensor to a portion of the scene that corresponds to one of the pixels. Alternatively, any other type of imaging data may be captured by imaging devices and utilized in accordance with one or more implementations of the present disclosure, including but not limited to infrared images, radiographic images or any other representations of captured light.

A point cloud (or depth model) of a target object may be defined based on one or more of the depth images, and one or more 2D hypothetical positions of the target object may be predicted based on portions of the target object identified in the visual images using a tracking algorithm, e.g., an Open Source Computer Vision (or OpenCV) tracker or a KCF tracker. A point cloud may be a representation of depth data, or formed from depth data, corresponding to an object in which individual points in space that are associated with the object have coordinates defining their respective locations relative to an imaging system. A point cloud may be defined as a grouping of data points, with each point at a different location on a surface of an object. Each data point may have a set of coordinates according to a standard coordinate system (e.g., a rectangular or Cartesian coordinate system, a polar coordinate system). For example, in one implementation, the coordinates may define a position within a Cartesian space having three orthogonal axes, e.g., an x-axis, a y-axis and a z-axis, and the coordinates may be expressed as (x, y, z) with respect to such axes. The coordinates may further include a distance value, such that for each pixel designated with an x coordinate and a y coordinate with respect to an imaging sensor, and the distance from the imaging sensor to an object represented by that pixel being designated with a z coordinate.

A point cloud may be provided in an ordered form or an unordered form. Ordered point cloud data further includes a representation of a relationship between points. For example, ordered point cloud data may include a vector from one point to another, or may be expressed as a linked list of points. In some implementations, ordered point cloud data may be uniform in spatial distribution, such as in a regularly gridded two-dimensional or three-dimensional array. Unordered point cloud data may include data points in which information about relationships between such points is not known or included. Additionally, unordered point cloud data need not be uniform in spatial distribution. For example, unordered point cloud data provided by a 3D sensor may have data points which do not readily fit within a regularly gridded two-dimensional or three-dimensional array.

In some implementations, hypothetical positions of a target object may correspond to a hypothetical center or centroid of the target object, or a hypothetical set or collection of one or more points corresponding to the object (e.g., one or more representative points). The hypothetical positions may but need not be correlated with one another and a point cloud to identify a position of the target object at the synchronized time (e.g., a position of a center or centroid of the target object at the synchronized time, or a set or collection of one or more points, such as representative points, corresponding to the target object at the synchronized time), and the position may be added to a "tracklet" or other record of the positions of the target object within the scene. If a target object remains sufficiently visible within the scene, each of the imaging devices may be advanced to a next frame, the active set of the imaging devices may be updated accordingly, and the process for determining a position of the target object may be repeated accordingly. Information regarding positions determined by correlations between hypothetical positions and a point cloud may be used to train a tracking algorithm, as necessary. For example, after a position of a target object in 3D space has been determined based on visual images and depth images, the position may then be projected into each of the imaging devices from which the visual images and the depth images were captured, and used to train each of the imaging devices to recognize an appearance of the target object in subsequently captured visual images and depth images.

For example, in some implementations, a 3D location of a target object may be deduced from 2D hypothetical positions determined from visual images in which the target object is visible and is not substantially occluded, e.g., where the object has a low percentage of occlusion, that are captured by one or more imaging devices (e.g., RGB cameras). For each imaging device in which at least a portion of a bounding region has a non-zero depth value, pixels corresponding to a 2D hypothetical position of a target object (e.g., as defined by a tracking algorithm or other technique) may be back-projected therein, and a position of the target object in 3D space may be determined accordingly. In some implementations, the 3D position may be determined to be a region such as a cube or a sphere having a volume defined by a fixed rectangular or axial distance (e.g., ten centimeters) from a point and/or one or more axes.

In some implementations, where imaging devices do not have non-zero depth values at within 2D representations of 3D bounding regions, a set of points within a view frustrum defined by such a 2D representation, e.g., a pyramidal section in 3D space that includes all points of a point cloud that are projected to a rectangle or other section corresponding to the 2D representation. Each point of a point cloud is assigned a score according to its location, e.g., whether the point is within a view frustrum and/or representation of a bounding region for each of the imaging devices. In some implementations, the scores may be weighted based on their percentage of occlusion and/or aggregated based on a number of view frustrums in which such points appear. Points having maximum scores may be selected, and a 3D position of the object may be defined as a box or volume having any other shape that is centered or oriented with respect to one or more points having a maximum score, or points having scores above a predetermined threshold.

In some implementations, a voting algorithm or technique may be used to estimate a joint object position probability distribution in 3D space based on responses obtained from 2D tracking algorithms or other techniques and the geometry of two or more calibrated cameras. In each of such cameras, a tracking algorithm (e.g., an OpenCV tracker or a KCF tracker) may be used to determine a filter response for visual images captured thereby, and the filter response may include a probability map for an entire field of view, rather than specific pixels. The response pixels may be back-projected as lines and/or line segments in 3D space, including not only response pixels having maximum values but also response pixels having values above a predetermined threshold (e.g., a weighted or unweighted threshold). Such line segments may be discretized, e.g., according to a 3D Bresenham algorithm, and a vote may be determined based on the intersections of the lines or line segments.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure are directed to tracking objects in 3D space based on visual images (e.g., RGB images) and depth images (e.g., depth or ranging data), or any other type of images, that are captured using multiple imaging devices having fields of view that overlap on a scene, such as interior or exterior portions of a materials handling facility, a transportation center, a financial institution, or any other environment. In particular, some implementations of the present disclosure are directed to establishing an initial position of a target object bounded by a 3D bounding region, or a "seed box," for the target object, and capturing visual images and depth images using multiple RGB and/or RGBD imaging devices that are synchronized. The 3D bounding region or seed box may be selected or defined in any manner, and may take any shape or form. For example, in some implementations, the 3D bounding region may be a region such as a cube or a sphere having a volume defined by a fixed rectangular or axial distance (e.g., ten centimeters) from a position and/or one or more axes. Alternatively, in some implementations, the 3D bounding region need not take the shape of a "box," e.g., a rectangularly shaped volume, and may have any other shape or volume, such as round, cylindrical, pyramidal, oblong, or any other regular or irregular shape or volume. The 3D bounding region may also be recognized in any manner, including based on one or more triggering events, e.g., in response to the lifting of an item from a shelf, the placement of an item onto a shelf, the entry or departure of a human actor (or a non-human actor or machine), or any other event that may be captured, sensed or recognized in information or data obtained by any type of sensor.

Thereafter, a synchronization point may be set for each of the imaging devices of the active set, e.g., by advancing each of the imaging devices one frame forward, and selecting the synchronization point as the earliest point in time of each of the next frames. A next location for the target object, e.g., within a next position of the 3D bounding region, may be predicted, and each of the visual images may be subsequently processed in order to determine which of such visual images includes the target object within their respective fields of view. An active set of such imaging devices, e.g., an active cameras set, may be defined accordingly. For example, a measure of an extent that the 3D bounding region appears within each of the fields of view may be calculated based on one or more visual images, and a measure of an extent to which the 3D bounding region is occluded may be determined within each of the fields of view may be calculated based on one or more depth images.

In some implementations, and for one or more (e.g., each) of the imaging devices of the active set, the presence of the target object within successive image frames may be determined using a tracking algorithm, such as an OpenCV tracker or a KCF tracker, which is used to predict a position of the target object in a next image frame based on a position of the target object in a 2D representation of the 3D bounding region in a previous frame. A 3D position of the target object is determined based on each of the positions of the target object predicted from image frames captured from the imaging devices of the active set, i.e., based on scores assigned to pixels that appear in visual images captured from more than one imaging device, or probabilities that such pixels correspond to the target object, and projected such pixels onto points of a point cloud generated from one or more depth images. The 3D position of the target object may be identified and/or represented in any manner, such as by coordinates of a center or centroid of the target object, coordinates of each of a set or a collection of points corresponding to the target object (e.g., in 3D space), or coordinates of one or more representative points corresponding to the target object. In some such implementations, pixels having the highest scores or the highest probabilities may be identified and selected, e.g., according to a voting algorithm, and a 3D position of the target object at a given time may be determined based on positions of one or more points of a point cloud corresponding to such pixels. The 3D position may then be back-projected into each camera, and used to further train the tracking algorithm to better recognize the target object in subsequently captured visual image frames.

Therefore, by using visual images and depth images to determine positions in 3D space, and training tracking algorithms to recognize objects based on such determined positions, some implementations of the systems and methods of the present disclosure may improve upon the computer-based tracking of target objects, thereby solving a fundamental computer vision problem. Visual images that are captured at a synchronization point and have occluded views of a target object may be identified using depth images captured at the synchronized point and excluded from consideration, thereby enhancing the efficiency of such processes in subsequently captured frames. The tracking of the target object may continue until a "stopping condition" is reached, e.g., until the target object is not visible within the fields of view of any imaging device, or until a point cloud insufficiently depicts the target object therein.

The systems and methods of the present disclosure may be utilized in any number of applications in which the tracking of objects appearing within multiple views is desired, including but not limited to tracking the motion of humans and/or machines within a materials handling facility, or tracking the motion of any other objects within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to track body parts of human operators (e.g., customers, workers or other personnel) and/or machines (e.g., autonomous mobile robots) and to recognize their respective interactions within a materials handling facility, including but not limited to interactions with one or more items (e.g., consumer goods) or other inanimate objects within the materials handling facility. Such systems and methods may also be utilized to track objects within transportation centers, financial institutions or like structures in which diverse collections of people, objects or machines enter and exit from such environments at regular or irregular times or on predictable or unpredictable schedules. By relying on multiple imaging devices, motion of an object may be tracked even when the object is occluded in one or more of the fields of view of the imaging devices.

Figure 2:
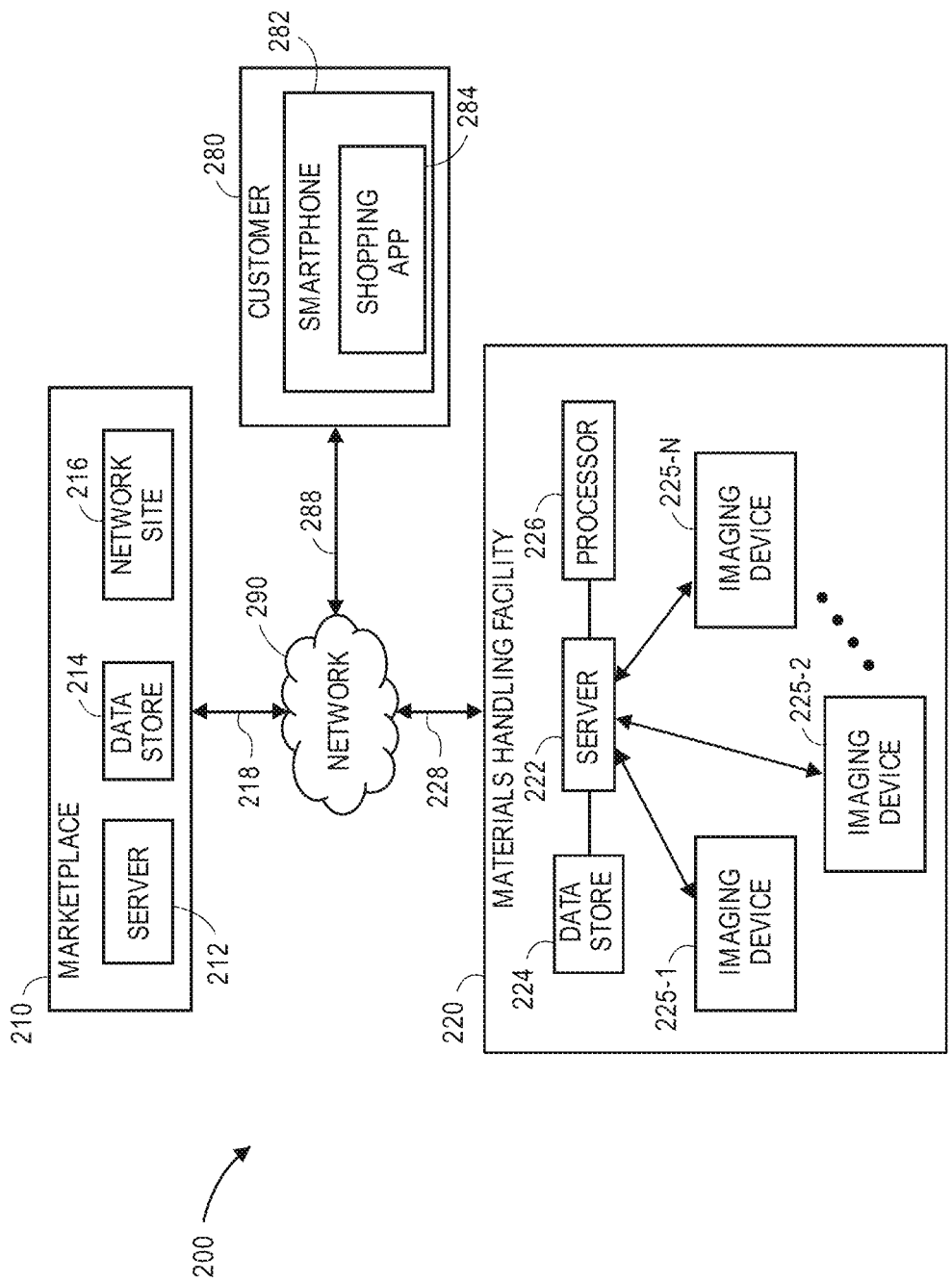
FIG. 2 is a block diagram of components of one system for tracking objects in 3D space using calibrated cameras in accordance with implementations of the present disclosure.

Referring to FIG. 2, a block diagram of components of one system 200 for tracking objects in 3D space using calibrated cameras in accordance with implementations of the present disclosure is shown. The system 200 includes a marketplace 210, a materials handling facility 220 and a customer (or actor, or worker, or another human operator) 280 that are connected to one another across a network 290, such as the Internet. Except where otherwise noted, reference numerals preceded by the number "2" shown in FIG. 2 indicate components or features that are similar to components or features having reference numerals preceded by the number "1" shown in FIGS. 1A through 1I.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores (e.g., databases) 214 for hosting a network site 216 (e.g., a web site). The marketplace 210 may be physically or virtually associated with one or more materials handling facilities, including but not limited to the materials handling facility 220. The network site 216 may be implemented using the one or more servers 212, which connect or otherwise communicate with the one or more data stores 214 as well as the network 290, as indicated by line 218, through the sending and receiving of digital data. The servers 212 may cause the display of information associated with the network site 216 in any manner, e.g., by transmitting code such as Hypertext Markup Language (HTML), over the network 290 to another computing device or resource that may be configured to generate and render the information into one or more pages or to cause a display of such pages on a computer display of any kind. Moreover, the data stores 214 may include any type of information regarding items that have been made available for sale through the marketplace 210, or ordered by customers (e.g., the customer 280) from the marketplace 210. The servers 212 may further execute any type of computer-based function or compute any type or form of calculation, including but not limited to any formulas, equations, algorithms or techniques for determining one or more probabilities or performing any number of statistical tests.

The materials handling facility 220 may be any facility that is adapted to receive, store, process and/or distribute items on behalf of the marketplace 210. The materials handling facility 220 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 220. Upon their arrival at the materials handling facility 220, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage facility or another like unit, such as in bins, on shelves or via other suitable storage mechanisms. The inventory shelves, storage facilities or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 220, inventory items that are listed in the request or order, or are desired by the user, may be selected or "picked" from an inventory area at the materials handling facility 220. For example, in one implementation, a customer or other user may travel through the materials handling facility 220 with a list (e.g., a paper list, or a handheld mobile device displaying or including such a list) and may pick one or more of the inventory items from an inventory area at the materials handling facility 220. In other implementations, an employee of the materials handling facility 220 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage facility) in an inventory area, moved a distance, and placed at a second location (e.g., a second inventory shelf or other storage facility) in the inventory area.

As is shown in FIG. 2, the materials handling facility 220 includes a networked computer infrastructure for performing various computer-related functions associated with the receipt, storage, processing and distribution of such items, including one or more physical computer servers 222, databases (or other data stores) 224 and processors 226, that may be provided in the same physical location as the materials handling facility 220, or in one or more alternate or virtual locations, e.g., in a "cloud"-based environment. In some implementations, the servers 222, the data stores 224 and/or the processors 226 or any number of other computing devices or resources may further execute any type of computer-based function or compute any type or form of calculation, including but not limited to any formulas, equations, algorithms or techniques for determining one or more probabilities or performing any number of statistical tests.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 220 may include one or more inventory areas having predefined two-dimensional or three-dimensional storage facilities for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 220 may further include one or more receiving stations featuring any apparatuses that may be required in order to receive shipments of items at the materials handling facility 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 220 may further include one or more distribution stations where items that have been retrieved from a designated inventory area may be evaluated, prepared and packed for delivery from the materials handling facility 220 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 220 may be transferred directly to a distribution station for further processing, or "cross-docked," without first being placed into storage in an intermediate inventory area. The materials handling facility 220 may also include one or more additional stations for receiving and distributing items to customers, as well as one or more conveying systems, autonomous mobile robots, or other manual or automated vehicles for transporting items between such stations or areas (not shown in FIG. 2). The materials handling facility 220 may operate one or more order processing and/or communication systems using computer devices or resources in communication with one or more of the servers 222, the data stores 224 and/or the processors 226, or through one or more other computing devices or resources that may be connected to the network 290, as is indicated by line 228, in order to transmit or receive information in the form of digital or analog data, or for any other purpose.

The imaging devices 225-1, 225-2 . . . 225-$n$ may be any form of optical recording device that may be used to photograph or otherwise record imaging data of structures, facilities or any other elements within the materials handling facility 220, as well as any items within the materials handling facility 220, or for any other purpose. The imaging devices 225-1, 225-2 . . . 225-n may be mounted in any specific location or orientation within the materials handling facility 220, e.g., above, below or alongside one or more inventory areas or stations for receiving or distributing items.

The imaging devices 225-1, 225-2 . . . 225-n may include one or more sensors, memory or storage components and processors, and such sensors, memory components or processors may further include one or more photosensitive surfaces, filters, chips, electrodes, clocks, boards, timers or any other relevant features (not shown). The imaging devices 225-1, 225-2 . . . 225-n may capture imaging data in the form of one or more still or moving images of any kind or form, as well as any relevant audio signals or other information, within one or more designated locations within the materials handling facility 220. In some implementations, one or more of the imaging devices 225-1, 225-2 . . . 225-n may be configured to capture depth imaging data, e.g., distances or ranges to objects within their respective fields of view. In some implementations, one or more of the imaging devices 225-1, 225-2 . . . 225-n may be configured to capture visual imaging data, e.g., visual images or image frames in color, grayscale or black-and-white.

For example, one or more of the imaging devices 225-1, 225-2 . . . 225-n may be an RGB color camera, a still camera, a motion capture/video camera or any other type or form of camera. In other implementations, one or more of the imaging devices 225-1, 225-2 . . . 225-n may be depth-sensing cameras, such as a RGBD (or RGBz) camera. In still other implementations, one or more of the imaging devices 242 may be a thermographic or infrared (IR) camera. Additionally, in some implementations, the imaging devices 225-1, 225-2 . . . 225-n may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 225-1, 225-2 . . . 225-n may be paired to provide stereo imagery and depth information, and may include a pair of camera modules. Additionally, imaging data may be stored in any variety of formats including, but not limited to, YUYV, RGB, RAW, .bmp, .jpeg, .gif, or the like.

The imaging devices 225-1, 225-2 . . . 225-n may also include manual or automatic features for modifying their respective fields of view or orientations. For example, one or more of the imaging devices 225-1, 225-2 . . . 225-n may be configured in a fixed position, or with a fixed focal length (e.g., fixed-focus lenses) or angular orientation. Alternatively, one or more of the imaging devices 225-1, 225-2 . . . 225-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 225-1, 225-2 . . . 225-n, or changes in one or more of the angles defining the angular orientation.

For example, one or more of the imaging devices 225-1, 225-2 . . . 225-n may be hard-mounted to a support or mounting that maintains the device in a fixed configuration or angle with respect to one, two or three axes. Alternatively, however, one or more of the imaging devices 225-1, 225-2 . . . 225-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 225-1, 225-2 . . . 225-n may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of networks including one or more of the imaging devices 225-1, 225-2 . . . 225-n, e.g., digital cameras, may be affected based on the lighting conditions and characteristics of the scenes in which the imaging devices 225-1, 225-2 . . . 225-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the materials handling facility 220 of FIG. 2 includes boxes corresponding to three imaging devices 225-1, 225-2 . . . 225-n, those of ordinary skill in the pertinent arts will recognize that any number or type of imaging devices may be provided within a materials handling facility in accordance with the present disclosure, including but not limited to digital cameras, depth sensors or range cameras, infrared cameras, radiographic cameras or other optical sensors.

The materials handling facility 220 may also include any number of other sensors, components or other features for controlling or aiding in the operation of the materials handling facility 220, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The customer 280 may be any entity or individual that wishes to manually or automatically retrieve, evaluate and/or purchase one or more items maintained in an inventory area of the materials handling facility 220, or to download, purchase, rent, lease, borrow or otherwise obtain items (e.g., goods, products, services or information of any type or form) from the marketplace 210. The customer 280 may utilize one or more computing devices, such as a smartphone 282 or any other like machine that may operate or access one or more software applications, such as a web browser (not shown) or a shopping application 284, and may be connected to or otherwise communicate with the marketplace 210, or the materials handling facility 220 through the network 290, as indicated by line 288, by the transmission and receipt of digital data. For example, the customer 280 may use the smartphone 282 or another like client device to interact with one or more computer devices and/or input/output devices within the materials handling facility 220, and for any purpose. Moreover, the customer 280 may retrieve items from the materials handling facility 220, and also receive deliveries or shipments of one or more items from facilities maintained by or on behalf of the marketplace 210, such as the materials handling facility 220.

Alternatively, or in addition to the customer 280, the materials handling facility 220 may also include one or more human operators (not shown), such as one or more workers, who may be any designated personnel tasked with performing one or more tasks within the materials handling facility 220 in general, or within one or more inventory areas, receiving stations, distribution stations or other locations of the materials handling facility 220 in particular. Such workers may handle or transport items (e.g., any type or form of good, product, media or other tangible consumer article) within the materials handling facility 220, or operate one or more pieces of equipment therein (not shown). The workers may also operate one or more specific computing devices or resources for registering the receipt, retrieval, transportation or storage of items within the materials handling facility 220, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the server 222, with one or more of the imaging devices 225-1, 225-2 . . . 225-n, or with one or more computer devices or resources, such as the server 212 or the smartphone 282, over the network 290, as well as a display (e.g., a touchscreen display) to facilitate the visible presentation to and interaction with a human operator. Such devices may be configured to store a unique identifier associated with a given human operator, and provide the unique identifier to the server 222 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 220.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "materials handling facility," or a "customer" (or "human operator" or "user") or like terms, may be automated steps performed by their respective computer devices or resources, or implemented within software modules (or computer programs) executed by one or more general purpose computers. Those of ordinary skill in the pertinent arts would also recognize that process steps described as being performed by a "marketplace," a "fulfillment center," or a "customer" (or "human operator" or "user") may be typically performed by a human, but could, alternatively, be performed by an automated agent.

The marketplace 210, the materials handling facility 220 and/or the customer 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the server 222 may be adapted to transmit information or data in the form of synchronous or asynchronous messages from the materials handling facility 220 to the server 212, the smartphone 282 or any other computer device (e.g., any device having any number of other servers, data stores, processors or the like) in real time or in near-real time, or in one or more offline processes, via the network 290. Those of ordinary skill in the pertinent arts would recognize that the marketplace 210, the materials handling facility 220 or the customer 280 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the server 212, the server 222, the imaging devices 225-1, 225-2 . . . 225-n or the smartphone 282, or any other computers or control systems utilized by the marketplace 210, the materials handling facility 220 or the customer 280 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3:
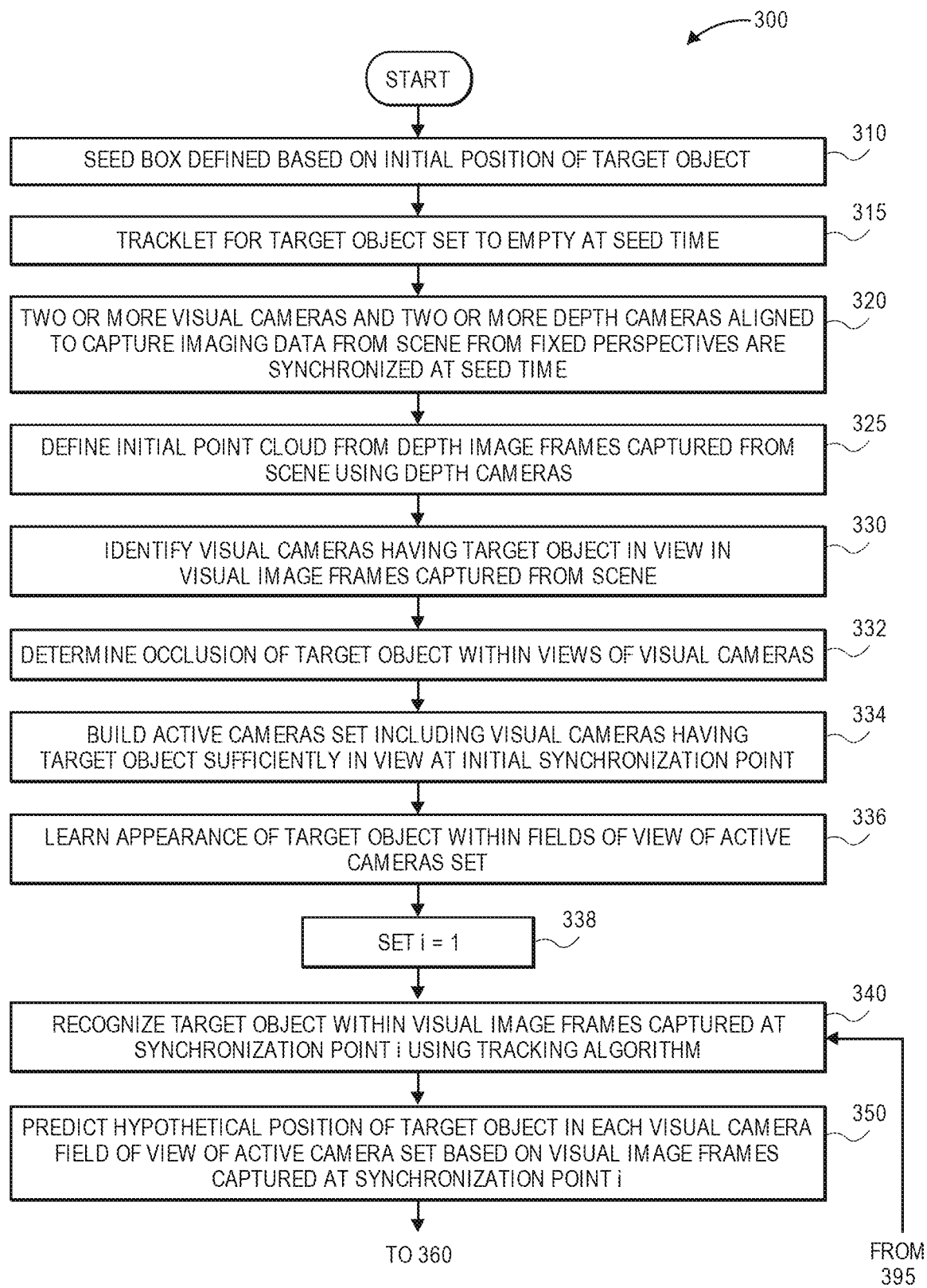
FIG. 3 is a flow chart of one process for tracking objects in 3D space using calibrated cameras in accordance with implementations of the present disclosure.
Figure 3:
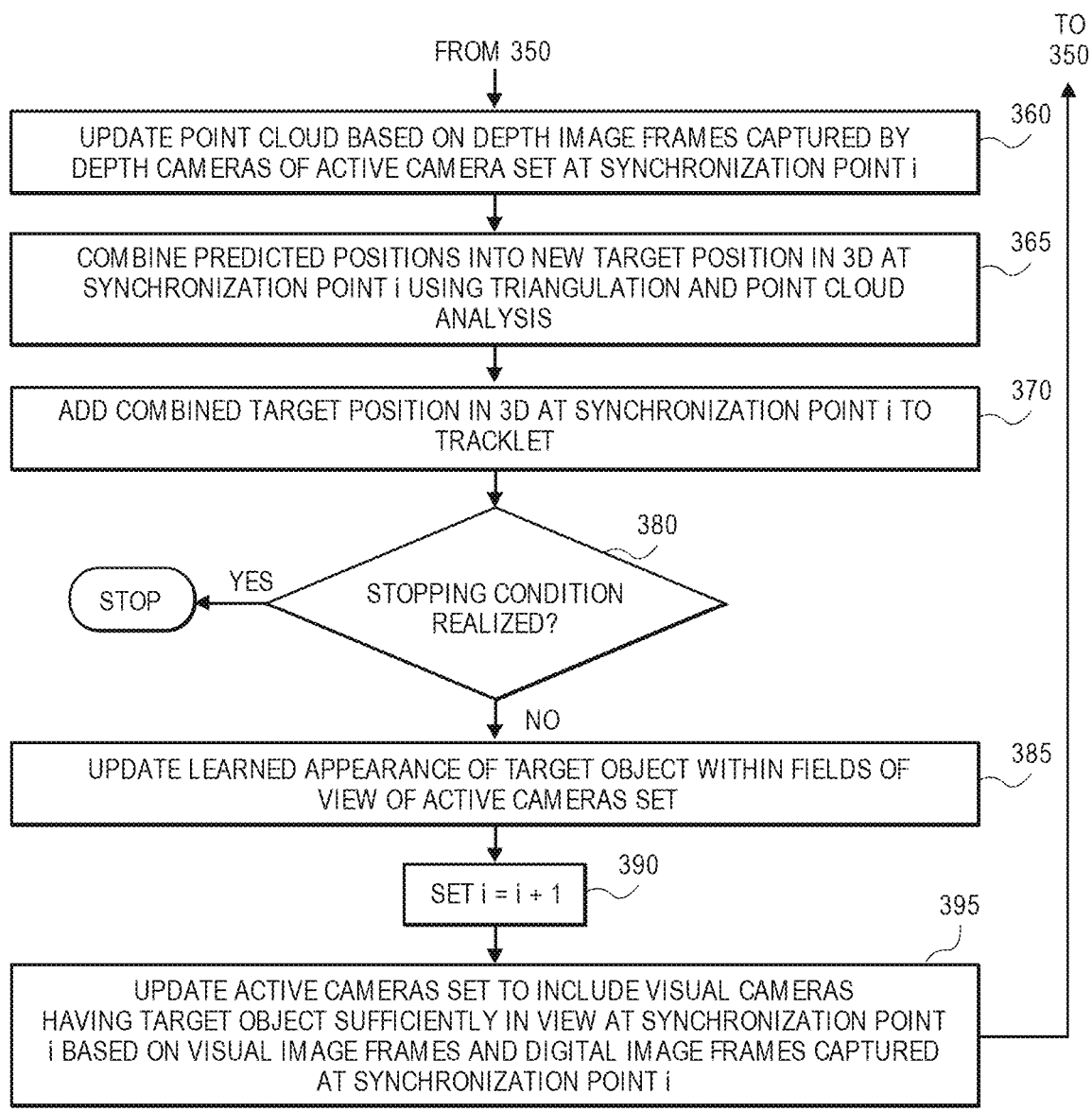

Referring to FIG. 3, a flow chart 300 of one process for tracking objects in 3D space using calibrated cameras in accordance with implementations of the present disclosure is shown. At box 310, a seed box is defined based on an initial position of a target object, e.g., at a seed time. The initial position of the target object may be determined as an output from an algorithm or on any basis, e.g., based on a single depth image, a single visual image, or one or more depth images or visual images, and used to determine a seed box, e.g., an initial bounding region, or a baseline position of a hypothetical 3D bounding region, from which tracking of a target object in a scene may be initiated. Additionally, as is discussed above, an initial position (or subsequent positions) of a target object may be identified and/or represented in any manner, such as by coordinates of a center or centroid of the target object, coordinates of each of a set or a collection of points corresponding to the target object (e.g., in 3D space), or coordinates of a representative point of the target object, which may or may not be a center or centroid of the target object. A seed box may also be defined with respect to the initial position at a seed time based on any intrinsic or extrinsic data that may be known regarding one or more objects (e.g., candidate target objects), including but not limited to locations, dimensions, shapes, or other aspects of such objects. For example, the seed box may be defined based on visual imaging data (e.g., colors, textures, outlines or other aspects of objects), depth imaging data (e.g., a point cloud), or any other information or data captured, sensed or detected regarding the scene, the target object, or the one or more imaging devices (e.g., in response to one or more triggering events).

At box 315, a tracklet for the target object (or a set of positions of the target object) is set to "empty," or reset, at a seed time associated with the initial position and the bounding region. At box 320, two or more visual cameras and two or more depth cameras that are aligned to capture imaging data from the scene from unique fixed perspectives are synchronized at the seed time. Alternatively, such cameras may be synchronized to a given frame, or a time when such frames are captured by one or more of the cameras, i.e., to an earliest such time among the cameras. In some implementations, the visual cameras and the depth cameras may be distinct systems or components. In some other implementations, however, the visual cameras and the depth cameras may be components of a common system, e.g., an RGBD camera.

At box 325, an initial point cloud is defined from depth image frames captured from the scene using one or more of the depth cameras. For example, where a depth image containing information relating to distances of surfaces of objects within a scene from a perspective of a depth camera is captured, the depth image may be converted into a 3D representation of the physical topography of the scene from that perspective using ranging information for one or more of the pixels provided in the depth image and parameters of the depth camera, e.g., a set of coordinates of the imaging sensor or other components of the depth camera. Two or more depth images captured using RGBD cameras from different perspectives may be further utilized to enhance the quality of the 3D representation of the scene. At box 330, visual cameras having the target object in view within visual image frames captured from the scene are determined. For example, where the 3D bounding region has been defined at box 310, an extent to which a 2D projection of the 3D bounding region appears within the fields of view of each of the imaging devices is determined. At box 332, the extent to which pixels corresponding to the target object are occluded (or not occluded) within the 2D projection of the 3D bounding region is determined, e.g., by comparing depth data for the target cloud points to depth data for other scene points within a frustrum spanned by the 3D bounding region.

At box 334, an active cameras set including the visual cameras that hold the target object sufficiently in view at an initial synchronization point is built. The active cameras set may be built based on a comparison between color images captured by the visual cameras and/or the depth cameras, and compared to the initial point cloud defined at box 325, to determine whether any of the visual images are occluded by one or more features represented in the point cloud. For example, referring again to FIGS. 1C, 1E, 1F and 1G, the left hand 183-2 of the operator 180-2 is occasionally occluded from the fields of view of one or more of the imaging devices 125-2, 125-5, 125-8 when one or more objects are located between the left hand 183-2 and the optical sensors or other elements of the imaging devices 125-2, 125-5, 125-8, such as when the left hand 183-2 is extended into the shelving unit 170-2, or when the operator 180-2 turns away from one or more of the imaging devices 125-2, 125-5, 125-8 or leans over the cart 185-2 and inserts the left hand 183-2 therein. At box 336, the appearance of the target object within the fields of view of the active cameras set is learned, for example, based at least in part on the extent to which the target object appears within visual image frames captured by the respective cameras, and one or more of the colors, textures, outlines or other features of the target object, e.g., according to one or more object recognition and/or tracking algorithms.

At box 338, a value of a step variable i is set at one. At box 340, the target object is recognized within one or more of the image frames captured at the synchronization point i using one or more tracking algorithms, and at box 350, a hypothetical position of the target object in each of the fields of view of the visual cameras of the active cameras set is predicted based on the visual image frames captured at the synchronization point i. For example, the target object may be recognized using one or more tracking algorithms, such as an OpenCV tracker, a KCF tracker, or any other tracker, which may operate in any manner, such as by recognizing differences between background pixels (e.g., stationary features) and foreground pixels (e.g., dynamic features) in an image, and associating foreground pixels with the target object. A hypothetical position of the target object within any given image may be defined in any manner, including but not limited to coordinates of one or more of the pixels corresponding to the target object within an image, which may be determined in any manner. Once the target object has been recognized in each of such image frames, a position of the target object may be predicted within such image frames, e.g., by triangulation, or by converting detections of the target object in such image frames to three-dimensional rays that begin at optical elements of the respective imaging devices and terminate at surfaces of objects within the given pixels, based on the intrinsic properties of such imaging devices and extrinsic properties of a scene, and merging the detections into one, e.g., by triangulating the rays corresponding to such detections.

At box 360, the point cloud is updated based on the depth image frames captured at the synchronization point i. For example, differences between the depth image frames from which the initial point cloud was defined and the depth image frames captured at the synchronization point i may be identified and used to update the initial point cloud. Alternatively, the initial point cloud may be replaced with a point cloud generated based on the depth image frames captured at the synchronization point i. At box 365, the hypothetical positions predicted at box 350 based on the visual image frames captured at the synchronization point i and the updated point cloud defined at box 360 based on the depth image frames captured at the synchronization point i are combined to determine a new target position of the target object in 3D space at the synchronization point i according to triangulation and/or an analysis of the updated point cloud. For example, the colors, textures, outlines or other features of the target object identified in the visual images may be projected in 3D space and correlated with the updated point cloud, to determine a position of the target object at the synchronization point i. A voting algorithm may be used to identify pixels in any of the visual images having sufficiently high levels of responsiveness from the tracker algorithm and to extend voting line segments therefrom, and regions where such voting line segments intersect may be assigned points or scores, with a highest number of points or scores corresponding to a most likely position of the target object in 3D space. For example, in some implementations, voting line segments may be discretized using a 3D Bresenham algorithm or any other technique, and response values may be assigned to corresponding volumetric bins. The new target position of the target object in 3D space at synchronization point i may be represented in any manner, such as by coordinates of a center or centroid of the target object, coordinates of each of a set or a collection of points corresponding to the object (e.g., in 3D space), or coordinates of a representative point of the target object, which may or may not be a center or centroid of the target object. The position of the target object in 3D space at synchronization point i, as determined at box 365 may then be returned to each of the imaging devices that predicted the position of the target object within visual image frames captured at synchronization point i at box 350, and used to train the tracking algorithms to predict locations of the target object in subsequently captured visual frames.

At box 370, the position of the target object in 3D space at synchronization point i determined at box 365 is added to the tracklet. At box 380, whether a stopping condition has been realized is determined. For example, a stopping condition may be an event that calls for an end to the tracking of the target object, such as when the object is no longer visible in any of the imaging devices at the scene (e.g., when the active cameras set does not include any cameras), when a maximum tracking time has elapsed, when a predetermined stopping time has been reached, when the updated point cloud does not include a sufficient number of points within a target volume corresponding to the 3D bounding region, or when an appearance of the target object is sufficiently different from an initial appearance of the target object, thereby indicating that the target object has changed, or that the target object is not the object that was originally tracked.

If a stopping condition has been realized, then the process ends. If the stopping condition has not been realized, however, then the process advances to box 385, where the learned appearance of the target object within the fields of view of the active cameras set is updated, e.g., based on the combination of the visual image frames with the updated point cloud. At box 390, the value of the step variable i is incremented by one, and at box 395, the active cameras set is updated to include visual cameras having the target object sufficiently in view at the synchronization point i based on visual image frames and digital image frames captured at synchronization point i, before returning to box 350, where a hypothetical position of the target object in each of the visual cameras of the active cameras set is predicted.

As is discussed above, where a plurality of imaging devices (e.g., one or more RGB cameras and one or more RGBD cameras) are aligned to capture imaging data from a scene that includes a target object, an active set of the imaging devices may be defined based on the imaging devices that include the target object within their respective fields of view, and the operation of the imaging devices may be synchronized accordingly, e.g., to simultaneous or nearly simultaneous operation, depending on the frame rates of the respective imaging devices of the active set.

Figure 4:
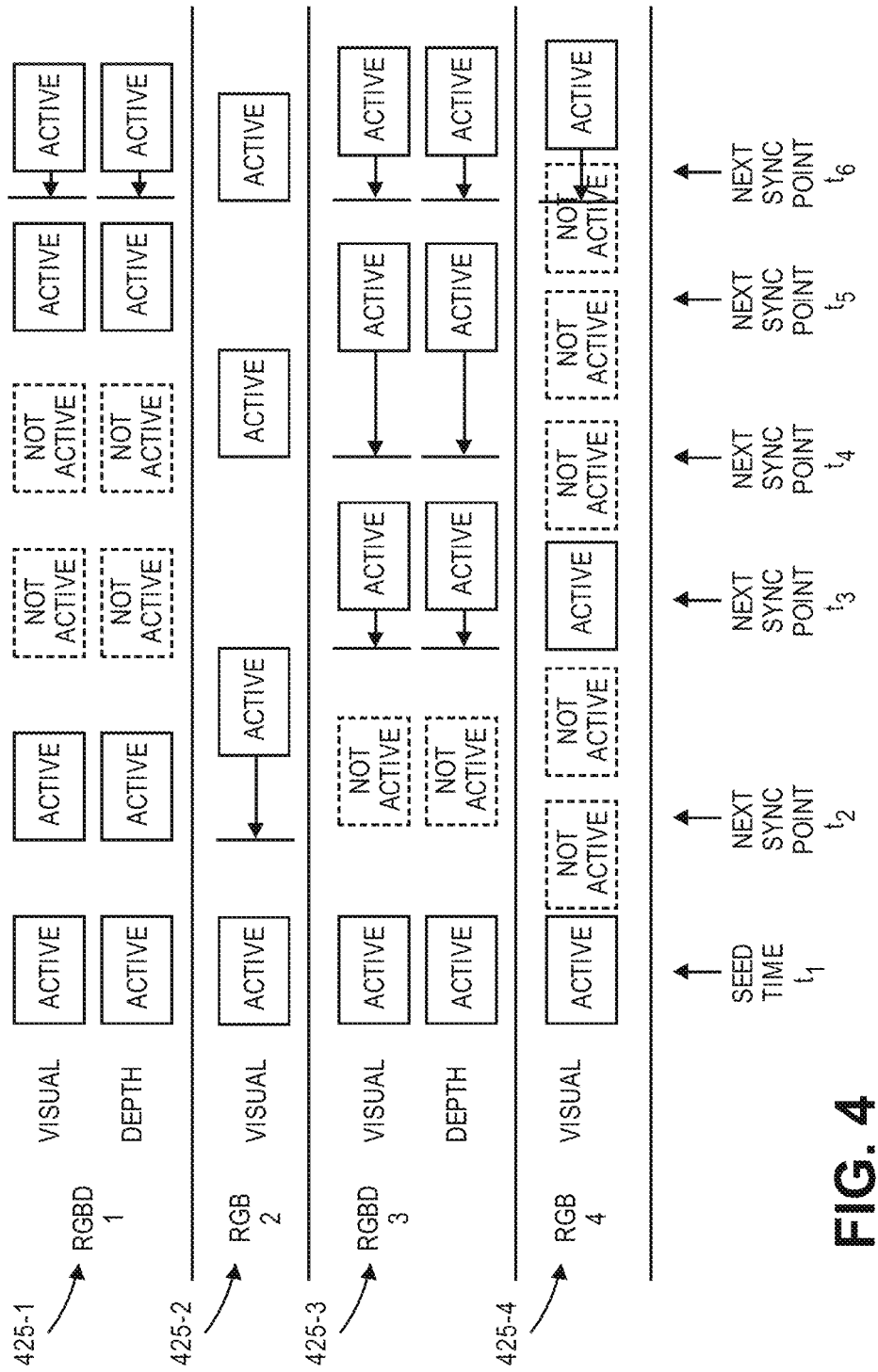
FIG. 4 is a view of data captured using one system for tracking objects in 3D space using calibrated cameras in accordance with implementations of the present disclosure.

Referring to FIG. 4, a view of data captured using one system for tracking objects in 3D space using calibrated cameras in accordance with implementations of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1I.

As is shown in FIG. 4, a plurality of frames are captured by each of four imaging devices (e.g., cameras) 425-1, 425-2, 425-3, 425-4, including an RGBD camera 425-1, an RGB camera 425-2, an RGBD camera 425-3 and an RGB camera 425-4. The operation of the imaging cameras 425-1, 425-2, 425-3, 425-4 may be synchronized to times or points, e.g., specific frames or times of such frames captured using one or more of the cameras 425-1, 425-2, 425-3, 425-4. For example, each of the available imaging devices (e.g., cameras of an active cameras set) may be synchronized to a given time, such as a seed time associated with an establishment of an initial position of a target object, and subsequently to later times or an earliest time of a next frame captured by the cameras of the active cameras set.

For example, the RGBD camera 425-1 is configured to capture a plurality of visual image frames and a plurality of depth image frames at a rate of approximately forty-five frames per second (45 fps), while the RGB camera 425-2 is configured to capture a plurality of visual image frames at a rate of approximately thirty frames per second (30 fps). The RGBD camera 425-3 is configured to capture a plurality of visual image frames and a plurality of depth image frames at a rate of approximately forty frames per second (40 fps), while the RGB camera 425-4 is configured to capture a plurality of visual image frames at a rate of approximately sixty frames per second (60 fps).

As is discussed above, the use of the cameras 425-1, 425-2, 425-3, 425-4 in tracking operations may be synchronized to a seed time, or a time associated with an initial position of a target object, and to later points or times associated with the subsequent capture of frames by active cameras of an active cameras set. For example, as is shown in FIG. 4, the RGBD camera 425-1 included a target object within its fields of view (e.g., its visual field of view and its depth field of view) in frames captured at a seed time $t_1$, and in a next pair of frames, but did not include the target object within its fields of view in the next two pairs of frames captured thereby. The target object returned to the fields of view of the RGBD camera 425-1 in its next two pairs of frames. The RGB camera 425-2, meanwhile, included the target object within its field of view over the first four frames captured thereby. The RGBD camera 425-3 included the target object within its fields of view in frames captured at the seed time $t_1$, but not in a next pair of frames. The target object returned to the fields of view of the RGBD camera 425-3 in its next three pairs of frames. Finally, the RGB camera 425-4 included the target object within its field of view in the first, fourth and eighth of the first eight frames captured thereby, and did not include the target object within its field of view in the second, third, fifth, sixth and seventh of the first eight frames captured thereby.

The tracking of the target object by the cameras 425-1, 425-2, 425-3, 425-4 may be synchronized to the seed time $t_1$, and to subsequent times when an earliest image frame is captured by the cameras of the active cameras set. For example, each of the cameras 425-1, 425-2, 425-3, 425-4 is deemed active at the seed time $t_1$, and the tracking of the target object at that time may be synchronized accordingly. A next synchronization point may be selected based on the capture of the visual image frames and the depth image frames by the RGBD camera 425-1 at time $t_2$, which is the earliest of the next image frames to be captured by an active camera, and the capture of the visual image frame by the RGB camera 425-2 slightly later than time $t_2$ may be synchronized to time $t_2$.

Thereafter, a next synchronization point may be selected based on the capture of a visual image frame by the RGB camera 425-4 at time $t_3$, and the capture of the visual image frame and the depth image frame by the RGBD camera 425-3 shortly thereafter may be synchronized to time $t_3$. Similarly, a next synchronization point may be selected based on the capture of a visual image frame by the RGB camera 425-2 at time $t_4$, and the capture of the visual image frame and the depth image frame by the RGBD camera 425-3 shortly thereafter may be synchronized to time $t_4$. A next synchronization point may be selected based on the capture of the visual image frame and the depth image frame by the RGBD camera 425-1 at time $t_5$, while a next synchronization point may be selected based on the capture of the visual image frame by the RGB camera 425-2 at time $t_6$, and the capture of the visual image frame and the depth image frame by the RGBD camera 425-1, the visual image frame and the depth image frame by the RGBD camera 425-3 and the visual image frame by the RGB camera 425-4 may be synchronized to time $t_6$.

As is also discussed above, where a plurality of imaging devices (e.g., RGB cameras and RGBD cameras) are used to track objects in 3D space, an imaging device may be defined as "active" where the imaging device includes a target object clearly, and in an unoccluded manner, within its field of view. As long as the target object appears clearly, and without sufficient occlusion, within a field of view of at least one imaging device, and no other stopping condition is met, the target object may be tracked within the scene using the imaging devices. Referring to FIGS. 5A through 5D, views of aspects of one system 500 for tracking objects in 3D space using calibrated cameras in accordance with implementations of the present disclosure are shown. Except where otherwise noted, reference numerals preceded by the number "5" shown in FIGS. 5A through 5D indicate components or features that are similar to components or features having reference numerals preceded by the number "4" shown in FIG. 4, by the number "2" shown in FIG. 2 or by the number "1" shown in FIGS. 1A through 1I.

Figure 5A:
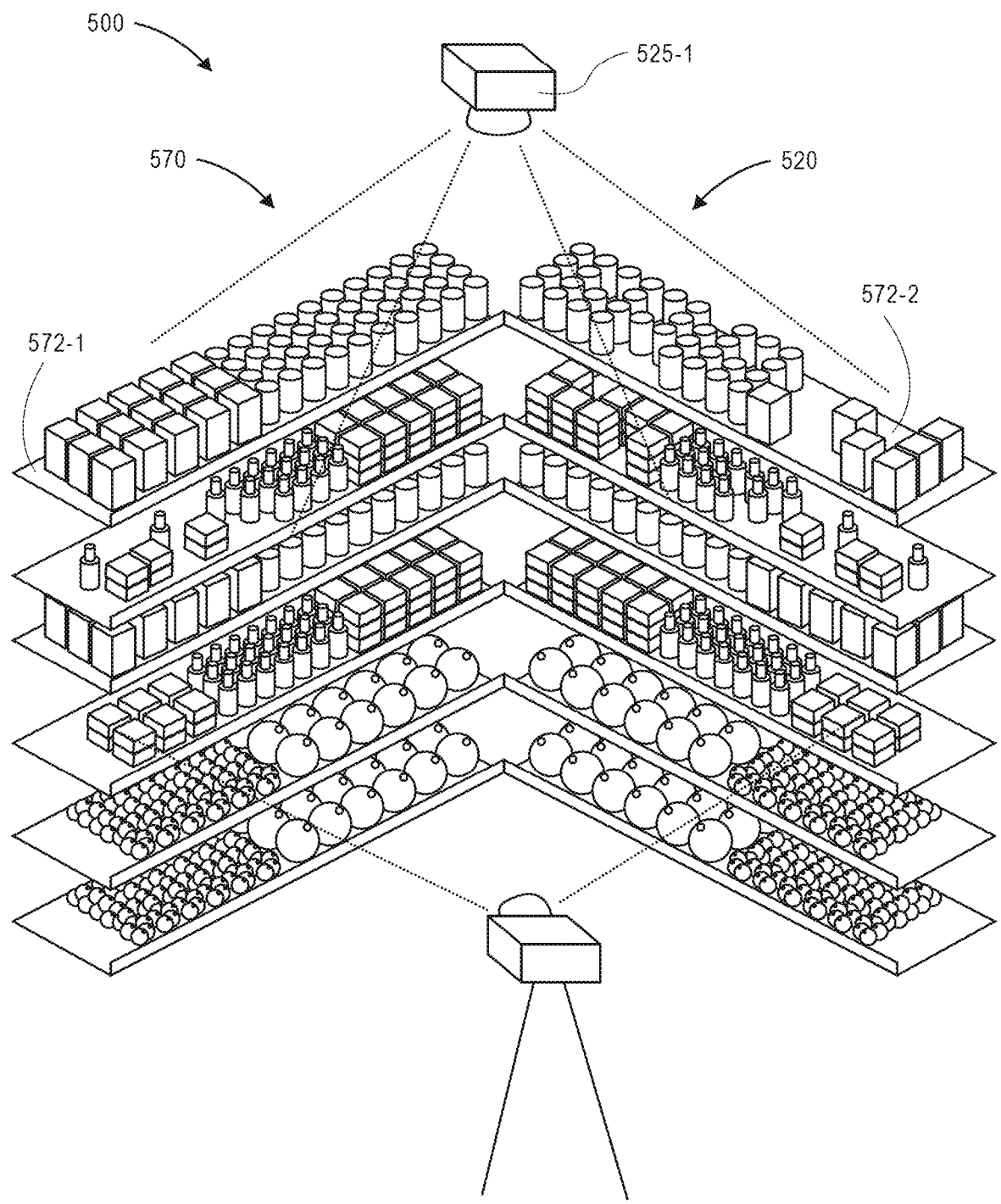
FIGS. 5A through 5D are views of aspects of one system for tracking objects in 3D space using calibrated cameras in accordance with implementations of the present disclosure.
Figure 5B:
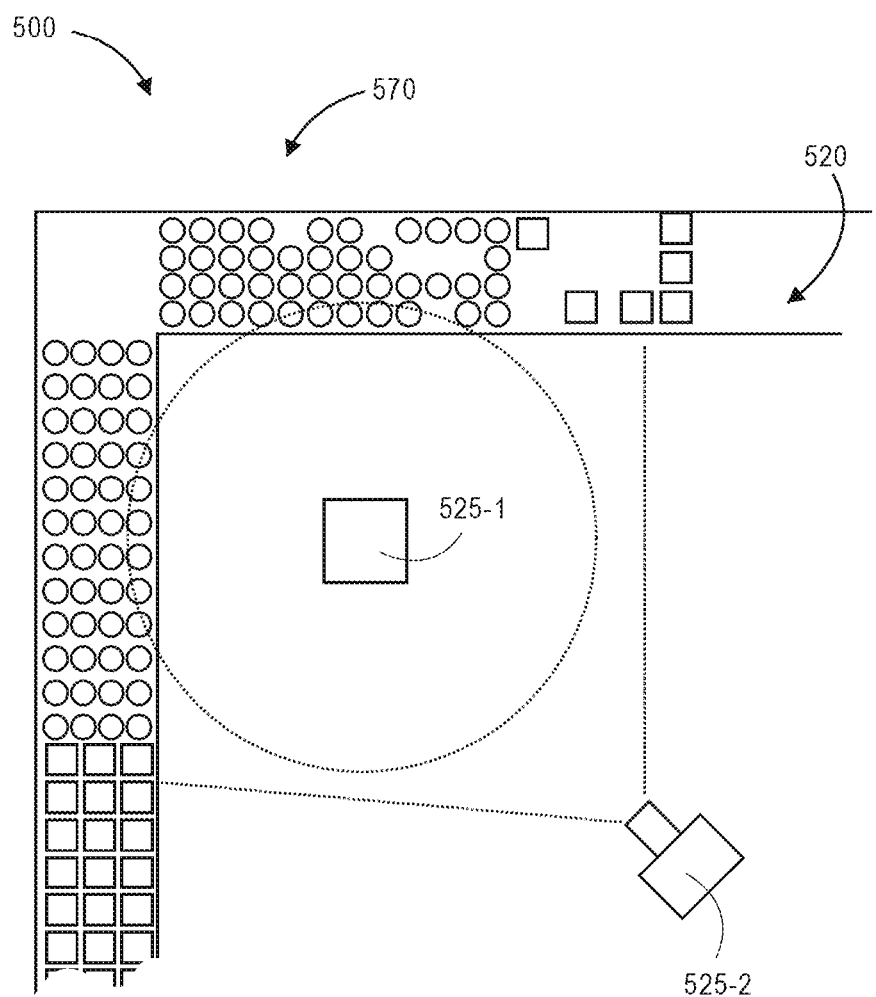

As is shown in FIGS. 5A and 5B, the system 500 includes a materials handling facility 520 having a pair of RGBD cameras 525-1, 525-2 and a shelving unit 570, which includes a pair of sets 572-1, 572-2 of shelves. The RGBD camera 525-1 is configured to capture imaging data (e.g., both visual images and depth images) regarding interactions with the shelving unit 570 from above the materials handling facility 520, while the RGBD camera 525-2 is configured to capture imaging data (e.g., both visual images and depth images) regarding interactions with the shelving unit 570 from a frontal perspective with respect to the sets 572-1, 572-2 of shelves.

Figure 5C:
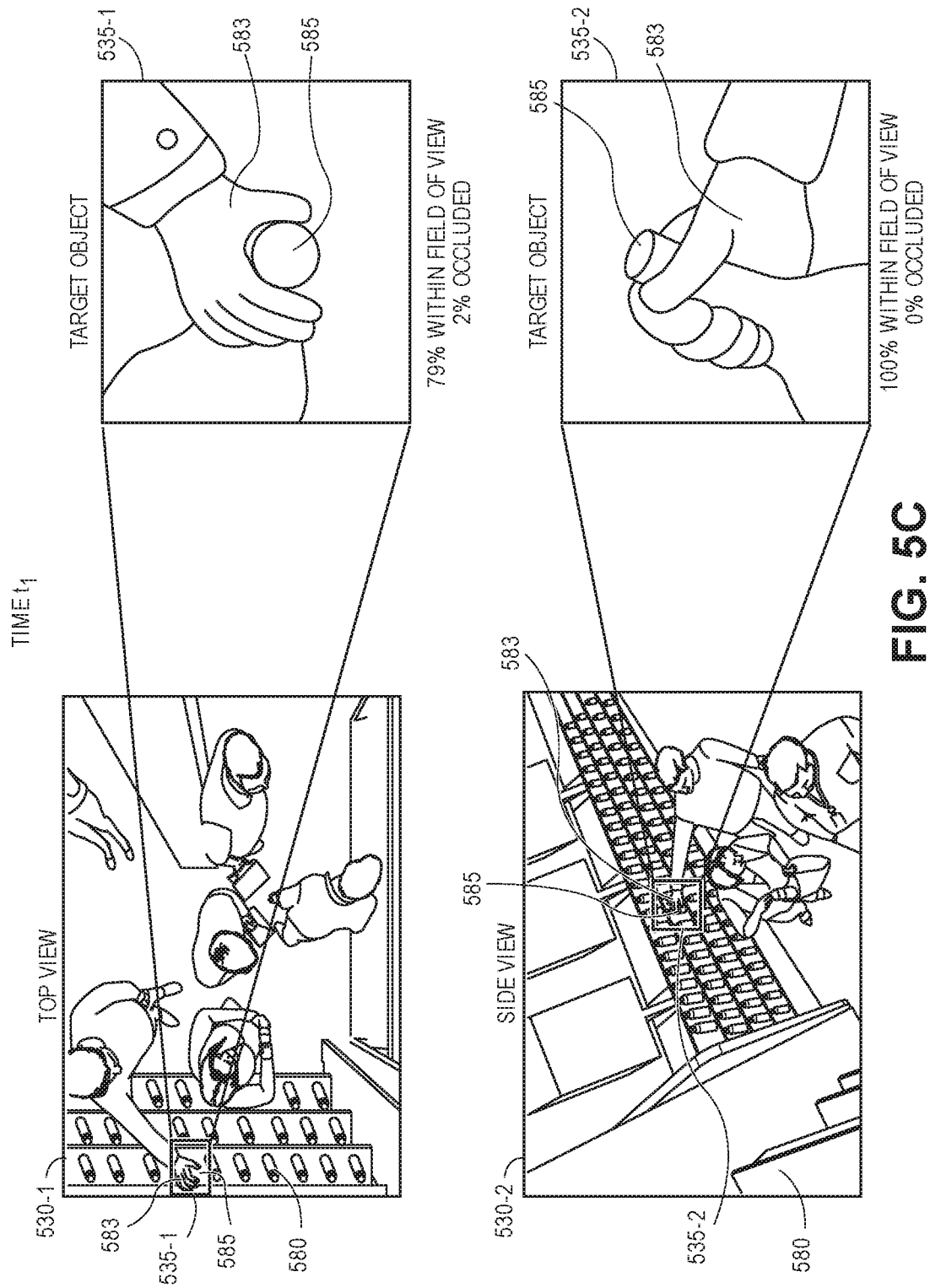

Whether an item is sufficiently represented within imaging data (e.g., visual image frames and/or depth image frames) captured by an imaging device, such as one of the imaging devices 525-1, 525-2 of FIGS. 5A and 5B, may be determined by calculating a portion or share of a 2D representation of a 3D bounding region having a target object therein that is visible within a field of view of the imaging device, as well as portion or share of the pixels corresponding to the target object within the 2D representation of the 3D bounding region that are occluded from view by one or more other objects. For example, as is shown in FIG. 5C, a visual image 530-1 captured at time t₁ using the imaging device 525-1, e.g., from a top view of the materials handling facility 520, depicts an operator 580 (e.g., a customer) using a hand 583 to interact with an item 585 (e.g., a medium-sized bottle) on one of the shelves 572-2 in the shelving unit 570. A visual image 530-2 captured at time t₁ using the imaging device 525-2, e.g., from a front view of the shelving unit 570, also depicts the operator 580 interacting with the item 585 using the hand 583. A 2D box 535-1 corresponding to a representation of a 3D bounding region in the visual image 530-1 is shown centered on the hand 583, while a 2D box 535-2 corresponding to a representation of the 3D bounding region in the visual image 530-2 is also shown centered on the hand 583.

Figure 5D:
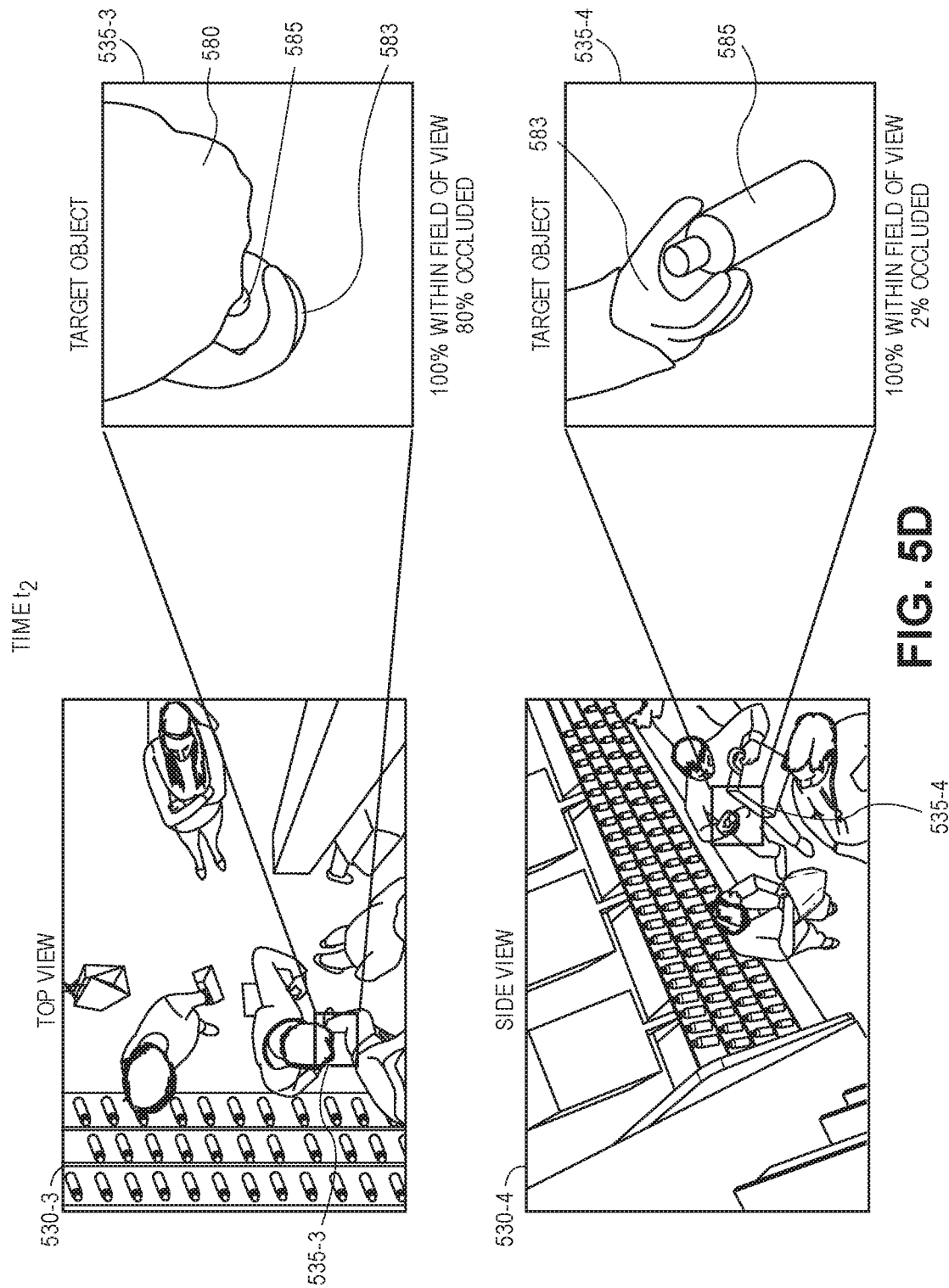

As is shown in FIG. 5C, approximately seventy-nine percent (79%) of the 2D box 535-1 is located within the field of view of the imaging device 525-1, e.g., based on the visual image 530-1. Meanwhile, approximately two percent (2%) of the pixels corresponding to the hand 583 are occluded within the 2D box 535-1. Thus, the visual image 530-1 may be processed and evaluated to track the hand 583 within the materials handling facility 520 at time t₁. Similarly, approximately one hundred percent (100%) of the 2D box 535-2 is located within the field of view of the imaging device 525-2, e.g., based on the visual image 530-2. Approximately zero percent (0%) of the hand 583 is occluded within the 2D box 535-2. Thus, the visual image 530-2 may also be processed and evaluated to track the hand 583 within the materials handling facility 520 at time t₁. The extent of the hand 583 that is occluded within the 2D boxes 535-1, 535-2 may be determined in any manner and according to any technique. For example, in some implementations of the present disclosure Likewise, as is shown in FIG. 5D, a visual image 530-3 captured using the imaging device 525-1 and a visual image 530-4 captured at time t₂ using the imaging device 525-2 also depict the operator 580 interacting with the item 585 using the hand 583. A 2D box 535-3 corresponding to a representation of a bounding region in the visual image 530-3 is shown centered on the hand 583, while a 2D box 535-4 corresponding to a representation of the bounding region in the visual image 530-4 is also shown centered on the hand 583. Approximately one hundred percent (100%) of the 2D box 535-3 is located within the field of view of the imaging device 525-1 at time t₂, e.g., based on the visual image 530-3. Approximately eighty percent (80%) of the hand 583 is occluded within the 2D box 535-3, however. Thus, the visual image 530-3 may not be utilized in tracking the hand 583 within the materials handling facility 520 at time t₂. Approximately one hundred percent (100%) of the 2D box 535-4 is also located within the field of view of the imaging device 525-2 at time t₂, e.g., based on the visual image 530-4. Approximately two percent (2%) of the hand 583 is occluded within the 2D box 535-4. Thus, the visual image 530-3 may be processed and evaluated to track the hand 583 within the materials handling facility 520 at time t₂.

As is also discussed above, positions of a target object in 3D space that are determined by correlating visual images with point clouds formed from depth images captured by synchronized imaging devices may be returned to imaging devices to train such imaging devices to recognize the actual positions of the target object within their respective fields of view. Referring to FIGS. 6A through 6G, views of aspects of one system for tracking objects in 3D space using calibrated cameras in accordance with implementations of the present disclosure are shown. Except where otherwise noted, reference numerals preceded by the number "6" shown in FIGS. 6A through 6G indicate components or features that are similar to components or features having reference numerals preceded by the number "5" shown in FIGS. 5A through 5D, by the number "4" shown in FIG. 4, by the number "2" shown in FIG. 2 or by the number "1" shown in FIGS. 1A through 1I.

Figure 6A:
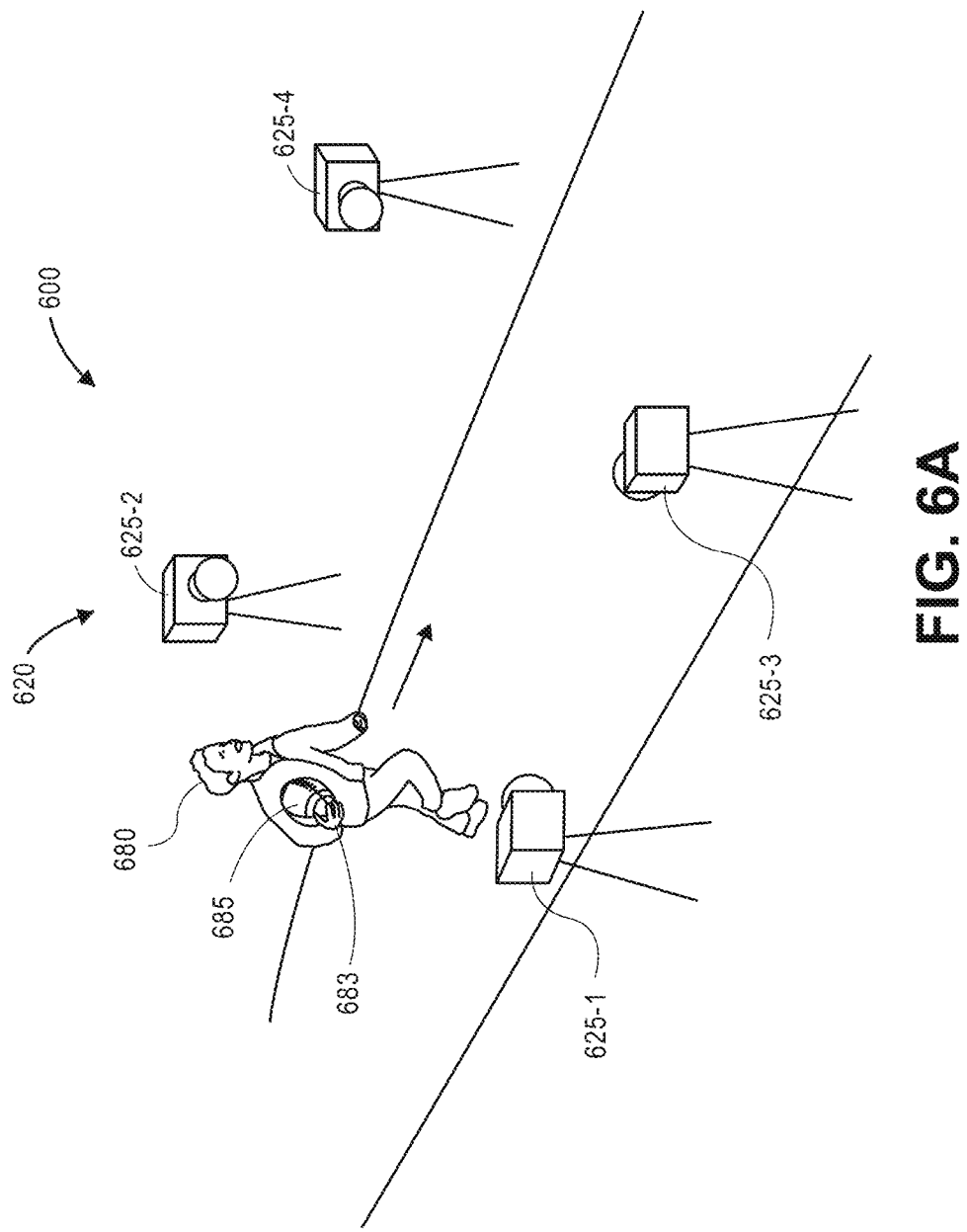

As is shown in FIG. 6A, the system 600 includes a scene 620 having a plurality of imaging devices 625-1, 625-2, 625-3, 625-4 (e.g., RGB cameras and/or RGBD cameras). The imaging devices 625-1, 625-2, 625-3, 625-4 are aligned to capture imaging data, including still or moving images, from the scene 620, and have fields of view that overlap at least in part over a portion of the scene 620. Additionally, an operator 680 is traveling through the scene 620, and is passing within the respective fields of view of each of the imaging devices 625-1, 625-2, which overlap in the scene 620. As is shown in FIG. 6A, the operator 680 is carrying an article 685 (viz., a football) in a hand 683.

As is discussed above, the imaging devices of the present disclosure, including but not limited to the devices 625-1, 625-2, 625-3, 625-4 of FIG. 6A, may be configured to predict a hypothetical position of a target object within their respective fields of view at a given time based on visual images captured thereby, e.g., based on previously captured frames, as well as any colors, textures, outlines or other aspects recognized within the visual images, or any other intrinsic or extrinsic data regarding the operator 680, the hand 683, the article 685, the scene 620 and/or the imaging device 625-3, using one or more tracking algorithms operating thereon. When a position of the target object is determined in 3D space (e.g., a position of one or more points associated with the target object, such as a center or centroid, a set or collection of points, or a representative one or more of such points) as of the given time based on hypothetical positions of the target object within one or more frames that are correlated with depth information (e.g., a point cloud formed from depth images captured by the imaging devices 625-1, 625-2, 625-3, 625-4), information regarding the determined position of the target object may be returned to the imaging devices 625-1, 625-2, 625-3, 625-4 in order to further train the tracking algorithms operating thereon to recognize the target object in subsequently captured frames.

Figure 6B:
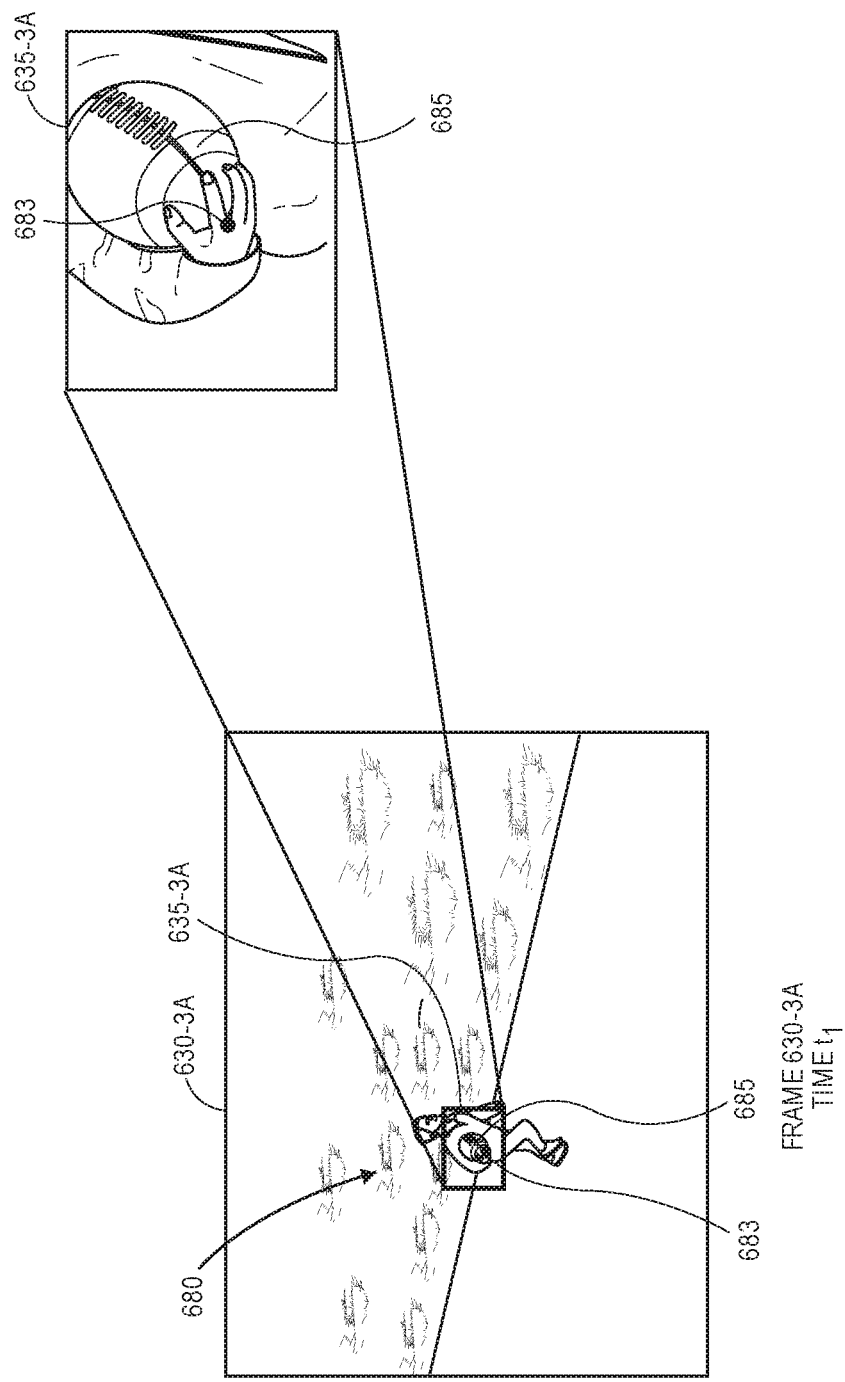

As is shown in FIG. 6B, a visual image frame 630-3A is captured at time t₁ by the imaging device 625-3 shown in FIG. 6A as the operator 680 travels within the scene 620. The visual image frame 630-3A depicts the operator 680, the hand 683 and the article 685 at time t₁. A 2D representation 635-3A of a 3D bounding region is shown on the visual image frame 630-3A, and includes a hypothetical position of the hand 683 at time t₁ determined by the imaging device 625-3 according to any type or form of tracking algorithm, system or technique, including but not limited to such algorithms, systems or techniques that operate based at least in part on hypothetical positions of the hand 683 previously observed in visual image frames captured by the imaging device 625-3, as well as any intrinsic or extrinsic data. Such algorithms, systems or techniques may operate by tracking common edges, contours, outlines, colors, textures, silhouettes, shapes or other characteristics of objects. Similarly, as is shown in FIG. 6C, a visual image frame 630-3B is captured at time t₁ by the imaging device 625-4 shown in FIG. 6A as the operator 680 travels within the scene 620. The visual image frame 630-3B also depicts the operator 680, the hand 683 and the article 685 at time t₁, and a 2D representation 635-3B of the 3D bounding region is shown on the visual image frame 630-3B as including a hypothetical position of the hand 683 at time $t_1$ as determined by the imaging device 625-3 according to any type or form of tracking algorithm, system or technique. Although FIGS. 6B and 6C show only single visual image frames 630-3A, 630-3B captured by the imaging devices 625-3, 625-4 at the time $t_1$, those of ordinary skill in the pertinent arts will recognize that each of the other imaging devices 625-1, 625-2 shown in FIG. 6A may also capture visual image frames, and that each of the imaging devices 625-1, 625-2, 625-3, 625-4 shown in FIG. 6A may capture depth image frames of the scene 620 at time $t_1$, or at other times.

Figure 6D:
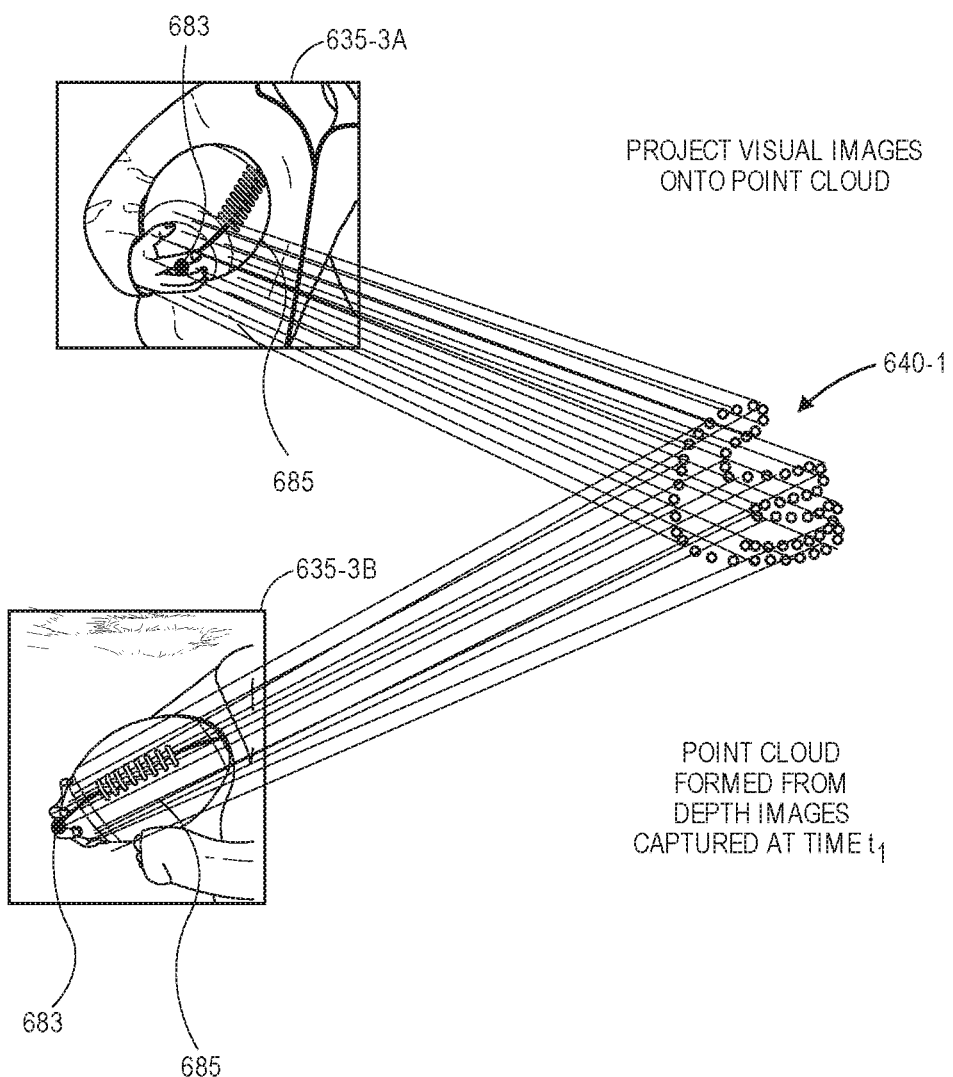

As is shown in FIG. 6D, content of the visual image frames 630-3A, 630-3B may be correlated with a point cloud 640-1 generated based on depth images captured by one or more of the imaging devices 625-1, 625-2, 625-3, 625-4, such as by projecting (e.g., triangulating) common aspects of the respective portions of the visual image frames 630-3A, 630-3B within the 2D representations 635-3A, 635-3B of the 3D bounding region shown in each of the visual image frames 630-3A, 630-3B onto the point cloud 640-1. Although FIG. 6D shows only two visual image frames 630-3A, 630-3B being projected upon the point cloud 640-1 at a single time $t_1$ those of ordinary skill in the pertinent arts will recognize that visual image frames captured by any of the imaging devices 625-1, 625-2, 625-3, 625-4 may be projected onto the point cloud 640-1 in accordance with the present disclosure.

Figure 6E:
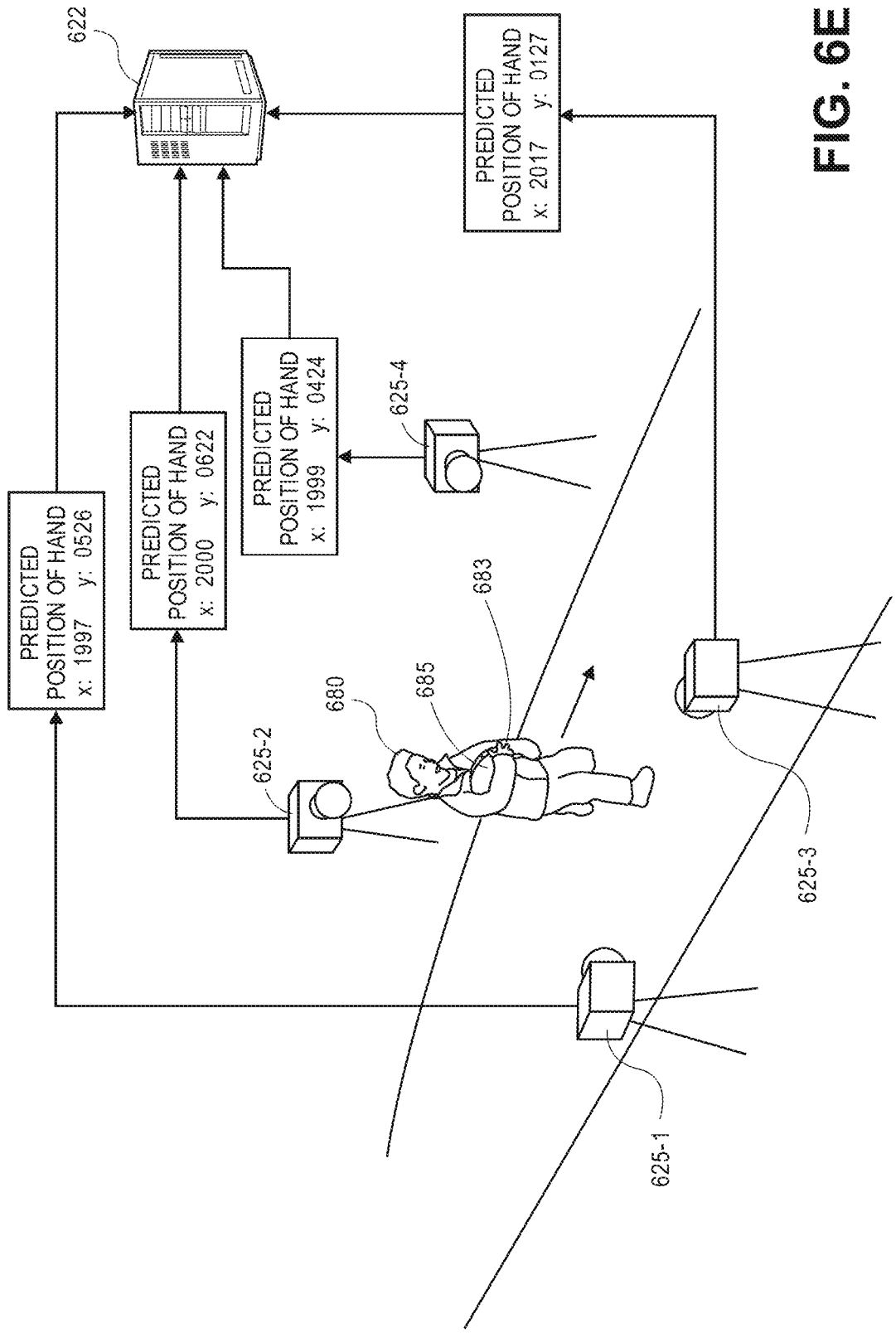

As is shown in FIG. 6E, each of the imaging devices 625-1, 625-2, 625-3, 625-4 may be configured to generate predictions of a hypothetical position of the hand 683 at time $t_1$ by providing one or more visual image frames captured thereby at time $t_1$ to a server 622 or other computer device, e.g., over one or more computer networks. Such predictions may be based at least in part on hypothetical positions of the hand 683 in any previously captured visual image frames, as well as any colors, textures, outlines or other aspects recognized in the visual image frames captured by the imaging devices 625-1, 625-2, 625-3, 625-4 at time $t_1$, and any intrinsic or extrinsic data. Predicted positions of the hand 683 within the visual image frames may be correlated with one another and with depth information, e.g., the point cloud 640-1, generated based on depth image frames (not shown) captured using one or more of the imaging devices 625-1, 625-2, 625-3, 625-4, or any other imaging devices, to determine a position of the hand 683 at time $t_1$. The position of the hand 683 may be defined by coordinates of a center or centroid of the hand 683, coordinates of each of a set or a collection of points corresponding to the hand 683 (e.g., in 3D space), or coordinates of a representative point of the hand 683 object, which may or may not be a center or centroid of the hand 683.

As is shown in FIG. 6F, once the position of the hand 683 at time $t_1$ has been determined, the position of the hand 683 may be returned to the imaging devices 625-1, 625-2, 625-3, 625-4 and used to train the one or more tracking algorithms operating thereon to recognize the hand 683 in visual image frames that are subsequently captured after time Because the position of the hand 683 at time $t_1$ is determined based on visual image frames captured by each of the imaging devices 625-1, 625-2, 625-3, 625-4, mapped to depth information (not shown) captured by one or more of the imaging devices 625-1, 625-2, 625-3, 625-4, such as the point cloud 640-1, and not just on the contents of the visual image frame 630-3B captured at time $t_1$ by the imaging device 625-4, the position of the hand 683 at time $t_1$ may aid one or more tracking algorithms in learning how the hand 683 behaves in 3D space from a global perspective, and not simply from the fields of view defined by the imaging devices 625-3, 625-4. In particular, the imaging devices 625-1, 625-2, 625-3, 625-4 may be trained to recognize not only that an object (e.g., the hand 683) is present within a field of view, but also to determine a shape of the object based on the projection of the visual image frames 630-3A, 630-3B, and/or other visual image frames, onto the point cloud 640-1.

Figure 6G:
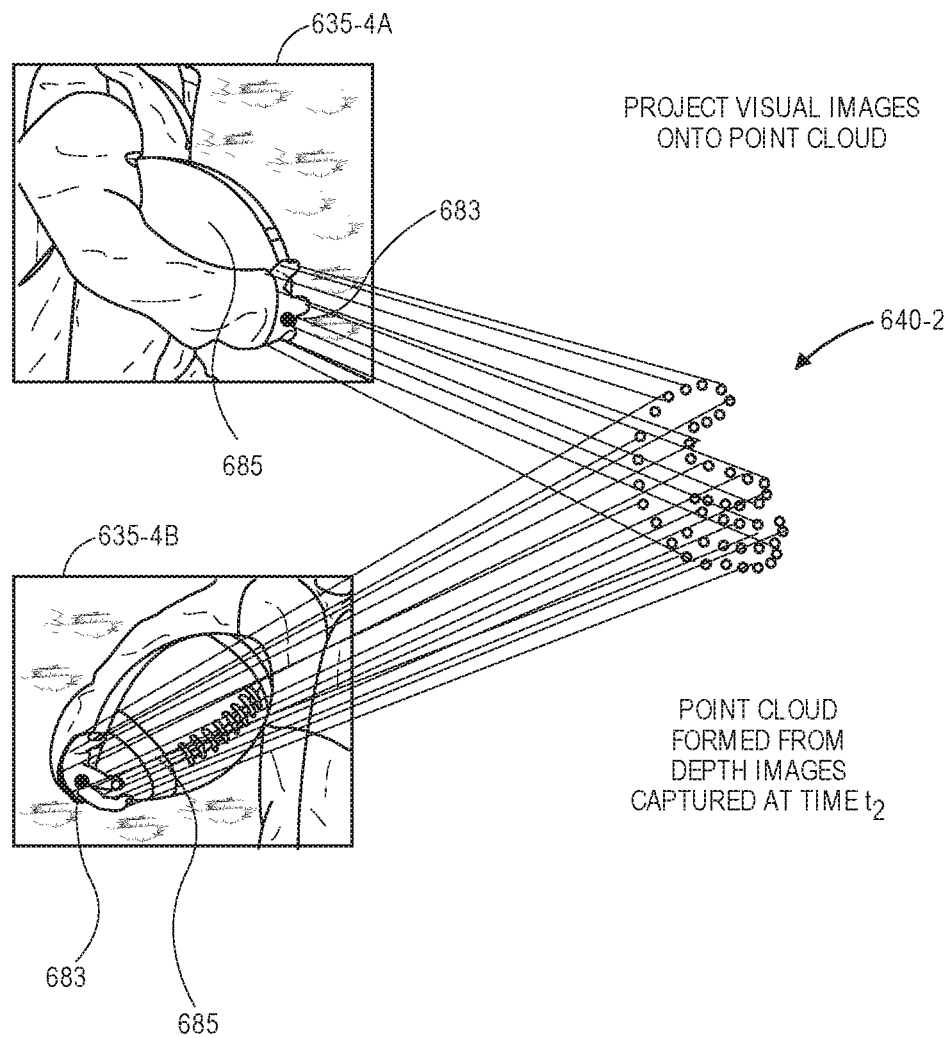

As is shown in FIG. 6G, knowledge of a shape or position of a target object, as determined from a point cloud 640-2 generated based on depth images captured by one or more of the imaging devices 625-1, 625-2, 625-3, 625-4 at time $t_2$, may be used to train a tracking algorithm, system or technique to recognize the target object within image frames captured by one or more of the imaging devices 625-1, 625-2, 625-3, 625-4 at time $t_2$. For example, as is shown in FIG. 6G, a tracking algorithm may be trained to recognize a target object (e.g., the hand 683) within portions of 2D representations 635-4A, 635-4B of the 3D bounding region within image frames captured at a time $t_2$ based on shapes or positions of the target object determined based on the point cloud 640-1 and the visual image frames 630-3A, 630-3B.

Any type of voting algorithms may be used to determine a position of a target object based on visual image frames captured by imaging devices including the target object within their respective fields of view, or a point cloud generated from depth information captured by such devices. For example, probabilities associated with positions of the target object within visual imaging data or depth imaging data captured at various times may be determined and mapped, and a track of the target object during the various times may be determined based on an analysis of the probabilities as a whole, rather than based on positions of the target object that are individually determined at discrete times based on visual imaging data and depth imaging data captured at such times.

Figure 7:
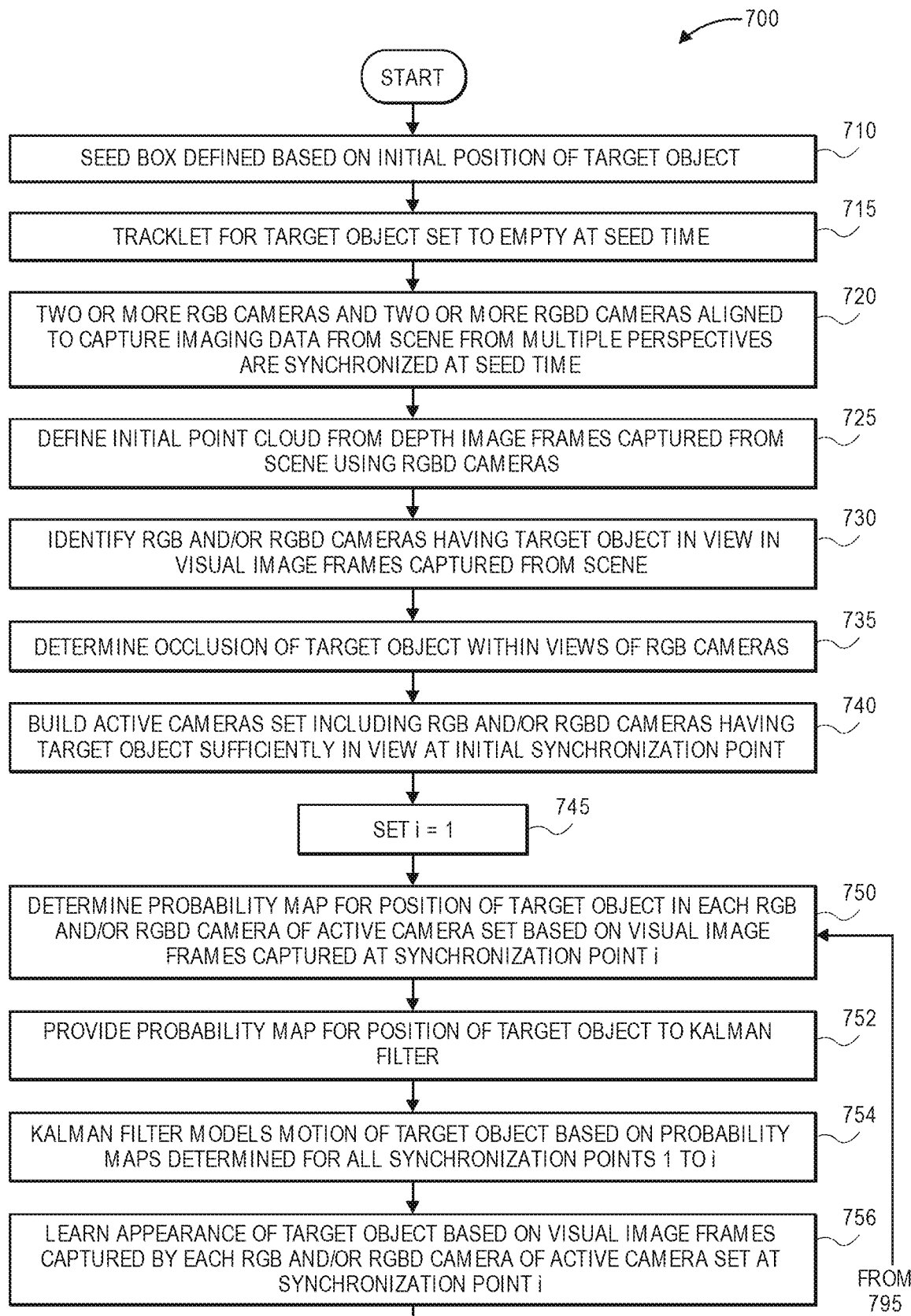
FIG. 7 is a flow chart of one process for tracking objects in 3D space using calibrated cameras in accordance with implementations of the present disclosure.
Figure 7:
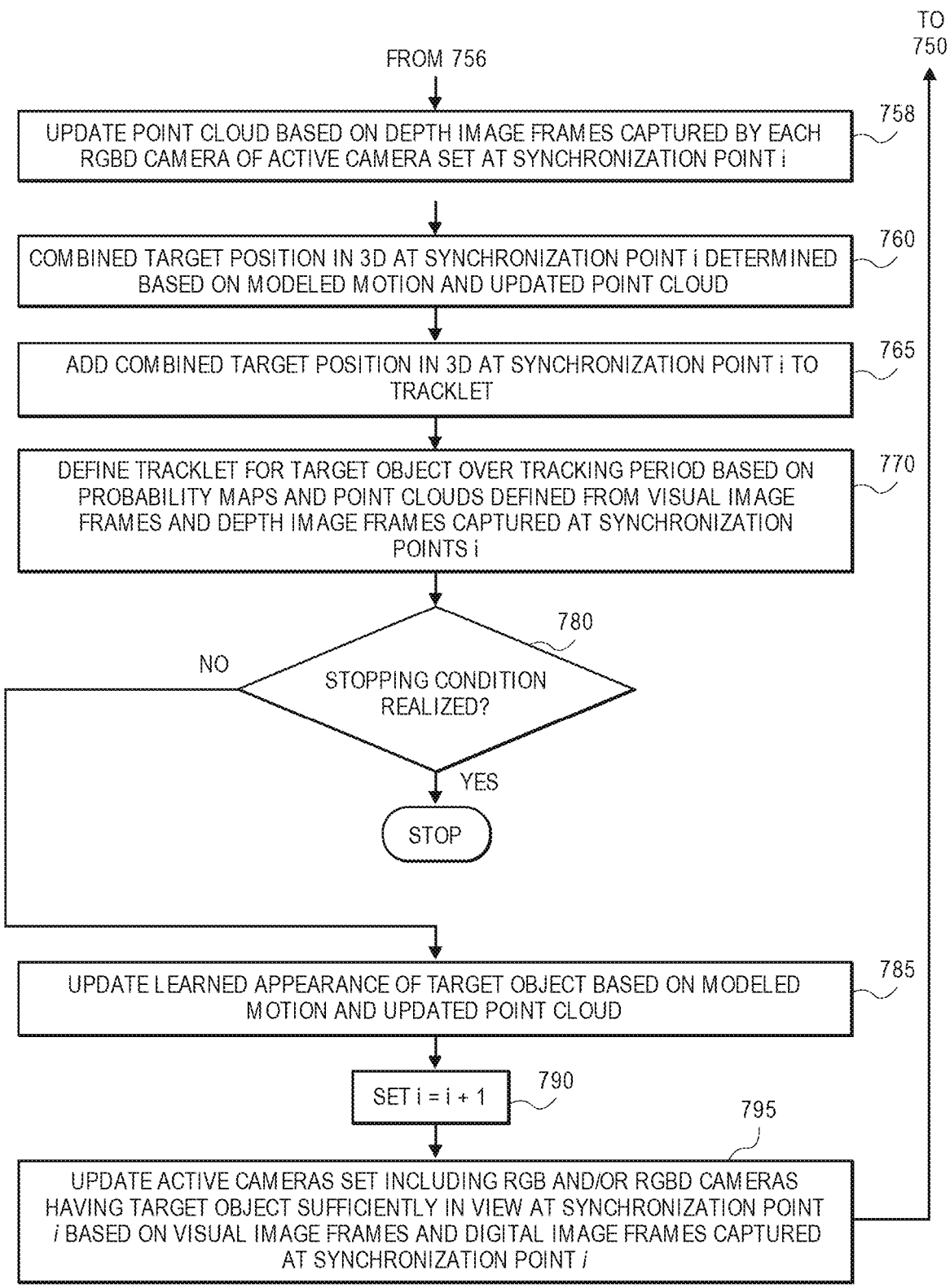

Referring to FIG. 7, a flow chart 700 of one process for tracking objects in 3D space using calibrated cameras in accordance with implementations of the present disclosure is shown. At box 710, a seed box is defined based on an initial position of a target object. The seed box, e.g., an initial bounding region, may be defined on any basis, such as in response to a triggering event, or based on any information or data, and used to determine a baseline position of a hypothetical 3D box from which tracking of a target object in a scene may be initiated. At box 715, a tracklet for the target object (or a set of positions of the target object) is set to "empty," or reset, at a seed time associated with the initial position and the bounding region. At box 720, two or more RGB cameras and two or more RGBD cameras that are aligned to capture imaging data from the scene from multiple perspectives are synchronized at the seed time, and at box 725, an initial point cloud is defined from depth image frames captured from the scene using one or more of the RGBD cameras.

At box 730, RGB and/or RGBD cameras having the target object in view within visual image frames captured from the scene are determined, and at box 735, an extent of occlusion of the target object within the views of the RGB cameras are determined. For example, as is discussed above, the extent of the occlusion of a target object within each of the fields of view may be determined in any manner, such as by comparing z-buffers that correspond to the target object to z-buffers that correspond to other points within a field of view, or in any other manner. At box 740, an active cameras set including the RGB cameras and/or the RGBD cameras that include the target object sufficiently in view at an initial synchronization point is defined. At box 745, a value of a step variable i is set at one.

At box 750, a map of probabilities for the position of the target object within the fields of view of each of the RGB and/or the RGBD cameras is determined for each of such cameras based on visual image frames captured by such cameras at a synchronization point i. The probability map may correspond to all or portions of such visual image frames, and may represent probabilities that each of the pixels of the visual image frames depicts a portion of the target object. In some implementations, a probability map may include values for each of such pixels. In other implementations, a probability map may be demarcated into one or more regions having common, average or nominal values of probabilities. Any arrangement or configuration of a probability map that depicts probabilities that pixels or regions of pixels within the visual image frames depict the target object may be utilized in accordance with the present disclosure.

At box 752, the probability map for the position of the target object is provided to a Kalman filter or another set of mathematical equations for estimating the position of the target object in a manner that minimizes a mean of the squared errors associated with the position. At box 754, the Kalman filter models motion of the target object based on probability maps determined for all known synchronization points, e.g., synchronization points ranging from 1 to i. At box 756, the appearance of the target object is learned based on the visual image frames captured by each of the RGB and/or RGBD cameras of the active cameras set at the synchronization point i. For example, based on the visual image frames, a tracking algorithm within or associated with each camera may independently compute a trained filter response (e.g., a set of pixels) to the observed visual image frame, which may then be projected onto the 3D point cloud. Where a position of the target object in 3D space (e.g., a position of a center or centroid of the target object, positions of each of a set or a collection of points corresponding to the object, or positions of one or more representative points of the target object) is known based on previously captured visual image frames and/or depth information or data, such as a point cloud formed from depth image frames, a bounding region or other hypothesis defined for the target object within a successive frame may be searched for the target object, with each point of the point cloud found within the bounding region of each imaging device being assigned a score. Points of the point cloud that are occluded in a given field of view, however, will receive a score of zero.

An aggregated score for each of the points of the point cloud, e.g., defined based on sums and/or medians of the scores for each of the fields of view, may be calculated. Thereafter, points of the point cloud having sufficiently high values from a sorted set, or local maxima points, may be identified as candidate positions for pixels corresponding to the target object, and a best position of the target object may be selected from one or more of the candidate positions accordingly. An output of the Kalman filter may be used to determine a probability of the motion of points of the target object, and a total score for each of the points of the point cloud may be determined based on a product of the Kalman filter output probability for the motion of a given point and a probability based on the aggregate score determined from each of the visual image frames. A candidate having a highest probability may be chosen.

At box 758, the point cloud is updated based on depth image frames captured by each RGBD camera of the active cameras set at the synchronization point i. For example, differences between the depth image frames from which the initial point cloud was defined and the depth image frames captured at the synchronization point i may be identified and used to update the initial point cloud or a point cloud generated prior to the synchronization point i. Alternatively, the initial point cloud or the prior point cloud may be replaced with a point cloud generated based on the depth image frames captured at the synchronization point i. At box 760, a combined target position in 3D space is determined based on the modeled motion and the updated point cloud, and at box 765, the combined target position in 3D space at the synchronization point i is added to the tracklet. The combined target position in 3D space may be represented as coordinates of a center or a centroid of the target object, or as coordinates of each of a set or collection of points (e.g., one or more representative points) corresponding to the target object, or in any other manner.

At box 770, the tracklet for the target object over the tracking period is defined based on the probability maps and the point clouds defined from the visual image frames and the depth image frames captured at the prior synchronization points i. For example, a voting algorithm may be used to estimate a joint object position probability distribution in 3D space based on representations of the target object in 2D images captured by the plurality of imaging devices, and recognized therein using a tracking algorithm, such as an OpenCV tracker or a KCF tracker. Such representations may be projected onto the point clouds, and a tracklet of the positions of the target object may be determined accordingly, such as by assigning scores to each of the points in 3D space at various times, aggregating scores for such points, and selecting a best candidate based on the aggregated scores.

At box 780, whether a stopping condition, e.g., an event that requires an end to the tracking of the target object, has been realized is determined. If a stopping condition has been realized, then the process ends. If the stopping condition has not been realized, however, then the process advances to box 785, where the learned appearance of the target object is updated based on the modeled motion and the updated point cloud. The appearance and/or position of the target object may be returned to each of the cameras of the active cameras set, which may then update their respective tracking algorithms based on the appearance of the target object. At box 790, the value of the step variable i is incremented by one, e.g., to a value of i+1. At box 795, the active cameras set is updated to include RGB and/or RGBD cameras having the target object sufficiently in view at the synchronization point i based on visual image frames and digital image frames captured at synchronization point i, before returning to box 750, where a map of probabilities for the position of the target object within the fields of view of each of the RGB and/or the RGBD cameras is determined.

Referring to FIGS. 8A through 8M, views of aspects of one system 800 for tracking objects in 3D space using calibrated cameras in accordance with implementations of the present disclosure are shown. Except where otherwise noted, reference numerals preceded by the number "8" shown in FIGS. 8A through 8M indicate components or features that are similar to components or features having reference numerals preceded by the number "6" shown in FIGS. 6A through 6G, by the number "5" shown in FIGS. 5A through 5D, by the number "4" shown in FIG. 4, by the number "2" shown in FIG. 2 or by the number "1" shown in FIGS. 1A through 1I.

Figure 8A:
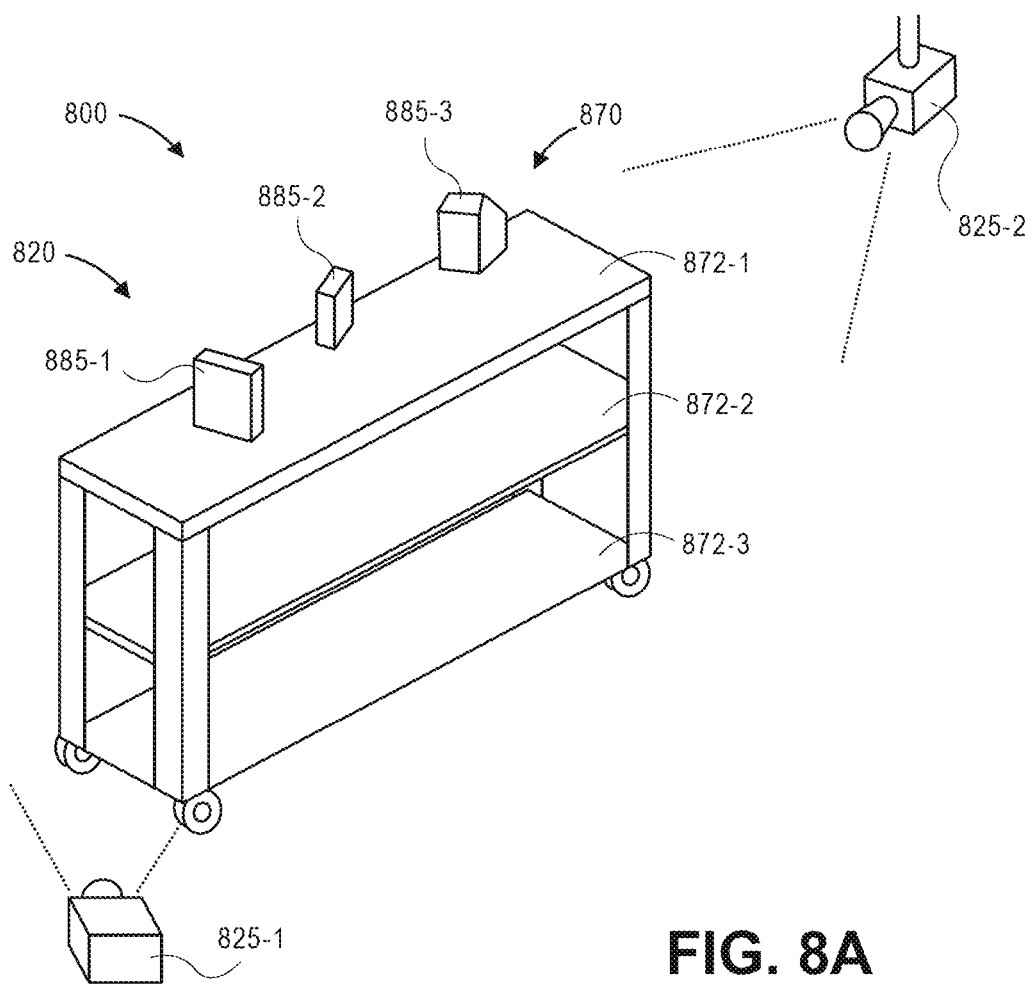
Figure 8B:
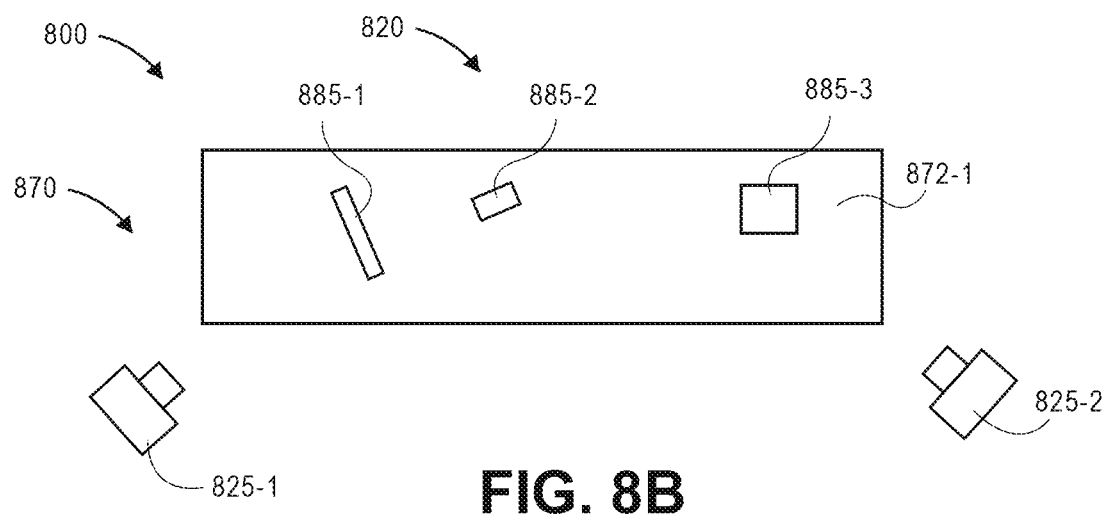

As is shown in FIGS. 8A and 8B, the system 800 includes a materials handling facility 820 having a pair of imaging devices 825-1, 825-2 and a shelving unit 870 with a plurality of shelves 872-1, 872-2, 872-3. The imaging devices 825-1, 825-2 are aligned to include all or portions of the shelving unit 870 and/or the shelves 872-1, 872-2, 872-3 within their respective fields of view. As is also shown in FIGS. 8A and 8B, a plurality of items 885-1, 885-2, 885-3 are deposited on the shelf 872-1.

Figure 8C:
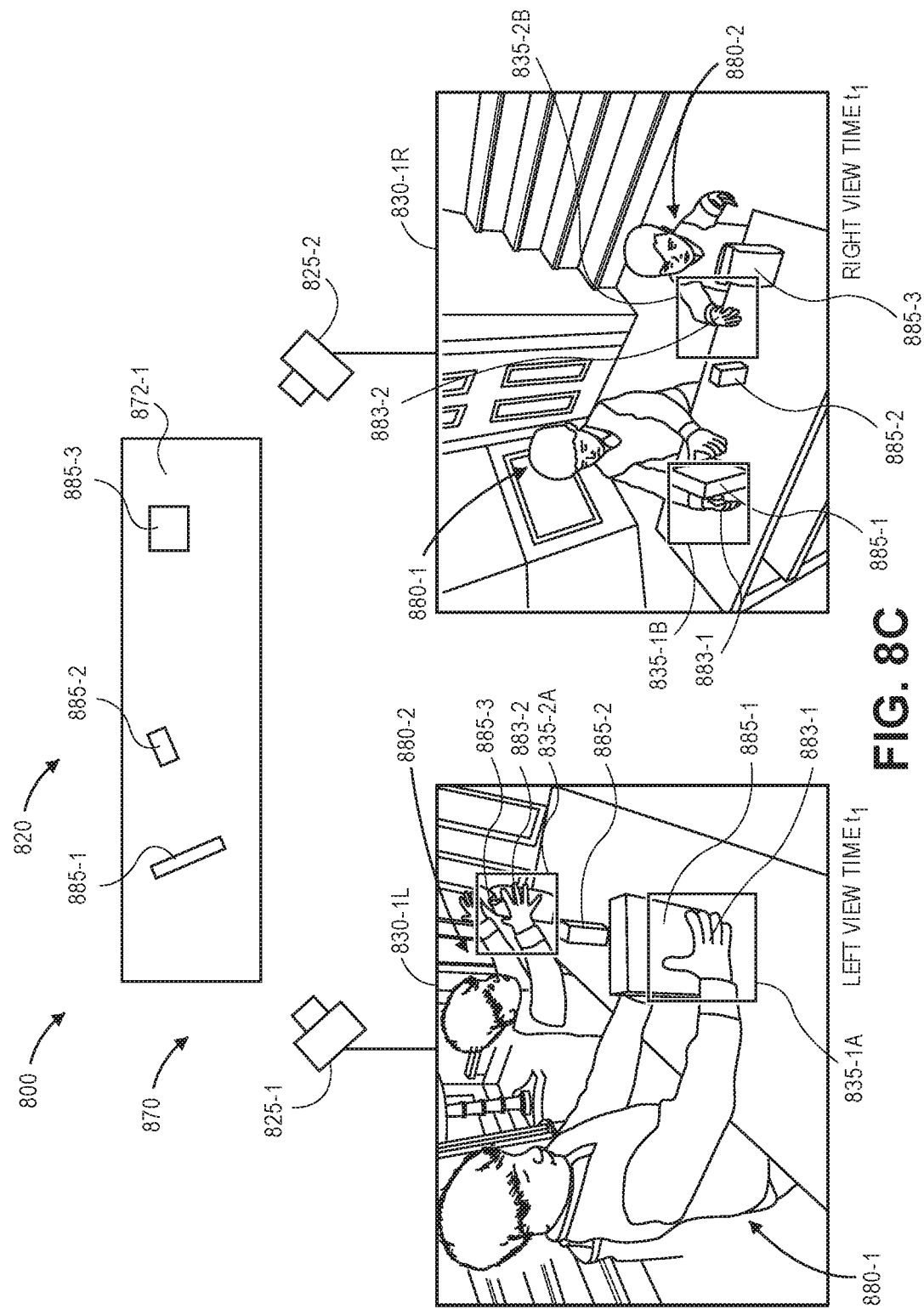

As is shown in FIGS. 8C through 8F, the imaging devices 825-1, 825-2 may capture imaging data as a plurality of operators 880-1, 880-2 execute a number of movements within the materials handling facility 820, including movements involving interactions with the one or more items 885-1, 885-2, 885-3 or other items on the shelves 872-1, 872-2, 872-3 there. For example, as is shown in FIG. 8C, the imaging devices 825-1, 825-2 captured the synchronized visual images 830-1L, 830-1R at a time $t_1$, with each of the visual images 830-1L, 830-1R depicting the operator 880-1 evaluating the item 885-1 and the operator 880-2 interacting with the item 885-3 on the shelf 872-1. A 2D representation 835-1A of a 3D bounding region is shown as centered on a right hand 883-1 of the operator 880-1 in the visual image 830-1L, and a 2D representation 835-2A of a 3D bounding region is shown as centered on a right hand 883-2 of the operator 880-2 in the visual image 830-1L. Similarly, a 2D representation 835-1B of a 3D bounding region is shown as centered on the right hand 883-1 of the operator 880-1 in the visual image 830-1R, and a 2D representation 835-2B of a 3D bounding region is shown as centered on a right hand 883-2 of the operator 880-2 in the visual image 830-1R.

Figure 8D:
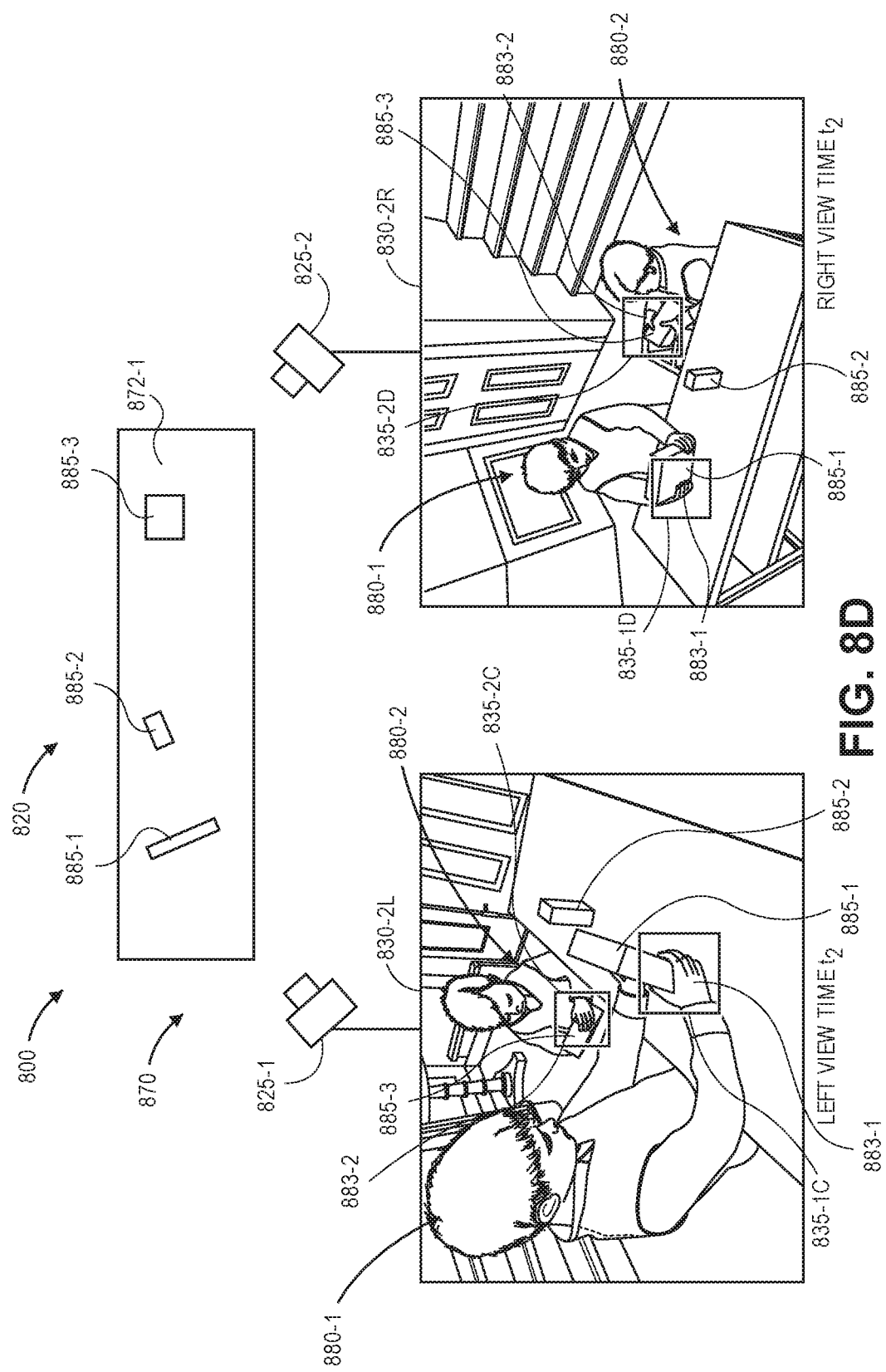

As is shown in FIG. 8D, the imaging devices 825-1, 825-2 captured the synchronized visual images 830-2L, 830-2R at a time $t_2$, with each of the visual images 830-2L, 830-2R depicting the operator 880-1 as he continues to evaluate the item 885-1, while the operator 880-2 retrieves the item 885-3 from the shelf 872-1 and places the item 885-3 into a cart. 2D representations 835-1C, 835-2C of 3D bounding regiones are shown as centered on the right hand 883-1 of the operator 880-1 and on the right hand 883-2 of the operator 880-2 in the visual image 830-2L. Similarly, 2D representations 835-1D, 835-2D of 3D bounding regiones are shown as centered on the right hand 883-1 of the operator 880-1 and on the right hand 883-2 of the operator 880-2 in the visual image 830-2R.

Figure 8E:
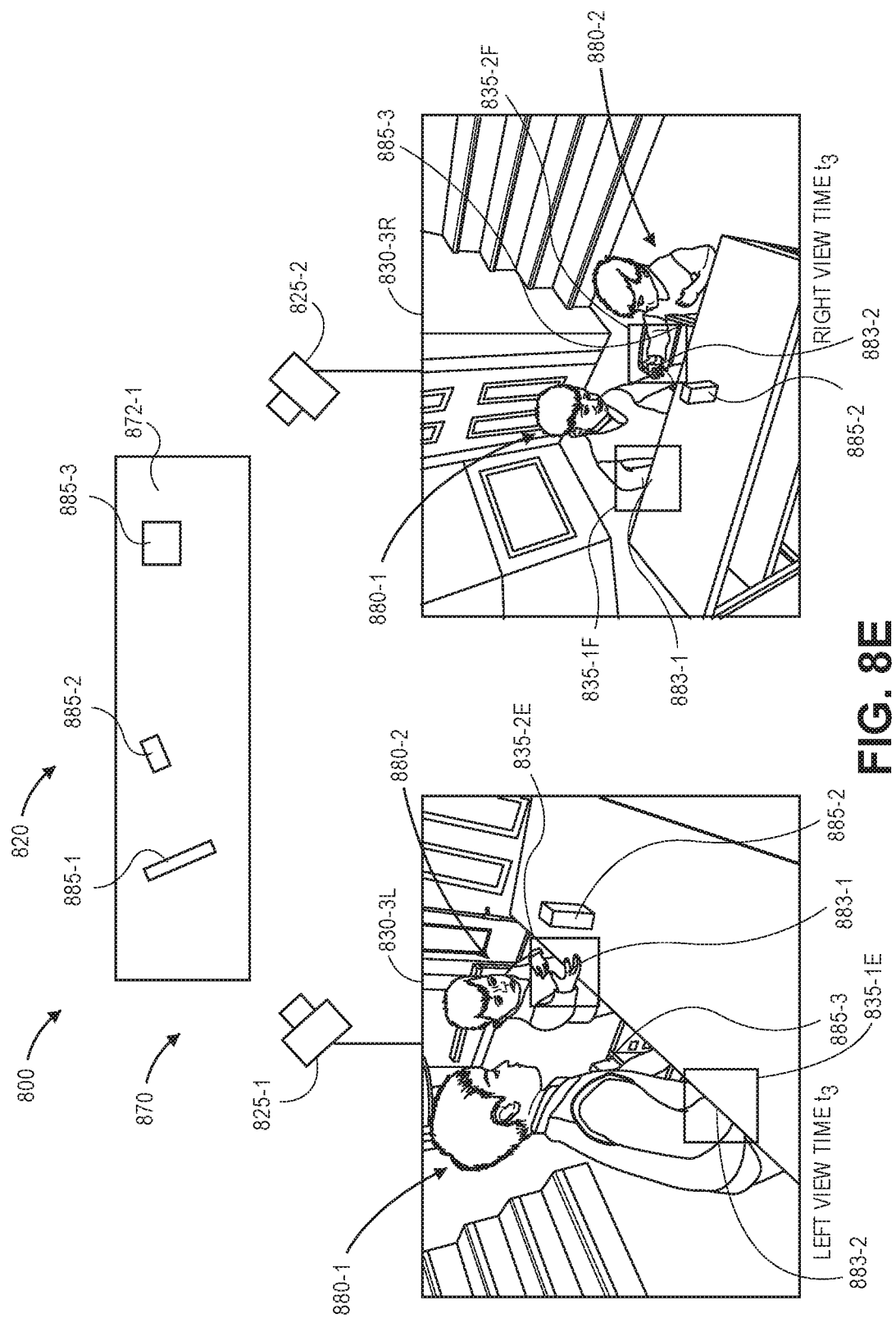

As is shown in FIG. 8E, the imaging devices 825-1, 825-2 captured the synchronized visual images 830-3L, 830-3R at a time $t_3$, with each of the visual images 830-3L, 830-3R depicting the operator 880-1 placing the item 885-1 into a cart, while the operator 880-2 attempts to retrieve the item 885-2 from the shelf 872-1. 2D representations 835-1E, 835-2E of 3D bounding regiones are shown as centered on the right hand 883-1 of the operator 880-1 and on the right hand 883-2 of the operator 880-2 in the visual image 830-3L. Similarly, 2D representations 835-1F, 835-2F of bounding regions are shown as centered on the right hand 883-1 of the operator 880-1 and on the right hand 883-2 of the operator 880-2 in the visual image 830-3R.

As is shown in FIG. 8F, the imaging devices 825-1, 825-2 captured the synchronized visual images 830-4L, 830-4R at a time $t_4$, with each of the visual images 830-4L, 830-4R depicting the operator 880-1 looking on as the operator 880-2 places the item 885-3 into the cart. 2D representations 835-1G, 835-2G of bounding regions are shown as centered on the right hand 883-1 of the operator 880-1 and on the right hand 883-2 of the operator 880-2 in the visual image 830-4L. Similarly, 2D representations 835-1H, 835-2H of bounding regions are shown as centered on the right hand 883-1 of the operator 880-1 and on the right hand 883-2 of the operator 880-2 in the visual image 830-4R.

Figure 8G:
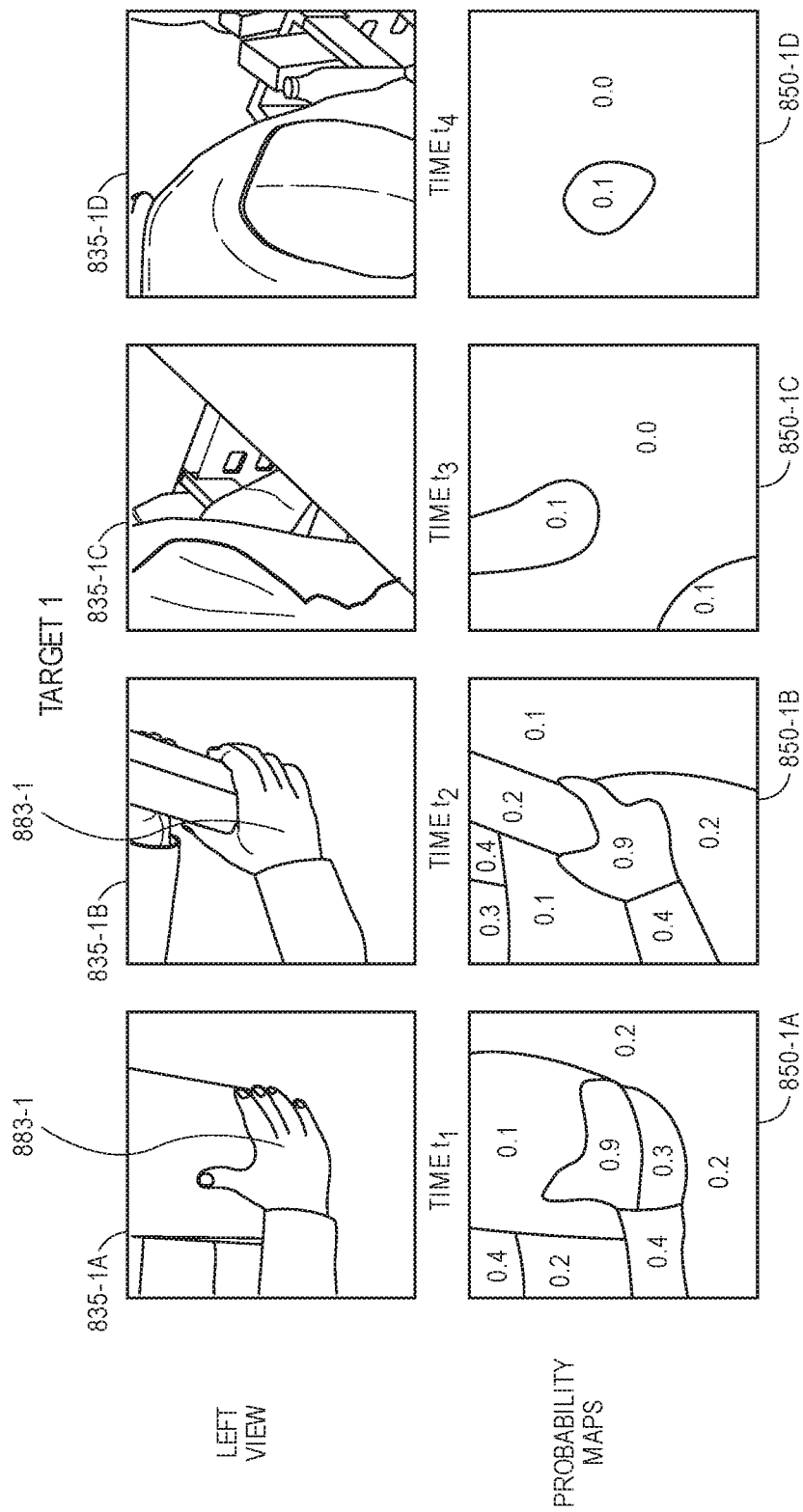
Figure 8H:
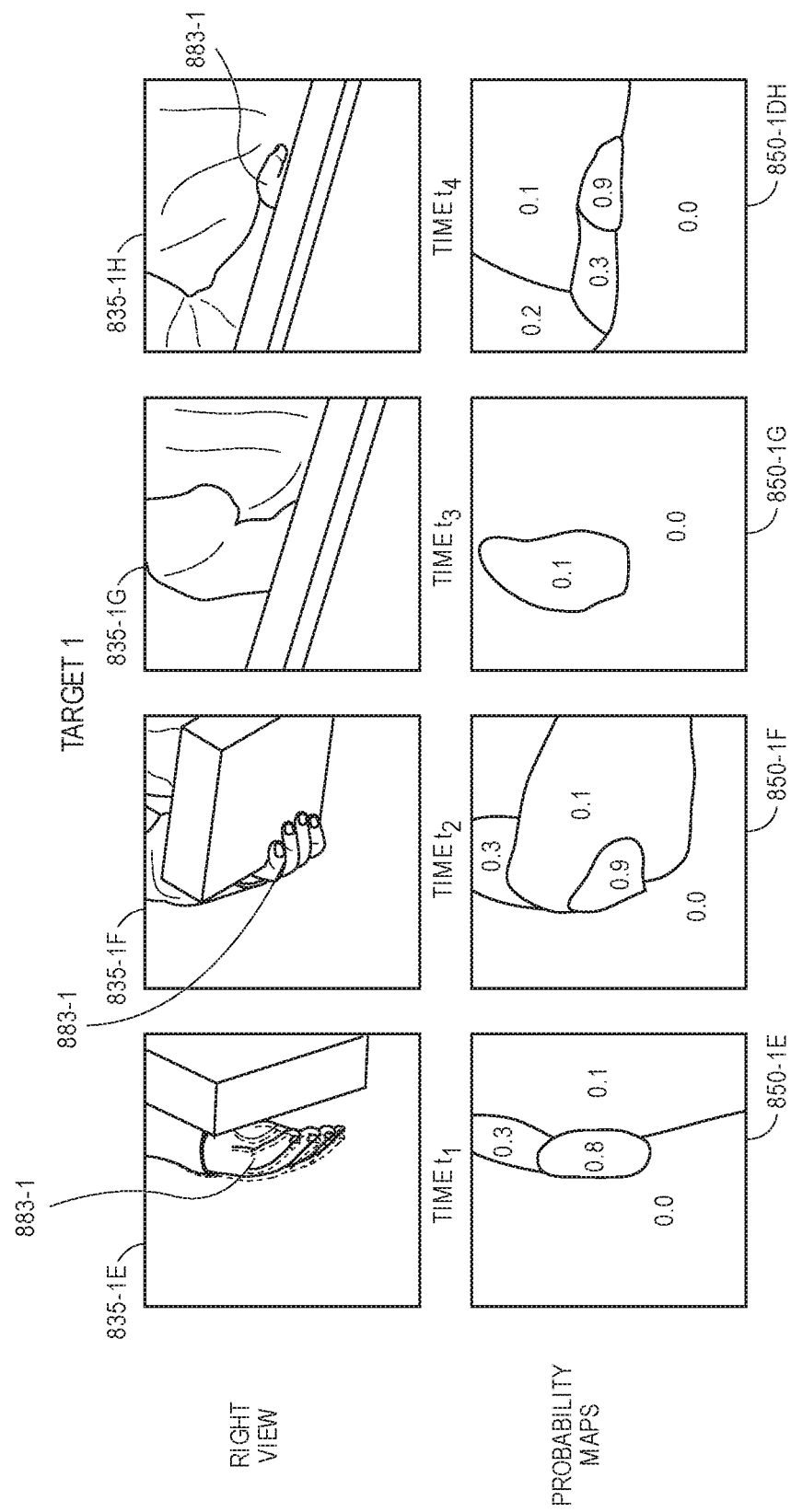

As is discussed above, the motion of target objects, e.g., one or more of the hands of the operators 880-1, 880-2 or the items 885-1, 885-2, 885-3, or any other objects within the materials handling facility 820, may be tracked by mapping probabilities that such target objects are depicted within visual image frames and defining a joint probability distribution in 3D space from which positions of the target objects may be selected. As is shown in FIGS. 8G and 8H, a plurality of probability maps 850-1A, 850-1B, 850-1C, 850-1D, 850-1E, 850-1F, 850-1G, 850-1H may be generated based on the presence of the right hand 883-1 of the operator 880-1 identified in each of the 2D representations 835-1A, 835-1B, 835-1C, 835-1D, 835-1E, 835-1F, 835-1G, 835-1H of the bounding region identified in the image frames 830-1L, 830-1R, 830-2L, 830-2R, 830-3L, 830-3R, 830-4L, 830-4R captured by the imaging devices 825-1, 825-2 from left and right views, respectively. For example, as is shown in FIG. 8G, the probability maps 850-1A, 850-1B include regions of substantially high probabilities that pixels of the 2D representations 835-1A, 835-1B, which depict unoccluded views of the right hand 883-1 of the operator 880-1, correspond to the right hand 883-1. Conversely, the probability maps 850-1C, 850-1D do not include any regions in which the probabilities that pixels of the 2D representations 835-1C, 835-1D correspond to the right hand 883-1 are significant, since the 2D representations 835-1C, 835-1D depict occluded views of the right hand 883-1. Likewise, as is shown in FIG. 8H, the probability maps 850-1E, 850-1F, 850-1H include regions where pixels of the 2D representations 835-1E, 835-1F, 835-1H, which depict partially occluded views of the right hand 883-1, are strongly likely corresponding to the right hand 883-1, while the probability map 835-1G does not include any such regions.

Figure 8I:
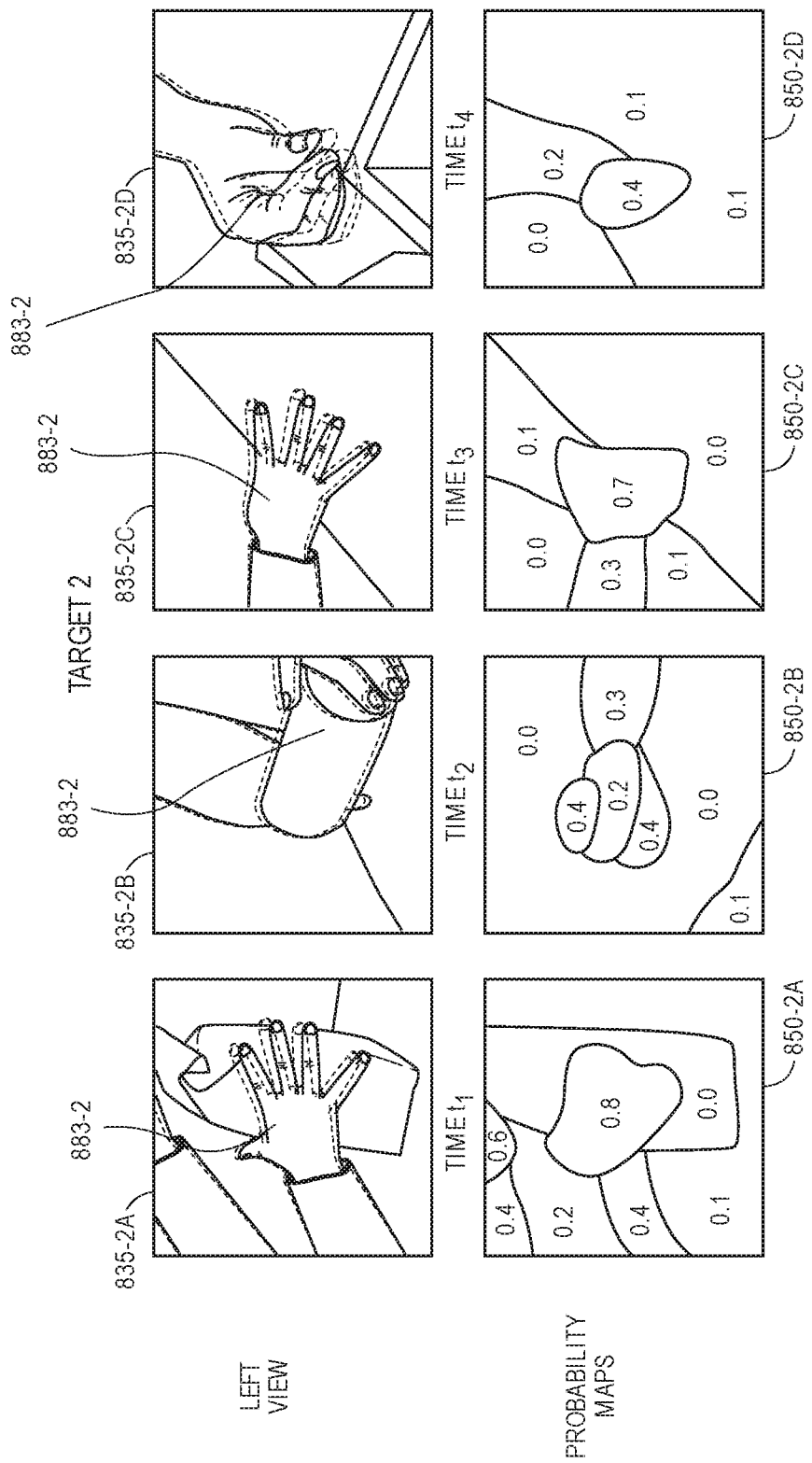
Figure 8J:
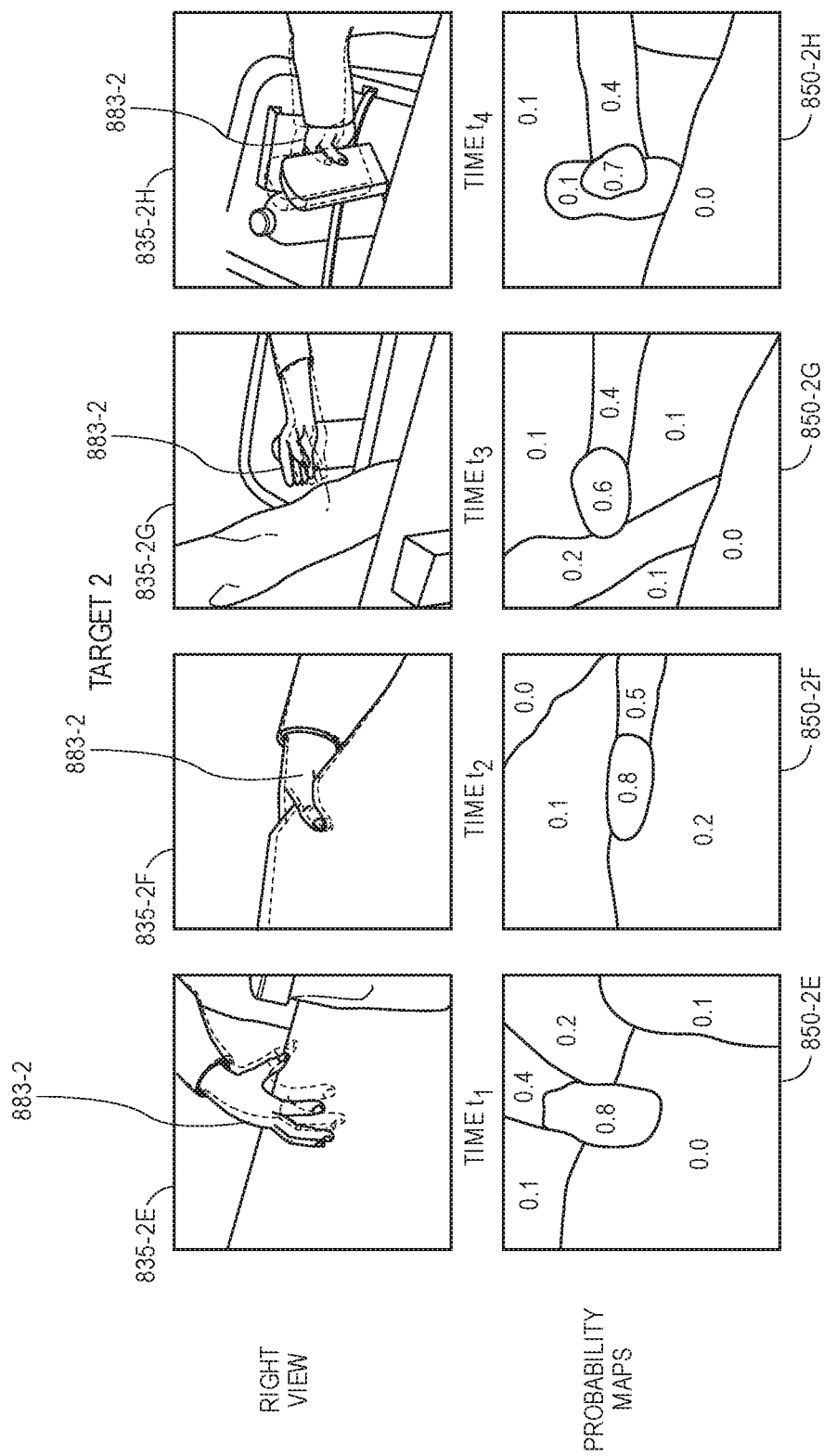

Similarly, FIGS. 8I and 8J show a plurality of probability maps 850-2A, 850-2B, 850-2C, 850-2D, 850-2E, 850-2F, 850-2G, 850-2H that are generated based on the presence of the right hand 883-2 of the operator 880-2 in each of the 2D representations 835-2A, 835-2B, 835-2C, 835-2D, 835-2E, 835-2F, 835-2G, 835-2H of the bounding region identified in the image frames 830-1L, 830-1R, 830-2L, 830-2R, 830-3L, 830-3R, 830-4L, 830-4R.

Figure 8K:
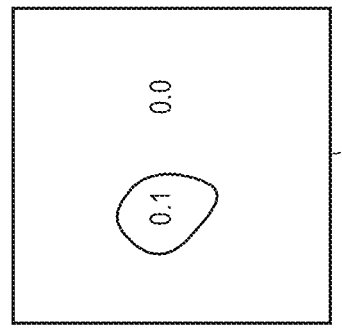
Figure 8K:
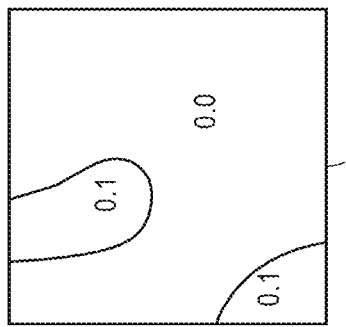
Figure 8K:
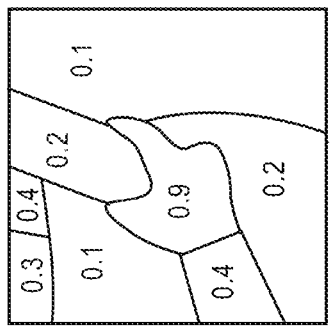
Figure 8K:
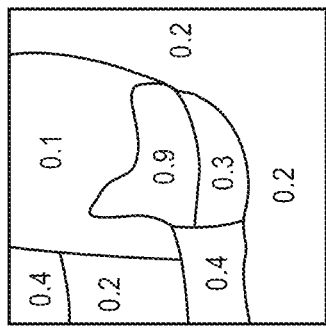
Figure 8K:
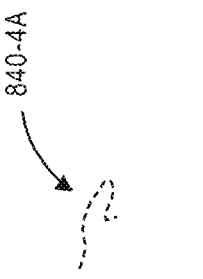
Figure 8K:
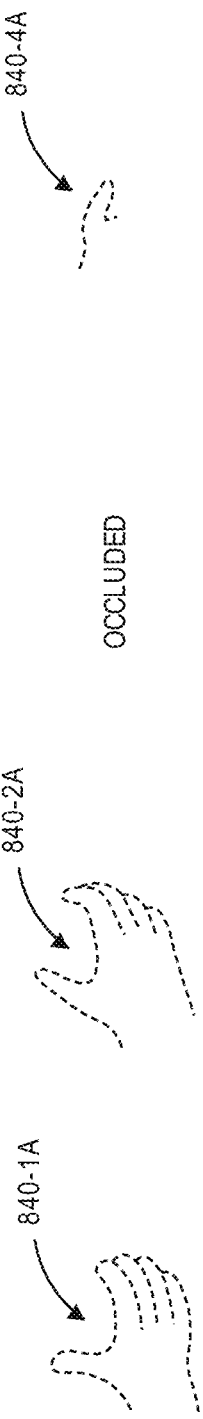
Figure 8K:
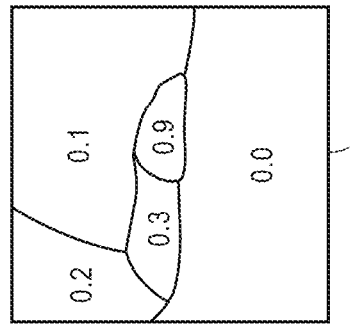
Figure 8K:
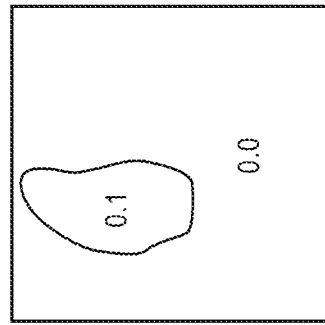
Figure 8K:
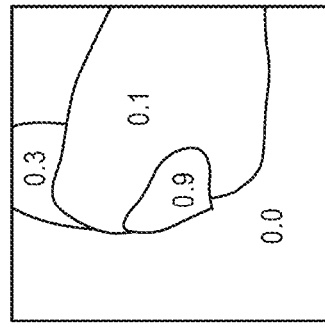
Figure 8K:
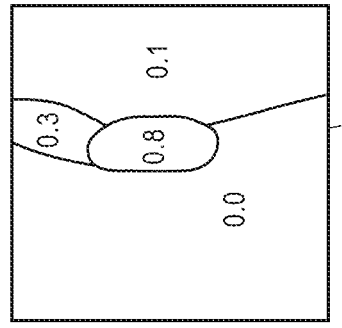

As is shown in FIG. 8K, probability maps 850-1A, 850-1B, 850-1C, 850-1D representing probabilities that the image frames 830-1L, 830-2L, 830-3L, 830-4L captured by the imaging device 825-1 depict the right hand 883-1 of the operator 880-1, and probability maps 850-1E, 850-1F, 850-1G, 850-1H representing probabilities that the image frames 830-1R, 830-2R, 830-3R, 830-4R captured by the imaging device 825-2 depict the right hand 883-1 of the operator 880-1, may be projected upon or otherwise associated with point clouds 840-1A, 840-2A, 840-4A generated from depth images captured at the times $t_1$, $t_2$, $t_3$ and $t_4$ in order to determine a three-dimensional probability distribution of the right hand 883-1 within the materials handling facility 820. Similarly, as is shown in FIG. 8L, probability maps 850-2A, 850-2B, 850-2C, 850-2D representing probabilities that the image frames 830-1L, 830-2L, 830-3L, 830-4L captured by the imaging device 825-1 depict the right hand 883-2 of the operator 880-2, and probability maps 850-2E, 850-2F, 850-2G, 850-2H representing probabilities that the image frames 830-1R, 830-2R, 830-3R, 830-4R captured by the imaging device 825-2 depict the right hand 883-2 of the operator 880-2, may be projected upon or otherwise associated with point clouds 840-1B, 840-2B, 840-3B, 840-4B generated from depth images captured at the times $t_2$, $t_3$ and $t_4$ in order to determine a three-dimensional probability distribution of the right hand 883-2 within the materials handling facility 820.

Figure 8L:
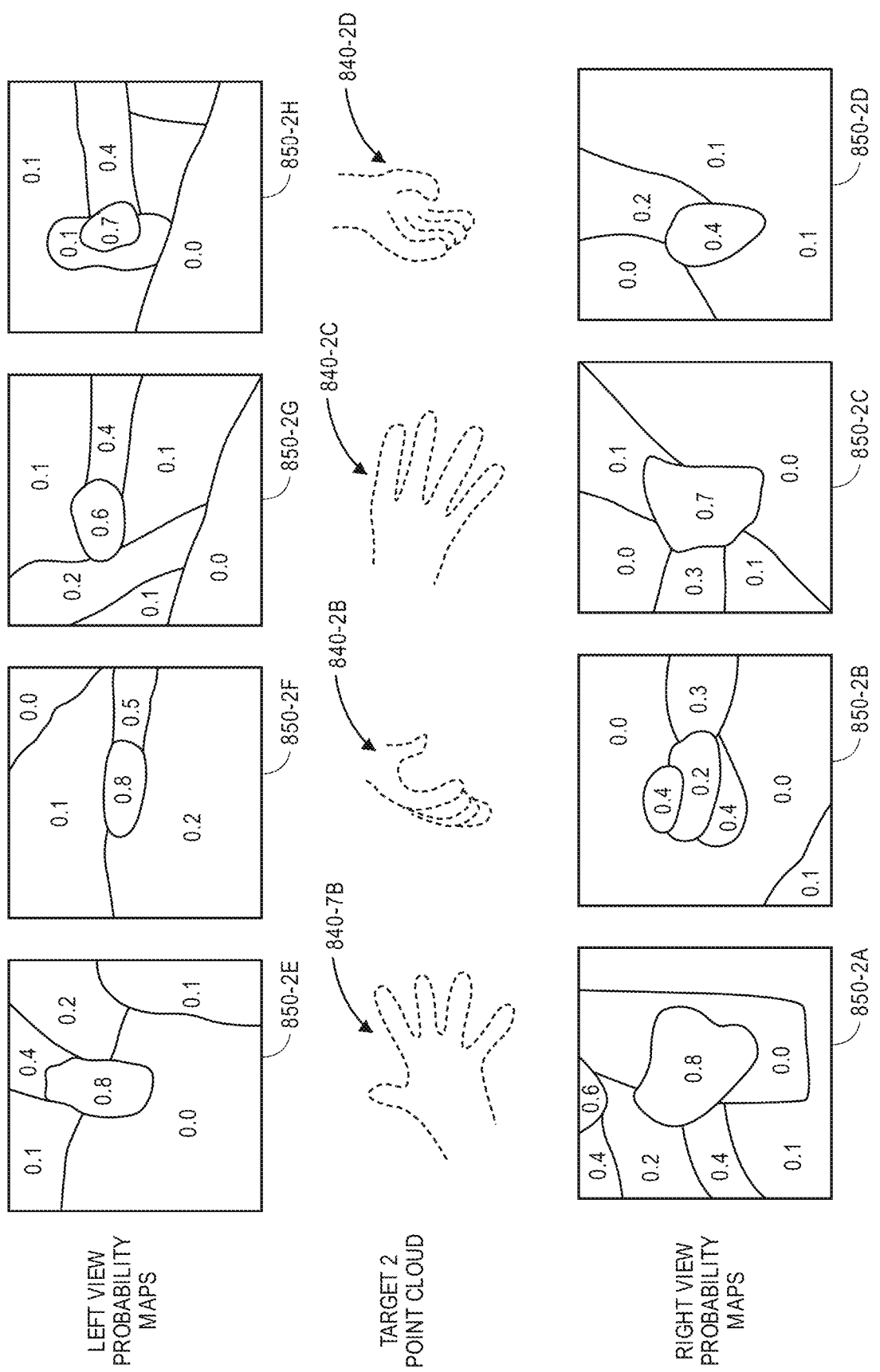
Figure 8M:
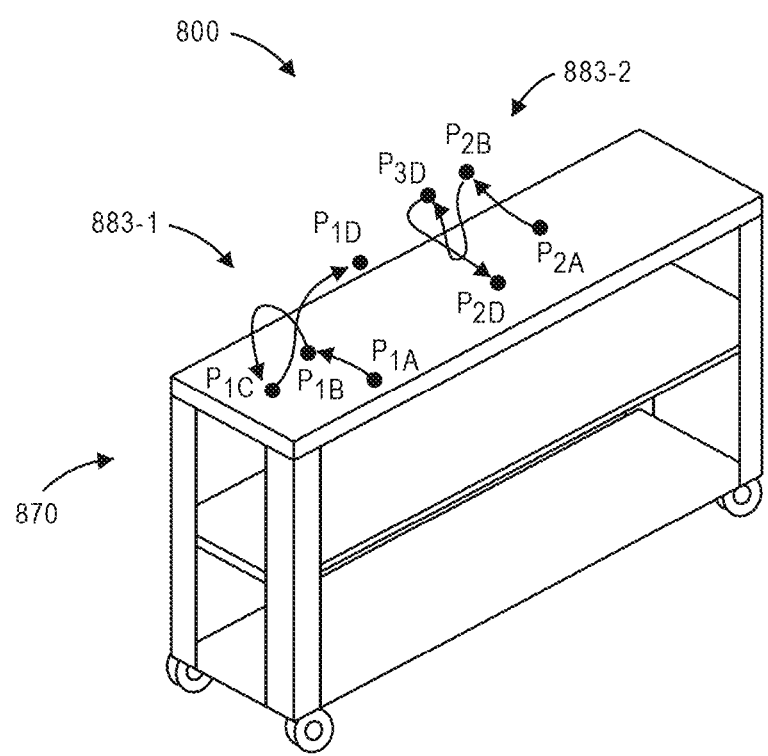

As is shown in FIG. 8M, a model of the motion of the right hand 883-1 of the operator 880-1 and the right hand 883-2 of the operator 880-2 may be generated based on the probability distributions determined based on the probability maps 850-1A, 850-1B, 850-1C, 850-1D, 850-1E, 850-1F, 850-1G, 850-1H and the point clouds 840-1A, 840-2A, 840-4A shown in FIG. 8K, and the probability maps 850-2A, 850-2B, 850-2C, 850-2D, 850-2E, 850-2F, 850-2G, 850-2H and the point clouds 840-1B, 840-2B, 840-3B, 840-4B shown in FIG. 8L.

Although some of the implementations disclosed herein reference the tracking of body parts of human actors, the systems and methods of the present disclosure are not so limited. For example, the systems and methods disclosed herein may be used to track any objects, including one or more body parts of non-human animals, as well as portions of any number of machines or robots, and are not limited to detecting and tracking humans. Furthermore, although some of the implementations disclosed herein reference detecting and tracking specific objects in a commercial setting, e.g., within a materials handling facility such as a fulfillment center, the systems and methods of the present disclosure are likewise not so limited. Rather, the systems and methods disclosed herein may be utilized to track objects in 3D space within any type of commercial or non-commercial settings, such as the live filming of performances in a stadium or theater. Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3 and 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A monitoring system comprising:
a first digital camera including at least a portion of a storage unit of a materials handling facility within a first field of view;
a second digital camera including at least the portion of the storage unit within a second field of view, wherein the second field of view overlaps the first field of view at least in part; and
a computer system in communication with the first digital camera and the second digital camera,
wherein the computer system includes at least one computer processor configured to at least:
detect a triggering event associated with the portion of the storage unit, wherein the triggering event is detected at a first time;
define a bounding region corresponding to the triggering event;
capture, by the first digital camera, a first visual image at approximately the first time;
capture, by the second digital camera, a second visual image at approximately the first time;
capture, by the first digital camera, a first depth image at approximately the first time;
capture, by the second digital camera, a second depth image at approximately the first time;
recognize, by at least one tracking algorithm, at least a first portion of an object within a first two-dimensional representation of the bounding region in the first visual image, wherein the object is associated with the portion of the storage unit;
recognize, by the at least one tracking algorithm, at least a second portion of the object within a second two-dimensional representation of the bounding region in the second visual image;
define a point cloud based at least in part on the first depth image and the second depth image, wherein the point cloud represents a plurality of points in three-dimensional space in at least one of the first depth image and the second depth image corresponding to at least the first two-dimensional representation of the bounding region or the second two-dimensional representation of the bounding region;
project at least the first two-dimensional representation of the bounding region and the second two-dimensional representation of the bounding region onto the point cloud;
in response to projecting at least the first two-dimensional representation of the bounding region and the second two-dimensional representation of the bounding region onto the point cloud,
determine a shape of the object; and
determine a first position of the object at the first time, wherein the first position of the object comprises at least a representative point of the object at the first time;
train the at least one tracking algorithm to recognize the object based at least in part on the shape of the object and the first position of the object at the first time;
capture, by the first digital camera, a third visual image at a second time;
capture, by the second digital camera, a fourth visual image at approximately the second time;
capture, by the first digital camera, a third depth image at approximately the second time;
capture, by the second digital camera, a fourth depth image at approximately the second time;
recognize, by the at least one tracking algorithm, at least a third portion of the object within a third two-dimensional representation of the bounding region in the third visual image, wherein the object is associated with the portion of the storage unit;
recognize, by the at least one tracking algorithm, at least a fourth portion of the object within a fourth two-dimensional representation of the bounding region in the fourth visual image;
update the point cloud based at least in part on the third depth image and the fourth depth image, wherein the updated point cloud represents a plurality of points in three-dimensional space corresponding to at least the third two-dimensional representation of the bounding region or the fourth two-dimensional representation of the bounding region;
project at least the third two-dimensional representation of the bounding region and the fourth two-dimensional representation of the bounding region onto the updated point cloud;
in response to projecting at least the third two-dimensional representation of the bounding region and the fourth two-dimensional representation of the bounding region onto the updated point cloud,
determine a second position of the object at the second time based at least in part on the third visual image, the fourth visual image and the updated point cloud; and
define a tracklet of the object based at least in part on the first position, the first time, the second position and the second time.

2. The monitoring system of claim 1, wherein the first digital camera is aligned to capture imaging data from above at least the portion of the storage unit, and
wherein the second digital camera is aligned to capture imaging data from a frontal perspective with respect to at least the portion of the storage unit.

3. The monitoring system of claim 1, wherein the at least one computer processor is further configured to at least:
determine, for each of the points of the point cloud, a first score based at least in part on the first visual image, wherein the first score comprises a probability that one of the pixels of the first visual image corresponds to one of the points of the point cloud;
determine, for each of the points of the point cloud, a second score based at least in part on the second visual image, wherein the second score comprises a probability that one of the pixels of the second visual image corresponds to one of the points of the point cloud; and
determine, for each of the points of the point cloud, an aggregate score comprising at least the first score and the second score,
wherein the first position of the object at the first time is determined based at least in part on the aggregate scores for each of the points of the point cloud.

4. The monitoring system of claim 1, further comprising a plurality of digital cameras, wherein the first digital camera and the second digital camera are two of the plurality of digital cameras, and
wherein the at least one computer processor is further configured to at least:
determine that the first digital camera includes at least the first portion of the object within the first field of view at the first time;

determine that the second digital camera includes at least the second portion of the object within the second field of view at the second time; and define an active cameras set comprising the first digital camera and the second digital camera.

5. A method comprising:

determining a first position of an object in a scene at a first time;

identifying a first visual image captured at a second time by a first imaging device having a first field of view, wherein the first imaging device is one of a plurality of imaging devices, wherein the first field of view includes at least a portion of the scene, and wherein the second time follows the first time;

identifying a second visual image captured at approximately the second time by a second imaging device having a second field of view, wherein the second imaging device is one of the plurality of imaging devices, wherein the second field of view includes at least the portion of the scene and wherein the second field of view overlaps the first field of view at least in part;

defining a first bounding region based at least in part on the first position;

recognizing, using at least one tracking algorithm, at least a first portion of the object within at least a first portion of the first visual image, wherein the first portion of the first visual image is a first representation of at least a portion of the first bounding region;

recognizing, using the at least one tracking algorithm, at least a second portion of the object within at least a second portion of the second visual image, wherein the second portion of the second visual image is a second representation of at least a portion of the first bounding region;

identifying a first depth image captured at approximately the second time by a third imaging device having a third field of view, wherein the third imaging device is one of the plurality of imaging devices, and wherein the third field of view includes at least the portion of the scene;

identifying a second depth image captured at approximately the second time by a fourth imaging device having a fourth field of view, wherein the fourth imaging device is one of the plurality of imaging devices, and wherein the fourth field of view includes at least the portion of the scene;

generating a point cloud of at least the portion of the scene based at least in part on the first depth image and the second depth image;

projecting at least the first portion and the second portion onto the point cloud; and determining a second position of the object at the second time based at least in part on the first portion, the second portion and the point cloud.

6. The method of claim 5, further comprising:

generating a record of motion of the object by the at least one computer processor, wherein the record of the motion of the object comprises:

information regarding the first position and the first time; and information regarding the second position and the second time; and storing the record of the motion of the object in at least one data store.

7. The method of claim 5, wherein determining the second position of the object comprises:

providing at least the first portion of the first visual image to the at least one tracking algorithm as a first input;

determining a first hypothetical position of the object at the first time based at least in part on a first output of the at least one tracking algorithm;

providing at least the second portion of the second visual image to the at least one tracking algorithm as a second input; and determining a second hypothetical position of the object at the second time based at least in part on a second output of the at least one tracking algorithm, wherein the second position is determined based at least in part on the first hypothetical position and the second hypothetical position.

8. The method of claim 5, further comprising:

training the at least one tracking algorithm based at least in part on the second position.

9. The method of claim 8, further comprising:

defining a second bounding region based at least in part on the second position;

identifying a third visual image captured at a third time by the first imaging device, wherein the third time follows the second time;

identifying a fourth visual image captured at approximately the third time by the second imaging device;

recognizing, using the at least one trained tracking algorithm, at least a third portion of the object within at least a third portion of the third visual image, wherein the third portion of the third visual image is a third representation of at least a portion of the second bounding region;

recognizing, using the at least one trained tracking algorithm, at least a fourth portion of the object within at least a fourth region of the fourth visual image, wherein the fourth portion of the fourth visual image is a fourth representation of at least a portion of the second bounding region;

identifying a third depth image captured at approximately the third time by the third imaging device;

identifying a fourth depth image captured at approximately the third time by the fourth imaging device;

updating the point cloud of at least the portion of the scene based at least in part on the third depth image and the fourth depth image;

projecting at least the third region and the fourth region onto the updated point cloud; and determining a third position of the object at the third time based at least in part on the third region, the fourth region and the updated point cloud.

10. The method of claim 5, wherein projecting at least the first portion and the second portion onto the point cloud further comprises:

calculating, for each of a first plurality of image pixels of the first portion, a first score corresponding to a probability that the image pixel depicts at least the first portion of the object;

calculating, for each of a second plurality of image pixels of the second portion, a second score corresponding to a probability that the image pixel depicts at least the second portion of the object;

calculating, for each of the points of the point cloud, an aggregate score comprising a sum of the first score and the second score; and defining a set of points of the point cloud, wherein the set of points includes points of the point cloud having the aggregate score above a predetermined threshold, wherein the second position of the object is determined based at least in part on the points of the point cloud included in the set of points.

11. The method of claim 10, further comprising:

determining a first percent occlusion of the object in the first portion; and determining a second percent occlusion of the object in the second region, wherein the first score is calculated based at least in part on the first percent occlusion, and wherein the second score is calculated based at least in part on the second percent occlusion.

12. The method of claim 5, further comprising:

capturing the first visual image and the first depth image by a first RGBD camera at approximately the second time, wherein the first RGBD camera comprises the first imaging device and the third imaging device; and capturing the second visual image and the second depth image by a second RGBD camera at approximately the second time, wherein the second RGBD camera comprises the second imaging device and the fourth imaging device, wherein the first field of view is substantially identical to the third field of view, and wherein the second field of view is substantially identical to the fourth field of view.

13. The method of claim 5, wherein the at least one tracking algorithm is at least one kernelized correlation filter algorithm.

14. The method of claim 13, wherein at least the first portion of the object is recognized within the first portion of the first visual image using a first kernelized correlation filter algorithm operating on the first imaging device, and wherein at least the second portion of the object is recognized within the second portion of the second visual image using a second kernelized correlation filter algorithm operating on the second imaging device.

15. The method of claim 5, further comprising:

determining information regarding at least one triggering event within the scene by at least one sensor, wherein the at least one triggering event is associated with the object, and wherein the first position of the object in the scene is determined based at least in part on the information regarding the at least one triggering event.

16. The method of claim 15, wherein the at least one triggering event is at least one of:

a placement of the object on the scene;

a retrieval of the object from the scene;

an entry of at least one actor onto the scene; or a departure of at least one actor from the scene.

17. The method of claim 15, wherein determining the information regarding the at least one triggering event comprises at least one of:

detecting a change in mass on at least one surface within the scene; or recognizing at least one of a color, a texture or an outline of the object within one of the first visual image or the second visual image.

18. The method of claim 5, wherein each of the first imaging device, the second imaging device, the third imaging device and the fourth imaging device is mounted within a materials handling facility comprising at least one storage unit, wherein identifying the first visual image comprises:

capturing the first visual image by the first imaging device at the second time, wherein identifying the second visual image comprises:

capturing the second visual image by the second imaging device at approximately the second time, wherein identifying the first depth image comprises:

capturing the first depth image by the third imaging device at approximately the second time, wherein identifying the second depth image comprises:

capturing the second depth image by the fourth imaging device at approximately the second time, and wherein the first position is associated with the at least one storage unit.

19. The method of claim 5, wherein the object is at least one of:

a human body part; or a commercial good manipulated by the human body part.

20. The method of claim 5, wherein defining the first bounding region comprises:

determining at least one point corresponding to the first position of the object at the first time; and defining the first bounding region based at least in part on a buffer with respect to the at least one point, wherein the first bounding region is at least one of a rectangular volume, a spherical volume, a pyramidal volume or a cylindrical volume, wherein recognizing at least the first portion of the object within at least the first portion of the first visual image comprises:

determining a first representation of the first bounding region within the first field of view, wherein the first portion of the first visual image corresponds to the first representation, and wherein recognizing at least the second portion of the object within at least the second portion of the second visual image comprises:

determining a second representation of the first bounding region within the second field of view, wherein the second portion of the second visual image corresponds to the second representation.

21. A materials handling facility comprising:

a storage unit having a plurality of shelves;

a first imaging device aligned to include at least a portion of the storage unit within a first field of view;

a second imaging device aligned to include at least a portion of the storage unit within a second field of view, wherein the second field of view at least partially overlaps the first field of view; and a computer resource in communication with at least the first imaging device and the second imaging device, wherein the computer resource is configured to at least:

detect a triggering event associated with an item on one of the plurality of shelves;

determine a first position of an item on one of the plurality of shelves based at least in part on the triggering event;

define a first bounding region corresponding to the first position;

capture a first visual image using the first imaging device at a first time;

capture a second visual image using the second imaging device at approximately the first time;

capture a first depth image using the first imaging device at approximately the first time;

capture a second depth image using the second imaging device at approximately the first time;

recognize at least a first portion of the item within a first region of the first visual image corresponding to the first bounding region;

recognize at least a second portion of the item within a second region of the second visual image corresponding to the first bounding region;

determine a first correlation of the first region and the second region;

define a first point cloud based at least in part on the first depth image and the second depth image;

determine a second position of the item at the first time based at least in part on the first correlation and the first point cloud; and define a tracklet representative of motion of the item based at least in part on the first position and the second position.

22. The materials handling facility of claim 21, wherein at least the first portion of the item is recognized within the first region of the first visual image using at least one kernelized correlation filter algorithm, wherein at least the second portion of the item is recognized within the second region of the second visual image using the at least one kernelized correlation filter algorithm, and wherein the computer resource is further configured to at least:

train the at least one kernelized correlation filter algorithm based at least in part on the second position of the item at the first time;

define a second bounding region corresponding to the second position;

capture a third visual image using the first imaging device at a second time, wherein the second time follows the first time;

capture a fourth visual image using the second imaging device at approximately the second time;

capture a third depth image using the first imaging device at approximately the second time;

capture a fourth depth image using the second imaging device at approximately the second time;

recognize at least a third portion of the item within a first region of the third visual image corresponding to the second bounding region using the trained at least one kernelized correlation filter algorithm;

recognize at least a fourth portion of the item within a second region of the fourth visual image corresponding to the second bounding region using the trained at least one kernelized correlation filter algorithm;

determine a second correlation of the first region and the second region;

define a second point cloud based at least in part on the third depth image and the fourth depth image;

determine a third position of the item at the second time based at least in part on the second correlation and the second point cloud; and update the tracklet based at least in part on the third position.

* * * * *